US012079534B2

(12) United States Patent
Tsukamoto et al.

(10) Patent No.: US 12,079,534 B2
(45) Date of Patent: Sep. 3, 2024

(54) SYSTEM AND METHOD FOR CONFERENCING WHICH DISPLAYS QUESTIONS

(71) Applicant: Ricoh Company, Ltd., Tokyo (JP)

(72) Inventors: Yuka Tsukamoto, Tokyo (JP); Seiya Koura, Kanagawa (JP); Hiroshi Gotoh, Kanagawa (JP); Hiromasa Koike, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/445,864

(22) Filed: Aug. 25, 2021

(65) Prior Publication Data
US 2022/0043623 A1    Feb. 10, 2022

Related U.S. Application Data

(63) Continuation of application No. 16/339,855, filed as application No. PCT/JP2017/037062 on Oct. 12, 2017, now Pat. No. 11,132,166.

(30) Foreign Application Priority Data

Oct. 14, 2016    (JP) .................................. 2016-202785
Oct. 14, 2016    (JP) .................................. 2016-202830
(Continued)

(51) Int. Cl.
*G06F 3/14*    (2006.01)
*G06F 3/147*    (2006.01)
(Continued)

(52) U.S. Cl.
CPC .......... *G06F 3/1454* (2013.01); *G06F 3/1423* (2013.01); *G06F 3/147* (2013.01);
(Continued)

(58) Field of Classification Search
CPC ...... G06F 3/1454; G06F 3/1423; G06F 3/147; G06F 13/00; H04L 65/1093;
(Continued)

(56) References Cited

U.S. PATENT DOCUMENTS

| 7,533,185 B2 * | 5/2009 | Koide | ................... H04L 67/104 709/238 |
| 8,743,022 B2 | 6/2014 | Masuda et al. | |

(Continued)

FOREIGN PATENT DOCUMENTS

| JP | 2004-272692 A | 9/2004 |
| JP | 2004-272694 | 9/2004 |

(Continued)

OTHER PUBLICATIONS

International Search Report issued on Dec. 12, 2017 in PCT/JP2017/037062 filed on Oct. 12, 2017.

(Continued)

*Primary Examiner* — Tauqir Hussain
(74) *Attorney, Agent, or Firm* — XSENSUS LLP

(57) ABSTRACT

An information processing system includes: an information processing apparatus configured to manage sharing of a screen performed by a plurality of screen-sharing terminals coupled communicably to the information processing apparatus; and an administrator terminal configured to have administrative authority and to be coupled to the information processing apparatus via a network. The information processing apparatus includes an information management unit and an instruction delivery unit. The administrator terminal includes an accepting unit a communication control unit.

18 Claims, 81 Drawing Sheets

(30) Foreign Application Priority Data

| Oct. 14, 2016 | (JP) | ................................ | 2016-202831 |
| Sep. 1, 2017 | (JP) | ................................ | 2017-168503 |
| Sep. 21, 2017 | (JP) | ................................ | 2017-181109 |

(51) Int. Cl.

| G06F 13/00 | (2006.01) |
|---|---|
| G09G 5/14 | (2006.01) |
| H04L 12/18 | (2006.01) |
| H04L 65/1093 | (2022.01) |
| H04L 65/61 | (2022.01) |
| H04N 7/15 | (2006.01) |

(52) U.S. Cl.
CPC ............... *G06F 13/00* (2013.01); *G09G 5/14* (2013.01); *H04L 12/1822* (2013.01); *H04L 12/1827* (2013.01); *H04L 65/1093* (2013.01); *H04L 65/61* (2022.05); *H04N 7/155* (2013.01); *G09G 2340/12* (2013.01); *G09G 2370/16* (2013.01)

(58) Field of Classification Search
CPC ............ H04L 65/4069; G09G 2340/12; G09G 2370/16; G09G 5/14; H04N 7/155
USPC .......................................................... 709/204
See application file for complete search history.

(56) References Cited

U.S. PATENT DOCUMENTS

| 9,098,230 | B2 | 8/2015 | Masuda et al. | |
| 9,317,247 | B2 | 4/2016 | Masuda et al. | |
| 9,621,853 | B1* | 4/2017 | Yang | H04L 65/80 |
| 10,372,315 | B2* | 8/2019 | Jones | G06F 3/0486 |
| 10,977,247 | B2* | 4/2021 | Ground, Jr. | G06Q 10/10 |
| 11,132,166 | B2* | 9/2021 | Tsukamoto | H04N 7/155 |
| 2006/0167997 | A1* | 7/2006 | Forstadius | G06F 16/182 |
| | | | | 709/204 |
| 2008/0082610 | A1* | 4/2008 | Breise | G06Q 10/10 |
| | | | | 709/204 |
| 2009/0164589 | A1* | 6/2009 | Shroff | G06Q 30/0601 |
| | | | | 707/999.005 |
| 2012/0023407 | A1 | 1/2012 | Taylor | |
| 2013/0101107 | A1* | 4/2013 | DeJana | H04L 51/08 |
| | | | | 379/204.01 |
| 2013/0159416 | A1* | 6/2013 | Hirabayashi | H04L 12/1827 |
| | | | | 709/204 |
| 2013/0185356 | A1* | 7/2013 | Mizutani | H04L 65/403 |
| | | | | 709/204 |
| 2013/0195259 | A1* | 8/2013 | Barsoba | H04L 12/1822 |
| | | | | 379/93.21 |
| 2014/0047027 | A1 | 2/2014 | Moyers | |
| 2014/0258214 | A1 | 9/2014 | Tsukamoto | |
| 2014/0267569 | A1* | 9/2014 | Periyannan | H04N 7/148 |
| | | | | 348/14.08 |
| 2014/0280932 | A1* | 9/2014 | Braun | H04L 63/10 |
| | | | | 709/225 |
| 2015/0095799 | A1* | 4/2015 | Tsao | H04L 51/046 |
| | | | | 715/752 |
| 2015/0149549 | A1 | 5/2015 | Tsukamoto | |
| 2016/0072863 | A1* | 3/2016 | Wu | H04L 65/403 |
| | | | | 715/753 |
| 2016/0073059 | A1* | 3/2016 | Bader-Natal | H04N 7/148 |
| | | | | 348/14.03 |
| 2016/0119413 | A1* | 4/2016 | Antipa | H04L 67/1095 |
| | | | | 709/204 |
| 2016/0127710 | A1 | 5/2016 | Saban et al. | |
| 2016/0173820 | A1* | 6/2016 | Ding | H04L 65/4046 |
| | | | | 348/14.08 |
| 2016/0183229 | A1* | 6/2016 | Nakai | H04W 24/00 |
| | | | | 370/329 |
| 2016/0191579 | A1 | 6/2016 | Sekiguchi | |
| 2016/0196011 | A1 | 7/2016 | Masuda et al. | |
| 2016/0224673 | A1* | 8/2016 | Hebert | G06Q 30/0631 |
| 2016/0253143 | A1 | 9/2016 | Koike | |
| 2016/0269334 | A1* | 9/2016 | DeSouza Sana | H04L 51/18 |
| 2016/0286244 | A1* | 9/2016 | Chang | H04N 21/4788 |
| 2017/0052755 | A1 | 2/2017 | Miki | |
| 2017/0061092 | A1* | 3/2017 | Baratpour | H04L 65/403 |
| 2017/0093937 | A1 | 3/2017 | Oike | |
| 2017/0149981 | A1* | 5/2017 | Okuyama | H04L 65/403 |
| 2017/0195266 | A1 | 7/2017 | Moyers | |
| 2017/0208212 | A1 | 7/2017 | Tsukamoto | |
| 2017/0214723 | A1* | 7/2017 | Sanso | H04L 65/403 |
| 2017/0237788 | A1* | 8/2017 | Xi | H04L 65/4015 |
| | | | | 709/204 |
| 2017/0366608 | A1* | 12/2017 | Allison | H04L 67/01 |
| 2018/0159747 | A1* | 6/2018 | Chang | H04L 41/5045 |
| 2018/0284957 | A1 | 10/2018 | Afsari et al. | |
| 2018/0285820 | A1* | 10/2018 | Vendrow | G06Q 10/02 |
| 2018/0351756 | A1* | 12/2018 | Dave | H04N 21/4788 |
| 2018/0375676 | A1* | 12/2018 | Bader-Natal | G06F 3/0481 |
| 2019/0088153 | A1* | 3/2019 | Bader-Natal | H04N 7/147 |
| 2019/0303087 | A1 | 10/2019 | Tsukamoto et al. | |

FOREIGN PATENT DOCUMENTS

| JP | 2005-115718 | | 4/2005 |
| JP | 2006-091938 | | 4/2006 |
| JP | 2006-134094 | A | 5/2006 |
| JP | 2006-236202 | | 9/2006 |
| JP | 2011-090350 | A | 5/2011 |
| JP | 2011-238178 | | 11/2011 |
| JP | 2014-038545 | A | 2/2014 |
| JP | 2014-165843 | | 9/2014 |
| JP | 2014-176033 | | 9/2014 |
| JP | 2015-14942 | A | 1/2015 |
| JP | 2015-103131 | | 6/2015 |
| JP | 2015-141667 | | 8/2015 |
| JP | 2016-027459 | | 2/2016 |
| JP | 6711235 | | 6/2020 |
| KR | 10-2009-0002182 | | 1/2009 |
| WO | 2016/031548 | | 3/2016 |

OTHER PUBLICATIONS

Extended European Search Report for 17860152.2 mailed on Sep. 18, 2019.
Japanese Office Action for 2016-202785 mailed on Apr. 28, 2020.
Japanese Office Action for 2020-093075 mailed on Apr. 27, 2021.
Japanese Office Action for 2017-181109 mailed on Nov. 24, 2021.
Cisco, "WebEx Meeting Center User Guide", Cisco Webex, copyright 2013 (last updated: May 2, 2013), 414 pages.
Japanese Office Action issued Oct. 11, 2022, in corresponding Japanese Patent Application No. 2021-196271, 9 pp.
Office Action issued Mar. 14, 2023 in Japanese Patent Application No. 2022-000817, 2 pages.
Office Action issued Jun. 6, 2023 in Japanese Patent Application No. 2021-196271, 3 pages.

\* cited by examiner

· DOWNLOADING HANDOUT

■REQUEST

```
INSTRUCTION FOR DOWNLOADING A HANDOUT
(ADDRESS, CONFERENCE ID, USER ID OF AN ADMINISTRATOR)
```

[Fig. 9B]

· JOINING CONFERENCE

■REQUEST

```
INSTRUCTION FOR JOINING A CONFERENCE
(ADDRESS, CONFERENCE ID, USER ID OF AN ADMINISTRATOR)
```

[Fig. 9C]

· LEAVING CONFERENCE

■REQUEST

```
INSTRUCTION FOR LEAVING A CONFERENCE
(ADDRESS, CONFERENCE ID, USER ID OF AN ADMINISTRATOR)
```

[Fig. 9D]

· DELETING HANDOUT
■REQUEST

INSTRUCTION FOR DELETING A HANDOUT
(ADDRESS, CONFERENCE ID, USER ID OF AN ADMINISTRATOR)

[Fig. 9E]

· OBTAINING STATUS
■REQUEST

INSTRUCTION FOR OBTAINING A STATUS
(ADDRESS, CONFERENCE ID, USER ID OF AN ADMINISTRATOR)

| NUMBER | USER ID | PASSWORD | NAME | ... |
|---|---|---|---|---|
| 001 | A | 1234 | gotoh | ... |
| 002 | B | 5678 | ishida | ... |
| ... | ... | ... | ... | ... |

[Fig. 17]

| USER ID | CONFERENCE ID |
|---|---|
| A | CONFERENCE A |
| B | CONFERENCE A |
| C | CONFERENCE B |
| D | CONFERENCE B |
| E | CONFERENCE B |
| F | – |
| ⋮ | ⋮ |

FIG. 19

| OOO Conference Center | CONFERENCE PREPARATION/CREATE CONFERENCE | | |
|---|---|---|---|
| ADMINISTRATION TOOL | ODETAIL INFORMATION OF CONFERENCE IS DISPLAYED. | | |
| ADMINISTRATOR | INFORMATION | | |
| LOG-OUT | CONFERENCE ID | 1234-123456 | |
| | CONFERENCE NAME | RE: MEDICAL EQUIPMENT IN THE NEXT GENERATION | |
| CONFERENCE PREPARATION | CONFERENCE STATE | NOT STARTED YET | |
| CONFERENCE LIST | CONFERENCE SUMMARY | THERE HAS BEEN ADVANCEMENT IN VARIOUS TECHNOLOGIES OF OBTAINING INFORMATION OF LIVING BODY IN A LESS-INVASIVE OR NON-INVASIVE METHOD... | |
| CREATE CONFERENCE | STARTING DATE AND TIME | 2017/4/19 9:00 | |
| REGISTER QUESTIONNAIRE | ENDING DATE AND TIME | 2017/4/19 10:00 | |
| | TAKING OUT OF HANDOUT | ALLOWED | |
| SYSTEM SETTING | EDIT INFORMATION | | |
| SYSTEM SETTING | PRESENTER INFORMATION | | |
| USER MANAGEMENT | PRESENTING USER | PRESENTER NAME | AFFILIATION |
| | koike | koike | PROCESSOR AT UNIVERSITY OF SCIENCE AND TECHNOLOGY |
| CONFERENCE ASSIST | EDIT PRESENTER | | |
| CLIENT CONTROL | HANDOUT | | |
| DISPLAY STATUS | HANDOUT NAME | NOTE | ALLOWANCE FOR TAKING OUT |
| QUESTIONS MANAGEMENT | PRESENTATION HANDOUT | | ALLOWED |
| OUTPUT RESULT | REFERENCE HANDOUT | | NOT ALLOWED |
| | EDIT HANDOUT | | |
| | VOTING ITEM | | |
| | VOTING ITEM NAME | QUESTION FOR VOTING | GRAPH SELECTABLE NUMBER |
| | RE: IMPRESSION OF MEDICAL EQUIPMENT | WHAT IS YOUR BIGGEST CONCERN WHEN CONSIDERING INSTALLATION OF MEDICAL EQUIPMENT? | PIE 3 |
| | IMPRESSION AFTER CONFERENCE | DID YOUR IMPRESSION TO MEDICAL EQUIPMENT CHANGE AFTER THIS CONFERENCE? | BAR 1 |
| | EDIT VOTING ITEM | | |
| | CONFERENCE LIST | | |

ADD HANDOUT

○ YOU CAN ADD A NEW HANDOUT. PLEASE ENTER INFORMATION OF A HANDOUT

| NEW FILE | SELECT FILE | NOT SELECTED |
| HANDOUT NAME | REQUIRED | |
| CONFERENCE SUMMARY | | |
| TAKING OUT OF HANDOUT | ⦿ ALLOWED ○ NOT ALLOWED | |

[SAVE]  [CANCEL]

CONFERENCE INFORMATION

| CON-FERENCE ID | CONFERENCE NAME | PRE-SENTER | ALLOWANCE FOR TAKING OUT OF HANDOUT OF CONFERENCE | HANDOUT ID | HANDOUT DATA | ALLOWANCE FOR TAKING OUT |
|---|---|---|---|---|---|---|
| CON-FERENCE A | RE: MEDICAL EQUIPMENT IN THE NEXT GENERATION | A | ALLOWED | xxx | PRESENTATION HANDOUT.pdf | ALLOWED |
| | | | | yyy | REFERENCE HANDOUT.pdf | NOT ALLOWED |
| CON-FERENCE B | RE: ECONOMY OF JAPAN | B | NOT ALLOWED | zzz | ECONOMY SEMINAR.pdf | NOT ALLOWED |
| | | | | sss | HANDOUT1.pdf | NOT ALLOWED |
| ... | | | | | | |

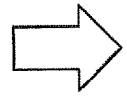

IN A CASE WHERE THE SETTING OF "ALLOWANCE FOR TAKING OUT OF HANDOUT OF CONFERENCE" IS "NOT ALLOWED", "ALLOWANCE FOR TAKING OUT" WITH RESPECT TO ALL HANDOUT DATA BECOMES "NOT ALLOWED".

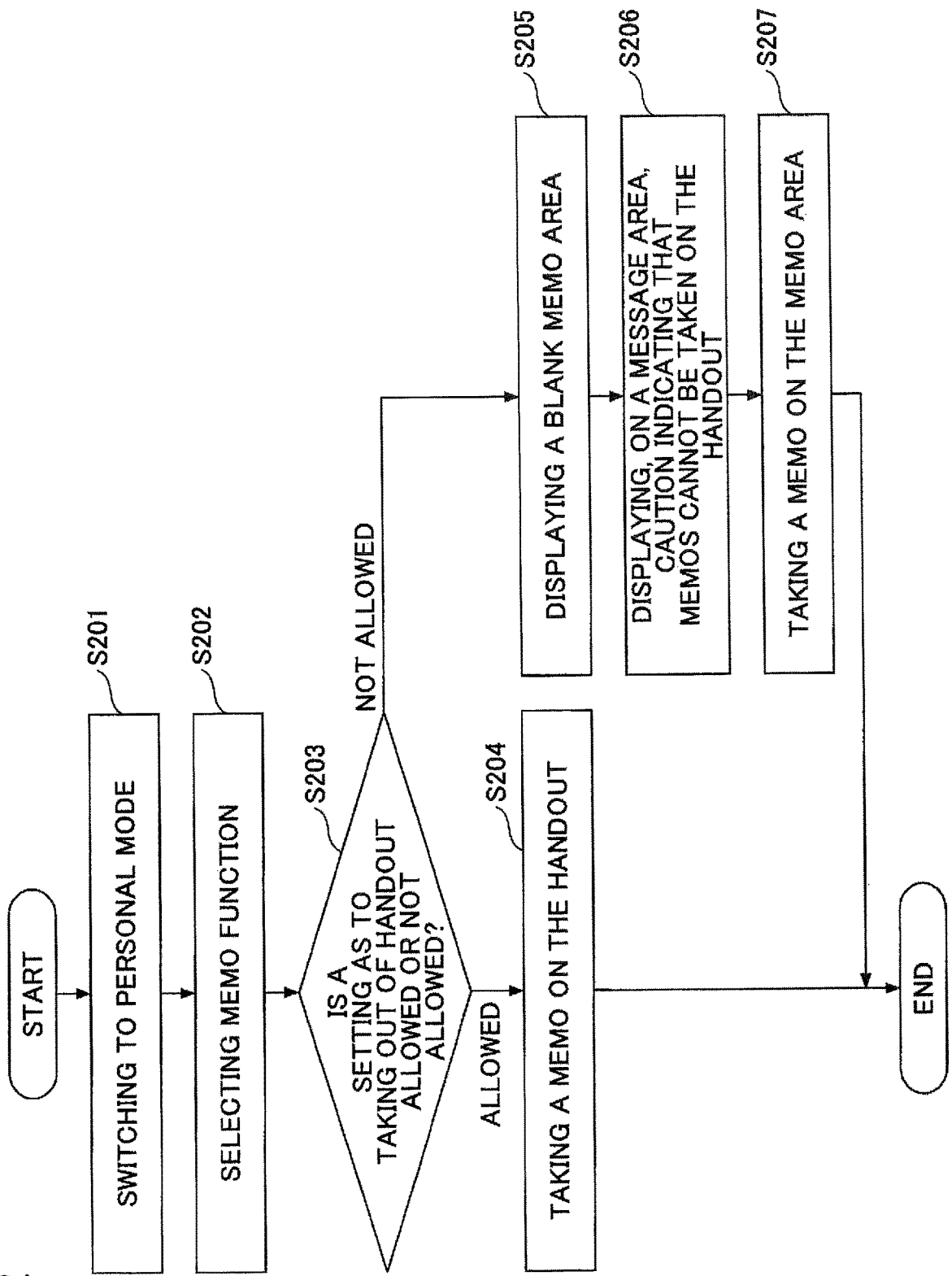

FIG.24

| HANDOUT ID | PAGE NUMBER | PEN COLOR | PEN SIZE | STROKE COORDINATES |
|---|---|---|---|---|
| xxx | 3 | red | normal | (110 110, 120 120, 130 130, 140 140) |
| xxx | 3 | red | normal | (122 122, 142 142, 152 152) |
| xxx | 3 | black | small | (190 190, 200 200, 210 210, 220 220) |
| yyy | 5 | blue | big | (121 121, 131 131, 141 141, 151 151, 151 151, 161 161, 171 171, 181 181) |
| yyy | 5 | blue | big | (155 155, 165 165, 175 175, 185 185, 185 185, 195 195, 205 205, 215 215) |
| ... | ... | ... | ... | ... |

| HANDOUT ID | PAGE | OPERATION | STARTING TIME – ENDING TIME | DETAILED DATA |
|---|---|---|---|---|
| xxx | 3 | VIEW | 10:15:20 – 10:17:15 | |
| xxx | 3 | ZOOM IN | 10:20:05 – 10:21:05 | (COORDINATES OF DISPLAYED AREA) |
| xxx | 3 | MEMO | 10:21:10 – 10:24:52 | (STROKE DATA) |
| xxx | 5 | ZOOM IN | 10:25:10 – 10:25:43 | |
| yyy | 10 | VIEW | 11:05:20 – 11:07:15 | |
| yyy | 10 | ZOOM IN | 11:10:05 – 11:11:05 | (COORDINATES OF DISPLAYED AREA) |
| yyy | 10 | MEMO | 11:11:10 – 11:14:52 | (STROKE DATA) |

FIG.30

| USER ID | CONFERENCE ID | HANDOUT ID | PAGE | OPERATION | STARTING TIME – ENDING TIME | DETAILED DATA |
|---|---|---|---|---|---|---|
| aaa | CONFERENCE A | xxx | 3 | VIEW | 10:15:20 – 10:17:15 | |
| aaa | CONFERENCE A | xxx | 3 | ZOOM IN | 10:20:05 – 10:21:05 | (COORDINATES OF DISPLAYED AREA) |
| aaa | CONFERENCE A | xxx | 3 | MEMO | 10:21:10 – 10:24:52 | (STROKE DATA) |
| aaa | CONFERENCE A | xxx | 5 | ZOOM IN | 10:25:10 – 10:25:43 | |
| bbb | CONFERENCE A | xxx | 3 | VIEW | 11:05:20 – 11:07:15 | |
| bbb | CONFERENCE A | xxx | 3 | ZOOM IN | 11:10:05 – 11:11:05 | (COORDINATES OF DISPLAYED AREA) |
| bbb | CONFERENCE A | xxx | 3 | MEMO | 11:11:10 – 11:14:52 | (STROKE DATA) |

FIG.31

| | | | | | | | | ☐ DISPLAY ONLY MEMOS | |
|---|---|---|---|---|---|---|---|---|---|
| CONFERENCE A ▶ | | HANDOUT A ▶ | | | | | | | |
| PAGE | 1 | 2 | 3 | 4 | 5 | 6 | 7 | | |
| 1502 | | | | | | | | | |
| TOTAL | 1200 | 800 | 2400 | 1500 | 850 | 5500 | 4800 | | |
| NUMBER OF MEMOS | 7 | 1 | 12 | 28 | 1 | 25 | 36 | | |
| TARO YAMADA | 5 1505 | 5 | | | | | 5 | | |
| JIRO SUZUKI 1501 | | | | 50 | | 20 | | | |
| TAKASHI TAKAHASHI | 20 | | 20 | | 40 | | | | |
| NAO TANAKA | | 20 | | | | 30 1504 | | | |
| HITOSHI WATANABE | 30 | | 30 | | | | | | |
| KEN YAMAMOTO | | 30 | | 80 ⟋ | | | | | |
| KAZUHITO SATO | | | 40 ⟋ | | 80 ⟋ 1503 | | 40 | | |
| YOSUKE KOBAYASHI | | | | | | | | | |
| AKIHISA KATO | 80 | | | | | | | | |
| KOSAKU YOSHIDA | | | | 120 ⟋ | | | | | |
| TATSUYA MATSUMOTO | 40 ⟋ | | | | | | 80 | | |

QUESTIONING ITEM INFORMATION

| QUESTION ID | QUESTION |
|---|---|
| 1234 | "DID X SUCCEED OR FAIL?" |
| 1235 | "WHAT IS THE WEATHER TOMORROW?" |
| 1236 | "WHAT IS THE INFLUENCE OF Y?" |
| .... | .... |

FIG.36

CONFERENCE INFORMATION

| CONFERENCE ID | CONFERENCE NAME | ORGANIZER ID | HANDOUT |
|---|---|---|---|
| 000001 | "MARKETING SEMINAR" | Y0120 | "INTRODUCTION TO MARKETING.pdf" |
| 000002 | "RE: ECONOMY OF JAPAN" | B0001 | "ECONOMY SEMINAR.pdf", "HANDOUT1.pdf" |
| 000003 | "INTRODUCTION TO NETWORK" | G0010 | "FUNDAMENTALS OF NETWORK.pdf" |
| ..... | ..... | ..... | ..... |

[Fig. 37]

ROLE INFORMATION

| CONFERENCE ID | USER ID | ROLE |
|---|---|---|
| 000001 | A0001 | "PARTICIPANT" |
| 000002 | B0001 | "ORGANIZER" |
| 000003 | B0002 | "PARTICIPANT" |
| 000002 | C0003 | "PARTICIPANT" |
| 000002 | D0005 | "PRESENTER" |
| .... | .... | .... |

[Fig. 38]

USER INFORMATION

| USER ID | PASSWORD |
|---|---|
| A0001 | "******" |
| B0001 | "******" |
| B0002 | "******" |
| C0003 | "******" |
| D0005 | "******" |
| .... | .... |

FIG.39

QUESTION INFORMATION

| CONFERENCE ID | QUESTION ID | QUESTION | SELECT |
|---|---|---|---|
| 000001 | 3947 | "HOW CAN WE TAKE ADVANTAGE OF BIG DATA?" | SELECTED |
| 000002 | 1234 | "DID X SUCCEED OR FAIL?" | SELECTED |
| 000002 | 1235 | "WHAT IS THE WEATHER TOMORROW?" | - |
| 000003 | 8210 | "WHAT IS THE POINT OF TRANSITION TO CLOUD?" | SELECTED |
| 000002 | 1236 | "WHAT IS THE INFLUENCE OF Y?" | SELECTED |
| ..... | .... | ".... | .... |

FIG.41

PLEASE REGISTER A CONFERENCE.

CONFERENCE NAME: RE: ECONOMY OF JAPAN

ORGANIZER: B0001

HANDOUT OF CONFERENCE: ECONOMY SEMINAR.pdf
HANDOUT1.pdf

REGISTER

| HEADER | BODY |
|---|---|
| "InputQuestion" | {Q="DID X SUCCEED OR FAIL?"} |

[Fig. 46]

| HEADER | BODY |
|---|---|
| "CandidateQuestion" | {QID="1234"}{Q="DID X SUCCEED OR FAIL?"} |

PLEASE SELECT A QUESTION TO DISPLAY.

| DID X SUCCEED OR FAIL? | WHAT IS THE WEATHER TOMORROW? | WHAT IS THE INFLUENCE OF Y? | HOW BIG IS THE ECONOMIC EFFECT OF Z? |

● ○ ● ●

4701

SEND

| HEADER | BODY |
|---|---|
| "SelectedQuestion" | {QID="1234"}{QID="2345"}{QID="3456"} |

FIG.49

| HEADER | BODY |
|---|---|
| "PushQuestion" | [{Q="DID X SUCCEED OR FAIL?"}{Q="WHAT IS THE INFLUENCE OF Y?"} {Q="HOW BIG IS THE ECONOMIC EFFECT OF Z?"}] |

[Fig. 51]

| HEADER | BODY |
|---|---|
| "InputQuestion" | {UID="C0003"}{Q="DID X SUCCEED OR FAIL?"} |

FIG.52

QUESTION INFORMATION

| CONFERENCE ID | QUESTION ID | USER ID | QUESTION |
|---|---|---|---|
| 000001 | 3947 | A0011 | "HOW CAN WE TAKE ADVANTAGE OF BIG DATA?" |
| 000002 | 1234 | C0003 | "DID X SUCCEED OR FAIL?" |
| 000002 | 1235 | D0005 | "WHAT IS THE WEATHER TOMORROW?" |
| 000003 | 8210 | B0002 | "WHAT IS THE POINT OF TRANSITION TO CLOUD?" |
| 000002 | 1236 | E0012 | "WHAT IS THE INFLUENCE OF Y?" |
| ..... | ..... | ..... | ..... |

[Fig. 53]

| HEADER | BODY |
|---|---|
| "InputQuestion" | {Date="201608051030"}{Q="DID X SUCCEED OR FAIL?"} |

FIG.54

QUESTION INFORMATION

| CONFERENCE ID | QUESTION ID | QUESTION SENDING DATE AND TIME | QUESTION |
|---|---|---|---|
| 000001 | 3947 | 20160805094 5 | "HOW CAN WE TAKE ADVANTAGE OF BIG DATA?" |
| 000002 | 1234 | 20160805103 0 | "DID X SUCCEED OR FAIL?" |
| 000002 | 1235 | 20160805103 5 | "WHAT IS THE WEATHER TOMORROW?" |
| 000003 | 8210 | 20160805112 3 | "WHAT IS THE POINT OF TRANSITION TO CLOUD?" |
| 000002 | 1236 | 20160805103 8 | "WHAT IS THE INFLUENCE OF Y?" |
| ..... | ..... | ..... | ..... |

FIG.55

| HEADER | BODY |
|---|---|
| "InputQuestion" | [UID="C0003"][Date="201608051030"][Q="DID X SUCCEED OR FAIL?"] |

FIG.56

QUESTION INFORMATION

| CONFERENCE ID | QUESTION ID | USER ID | QUESTION SENDING DATE AND TIME | QUESTION |
|---|---|---|---|---|
| 000001 | 3947 | A0011 | 20160805 0945 | "HOW CAN WE TAKE ADVANTAGE OF BIG DATA?" |
| 000002 | 1234 | C0003 | 20160805 1030 | "DID X SUCCEED OR FAIL?" |
| 000002 | 1235 | D0005 | 20160805 1035 | "WHAT IS THE WEATHER TOMORROW?" |
| 000003 | 8210 | B0002 | 20160805 1123 | "WHAT IS THE POINT OF TRANSITION TO CLOUD?" |
| 000002 | 1236 | E0012 | 20160805 1038 | "WHAT IS THE INFLUENCE OF Y?" |
| ..... | ..... | ..... | ..... | ..... |

| HEADER | BODY |
|---|---|
| "RequestQuestion" | {CID="C0003"}{mode="time"} |

[Fig. 61B]

| HEADER | BODY |
|---|---|
| "RequestQuestion" | {CID="C0003"}{mode="user", "C0003"} |

| HEADER | BODY |
|---|---|
| "ResultQuestion" | [mode="time"][{"201608051030","DID X SUCCEED OR FAIL?"}, {"201608051035","WHAT IS THE WEATHER TOMORROW?"}, {"201608051038","WHAT IS THE INFLUENCE OF Y?"}, {"201608051049","HOW BIG IS THE ECONOMIC EFFECT OF Z?"}] |

| HEADER | BODY | |
|---|---|---|
| "ResultQuestion" | [mode="user", "C0003"]{"DID X SUCCEED OR FAIL?"} | ["WHAT IS EXPECTED TO HAPPEN REGARDING TOPIC B?"] |

FIG.63

QUESTION HISTORY

CONFERENCE ID  000002

DISPLAY METHOD  CHRONOLOGICAL ORDER

| | | |
|---|---|---|
| 2016/8/5 10:30 | DID X SUCCEED OR FAIL? | SELECTED |
| 2016/8/5 10:35 | WHAT IS THE WEATHER TOMORROW? | NOT SELECTED YET |
| 2016/8/5 10:38 | WHAT IS THE INFLUENCE OF Y? | SELECTED |
| 2016/8/5 10:49 | HOW BIG IS THE ECONOMIC EFFECT OF Z? | SELECTED |

FIG.64

QUESTION HISTORY

CONFERENCE ID   000002

DISPLAY METHOD   SPECIFIED USER: C0003

DID X SUCCEED OR FAIL?

WHAT IS EXPECTED TO HAPPEN REGARDING TOPIC B?

[Fig. 66A]
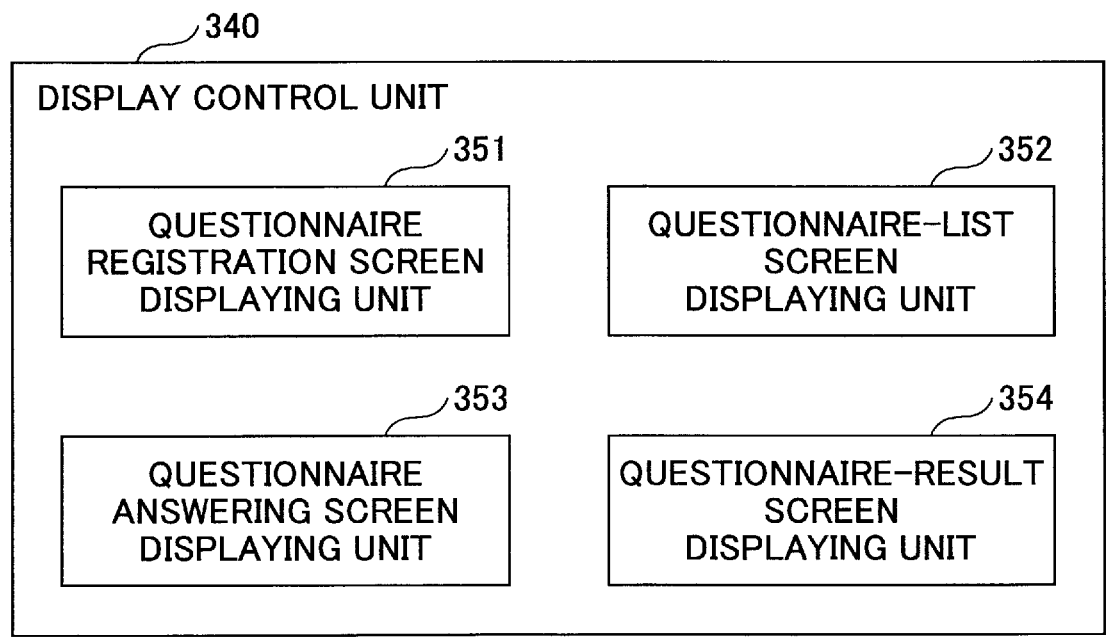
[Fig. 66B]
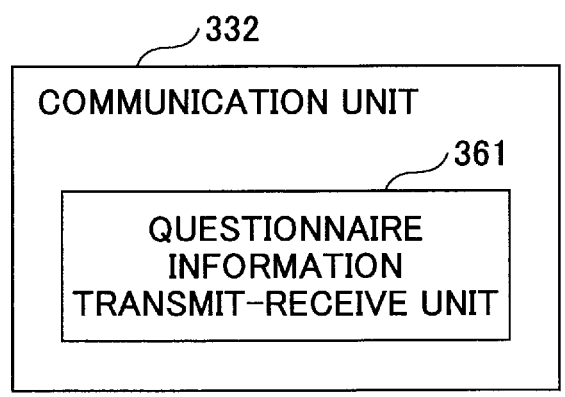

[Fig. 66C]
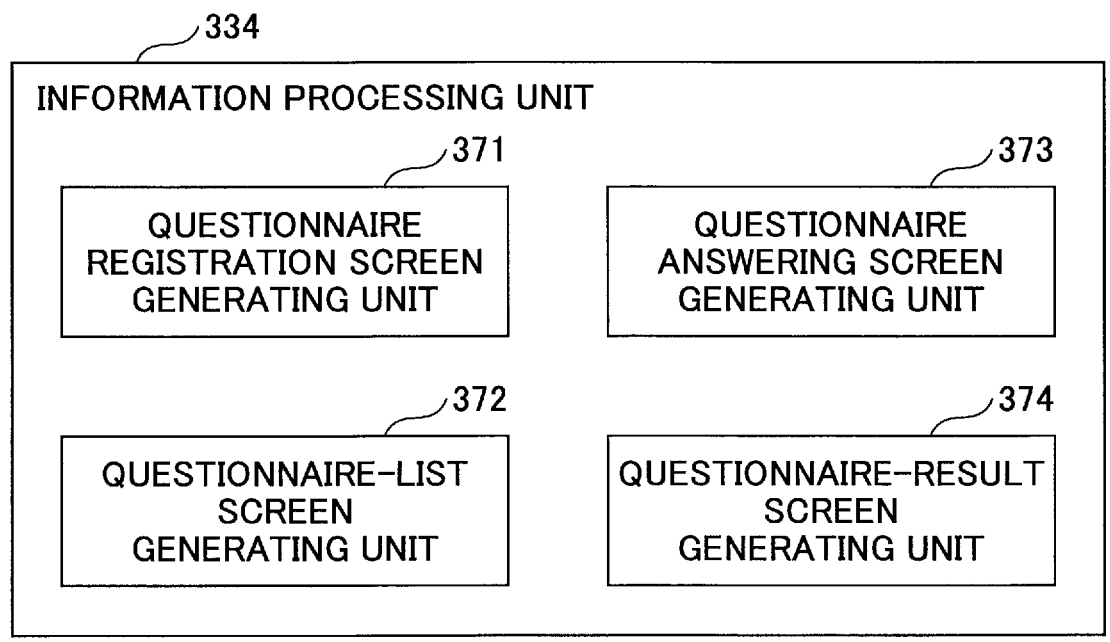
[Fig. 66D]
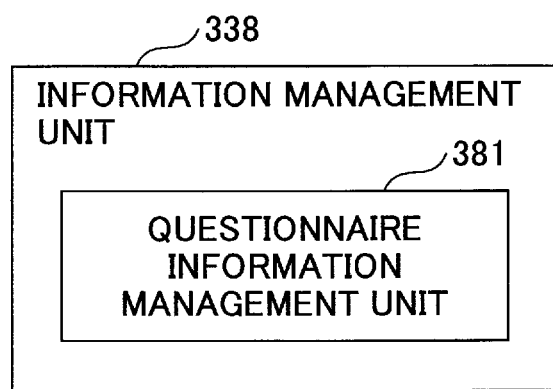

[Fig. 67A]
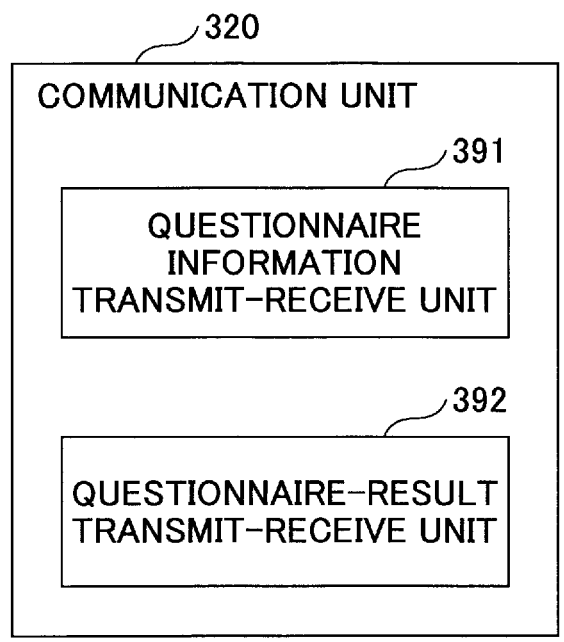
[Fig. 67B]
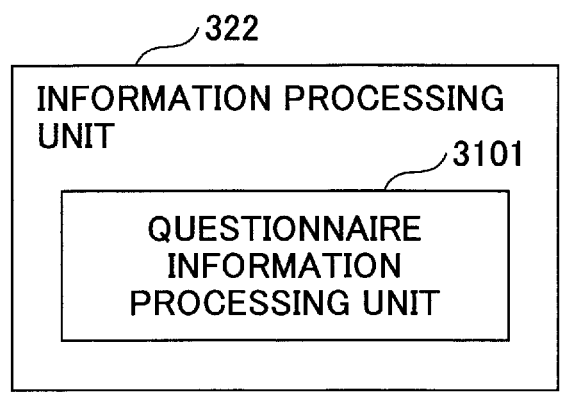

FIG.68

| CON-FER-ENCE ID | QUES-TION-NAIRE ID | QUESTION-NAIRE TITLE | QUESTION | OPTION | SELEC-TABLE NUM-BER | DISPLAY METHOD | USER WHO CAN CONDUCT | STATUS |
|---|---|---|---|---|---|---|---|---|
| xxxx-aaaaaa | A001 | RESEARCH ON CELEBRITY | WHICH CELEBRITY DO YOU LIKE? | MR. A, MR. B, MR. C, MR. D | 1 | PIE | USER A | BEING CONDUCTED |
| yyyy-bbbbbb | A002 | RESEARCH ON HEALTH | WHAT DO YOU DO FOR YOUR HEALTH? | DIETARY MANAGEMENT, EXERCISE, OTHERS | 1 | BAR | ANY | NOT CONDUCTED YET |
| zzzz-cccccc | A003 | RESEARCH ON TRAVEL | WHICH COUNTRY DID YOU WANT TO VISIT? | JAPAN, AMERICA, BRITAIN, RUSSIA, OTHERS | 2 | PIE | USER B | CONDUCTED |
| ... | ... | ... | ... | ... | ... | ... | ... | ... |

FIG.69

| QUESTIONNAIRE ID | REFERENCE IMAGE URL | REFERENCE ID | PAGE NUMBER | REFERENCE URL |
|---|---|---|---|---|
| A001 | https://xxx/abc.img | 1 | 3 | https://xxx/jkl.htm |
| A002 | N/A | N/A | N/A | https://xxx/mno.pdf |
| A003 | https://xxx/ghi.img | 3 | 10 | N/A |
| ... | ... | ... | ... | ... |

FIG. 70

CONFERENCE MANAGEMENT/REGISTER NEW CONFERENCE ~7000

● PLEASE ENTER INFORMATION OF A CONFERENCE TO BE REGISTERED.

INFORMATION

| | | |
|---|---|---|
| CONFERENCE NAME | [REQUIRED] | |
| STARTING DATE AND TIME | [REQUIRED] [REQUIRED] | |
| NOTE | | |
| PASSWORD TO JOIN | | RE-ENTER |
| RELEVANT KAY | | RE-ENTER |
| CONFERENCE NAME ON CONFERENCE LIST | ⊙ DISPLAYED ○ NOT DISPLAYED | |
| PROHIBITION OF CHANGING PRESENTERS | NOT PROHIBITED | |
| DESIGNATING PRESENTING USER | SETTING CAN BE CHANGE ONLY WHEN THE RELEVANT KEY IS ENTERED. [ADD/EDIT USER] | |
| DOWNLOAD OF HANDOUT | ⊙ ALLOWED ○ NOT ALLOWED | |

HANDOUT/QUESTIONNAIRE

[ADD HANDOUT] [ADD QUES-TIONNAIRE] [MODIFY] [DELETE]

~7001

[SAVE]

CONFERENCE APPLICATION

[LOG-IN]

CONFERENCE TO HAVE/JOIN

[TODAY'S CONFERENCE]

CONFERENCE MANAGEMENT

[CONFERENCE LIST]

[+ REGISTER NEW CONFERENCE]

OTHERS

[HELP]

[ABOUT APPLICATION]

FIG.71

CONFERENCE MANAGEMENT/REGISTER NEW CONFERENCE — 7000

● PLEASE ENTER INFORMATION OF A CONFERENCE TO BE REGISTERED INFORMATION

CONFERENCE NAME — REQUIRED
STARTING DATE AND TIME — REQUIRED REQUIRED

ADD QUESTIONNAIRE — 7100

| TITLE | SAMPLE |
| EXPLANATION | A SAMPLE QUESTIONNAIRE IS CONDUCTED |
| SELECTABLE NUMBER | 1 ▶ |
| OPTION | TOKYO |
| | + |

CANCEL    SAVE — 7101

CONFERENCE APPLICATION
- LOG-IN

CONFERENCE TO HAVE/JOIN
- TODAY'S CONFERENCE

CONFERENCE MANAGEMENT
- CONFERENCE LIST
- + REGISTER NEW CONFERENCE

OTHERS
- HELP
- ABOUT APPLICATION

FIG.72

CONFERENCE MANAGEMENT/REGISTER NEW CONFERENCE — 7000

● PLEASE ENTER INFORMATION OF A CONFERENCE TO BE REGISTERED.

INFORMATION

| Field | Value |
|---|---|
| CONFERENCE NAME | REQUIRED |
| STARTING DATE AND TIME | REQUIRED REQUIRED |
| NOTE | |
| PASSWORD TO JOIN | [ ] RE-ENTER |
| RELEVANT KAY | [ ] RE-ENTER |
| CONFERENCE NAME ON CONFERENCE LIST | ⊙ DISPLAYED  ○ NOT DISPLAYED |
| PROHIBITION OF CHANGING PRESENTERS | NOT PROHIBITED |
| DESIGNATING PRESENTING USER | ADD/EDIT USER  (SETTING CAN BE CHANGE ONLY WHEN THE RELEVANT KEY IS ENTERED.) |
| DOWNLOAD OF HANDOUT | ⊙ ALLOWED  ○ NOT ALLOWED |

HANDOUT/QUESTIONNAIRE

- ⊙ QUESTIONNAIRE1
- ○ HANDOUT1
- ○ QUESTIONNAIRE2

[ADD HANDOUT] [ADD QUESTIONNAIRE] [MODIFY] 7201 [DELETE] 7202

[SAVE]

7200

CONFERENCE APPLICATION

- LOG-IN
- CONFERENCE TO HAVE/JOIN
- TODAY'S CONFERENCE
- CONFERENCE MANAGEMENT
- CONFERENCE LIST
- + REGISTER NEW CONFERENCE
- OTHERS
- HELP
- ABOUT APPLICATION

FIG.73

| PLEASE ENTER QUESTIONNAIRE TITLE | |
|---|---|
| PLEASE ENTER EXPLANATION | |
| SELECTABLE NUMBER | 1 |
| OPTION | |
| ⊖ TOKYO | |
| ⊖ AICHI | |
| + | |

START

Q. WHICH CELEBRITY DO YOU LIKE?

7800

MR. A
MR. B
MR. C
MR. D

REFERENCE INFORMATION

THANK YOU FOR ANSWERING. ANSWERS ARE CURRENTLY BEING COLLECTED.
PLEASE WAIT FOR A MINUTE.

FIG.79

| RE-SULT ID | QUES-TION-NAIRE ID | OPTION: A NUMBER OF PEOPLE | OPTION: A VOTERS | OPTION: B NUMBER OF PEOPLE | OPTION: B VOTERS | OPTION: C NUMBER OF PEOPLE | OPTION: C VOTERS | OPTION: D NUMBER OF PEOPLE | OPTION: D VOTERS |
|---|---|---|---|---|---|---|---|---|---|
| R001 | A001 | 30 | USER 1 ... USER 30 | 40 | USER 31 ... USER 70 | 25 | USER 71 ... USER 95 | 60 | USER 96 ... USER 155 |

SYSTEM AND METHOD FOR CONFERENCING WHICH DISPLAYS QUESTIONS

CROSS-REFERENCE TO RELATED APPLICATIONS

The present application is a continuation application of U.S. patent application Ser. No. 16/339,855, filed on Apr. 5, 2019 with the U.S. Patent and Trademark Office, which is a national phase application of International Application PCT/JP2017/037062 filed on Oct. 12, 2017, and designated the U.S., which claims priority based on Japanese priority application No. 2017-181109 filed on Sep. 21, 2017, with the Japanese Patent Office, Japanese application No. 2017-168503 filed on Sep. 1, 2017, with the Japanese Patent Office, Japanese application No. 2016-202831 filed on Oct. 14, 2016, with the Japanese Patent Office, Japanese application No. 2016-202830 filed on Oct. 14, 2016, with the Japanese Patent Office, and Japanese application No. 2016-202785 filed on Oct. 14, 2016, with the Japanese Patent Office. The entire contents of each of the foregoing applications are incorporated herein by reference.

BACKGROUND OF THE INVENTION

Technical Field

The present invention relates to an information processing system, an information processing apparatus, and a screen-sharing terminal controlling method.

Background Art

In recent years, there has been growing use of an electronic conference system, such as a paperless conference system using digitalized handouts, which is displayed on a terminal such as a tablet terminal and a laptop personal computer (PC) used by a participant at a conference or a seminar. In such an electronic conference system, a conference or a seminar can be conducted more effectively if a displayed page and memos of a terminal used by a presenter are synchronized on terminals used by participants.

For example, there is a display-sharing service providing system known in the art, in which information processing apparatuses prepare common display content in advance and transmit and receive information indicative of operations entered by users, so that the information processing apparatuses can share, by use of a small amount of data, a displayed screen that is updated based on the entered operation (see PTL 1, for example).

CITATION LIST

Patent Literature

[PTL 1] Japanese Unexamined Patent Application Publication No. 2015-103131
[PTL 2] Japanese Unexamined Patent Application Publication No. 2005-115718
[PTL 2] Japanese Unexamined Patent Application Publication No. 2016-27459

SUMMARY OF THE INVENTION

Technical Problem

In the conventional electronic conference system that transmits and receives information indicative of operations, a handout to be used needs to be downloaded to a terminal before a conference or a seminar (hereinafter simply referred to as a conference) is started. To download a handout to a terminal, a participant needs to operate the terminal by him/herself or an organizer of the conference needs to directly operate the terminal of the participant. Further, in addition to downloading, the same is true for operations such as joining a conference, leaving a conference, or replacing a handout.

However, when asking participants to enter such operations, an organizer of the conference may have needed to give explanation about how to operate the terminal to participants who participate in a conference for the first time, which is troublesome to the organizer. Further, in a case where an organizer of a conference directly operates participants' terminals to enter such operations, a burden for the organizer of the conference is increased with the number of handouts or the number of participants.

The embodiments of the present invention are provided in view of the above problem, and therefore aim to provide an information processing system for controlling a screen-sharing terminal to perform a process based on an instruction provided from an administrator terminal.

Solution to Problem

As a solution to the above problem, one aspect of the present invention provides an information processing system including: an information processing apparatus configured to manage sharing of a screen performed by a plurality of screen-sharing terminals coupled communicably to the information processing apparatus; and an administrator terminal configured to have administrative authority and to be coupled to the information processing apparatus via a network. The information processing apparatus includes an information management unit configured to manage information related to the plurality of screen-sharing terminals coupled communicably to the information processing apparatus, and an instruction delivery unit configured to deliver, to an instruction destination, an instruction transmitted from the administrator terminal, the instruction causing the plurality of screen-sharing terminals to perform a process. The administrator terminal includes an accepting unit configured to accept an operation from a user to select, as the instruction destination, at least one screen-sharing terminal from among the plurality of screen-sharing terminals coupled communicably to the information processing apparatus and to select a process to be performed by the selected at least one screen-sharing terminal, and a communication control unit configured to transmit, to the information processing apparatus, an instruction for causing the at least one screen-sharing terminal to perform the process selected by the user, the at least one screen-sharing terminal having been selected as the instruction destination by the user.

Advantageous Effects of Invention

According to the embodiments of the present invention, a burden for an organizer of a conference, etc., may be reduced, as a screen-sharing terminal is controlled to perform a process based on an operation provided from an administrator terminal.

BRIEF DESCRIPTION OF THE DRAWINGS

FIG. 9A is a configuration diagram illustrating an example of a message issued by an administration tool, according to an embodiment of the present invention;

FIG. 9B is a configuration diagram illustrating an example of the message issued by an administration tool, according to an embodiment of the present invention;

FIG. 9C is a configuration diagram illustrating an example of the message issued by an administration tool, according to an embodiment of the present invention;

FIG. 9D is a configuration diagram illustrating an example of the message issued by an administration tool, according to an embodiment of the present invention;

FIG. 9E is a configuration diagram illustrating an example of the message issued by an administration tool, according to an embodiment of the present invention;

FIG. 13 is a configuration diagram illustrating an example of user information, according to an embodiment of the present invention;

FIG. 17 is a configuration diagram illustrating an example of session information, according to an embodiment of the present invention;

FIG. 19 is an image diagram illustrating an example of a screen of an administration tool, according to an embodiment of the present invention;

FIG. 20 is an image diagram illustrating an example of a screen for registering handout data, according to an embodiment of the present invention;

FIG. 21 is a configuration diagram illustrating an example of conference information provided, as parameters, with settings as to whether taking out of handout data is allowed or not allowed, according to an embodiment of the present invention;

FIG. 22 is a flowchart illustrating an example of a process for a participant, other than a presenter, to use a memo function during a conference, according to an embodiment of the present invention;

FIG. 24 is a configuration diagram illustrating an example of memo data of memos taken by use of a memo function during a conference, according to an embodiment of the present invention;

FIG. 29 is a configuration diagram illustrating an example of an operation log recorded by a participant terminal, according to an embodiment of the present invention;

FIG. 30 is a configuration diagram illustrating an example of an operation log saved in a conference server device, according to an embodiment of the present invention;

FIG. 31 is an image diagram illustrating an example of a screen displaying an aggregated operation log, according to an embodiment of the present invention;

FIG. 35 is a configuration diagram illustrating an example of questioning item information, according to a variation of an embodiment of the present invention;

FIG. 36 is a configuration diagram illustrating an example of conference information, according to a variation of an embodiment of the present invention;

FIG. 37 is a configuration diagram illustrating an example of role information, according to a variation of an embodiment of the present invention;

FIG. 38 is a configuration diagram illustrating an example of user information, according to a variation of an embodiment of the present invention;

FIG. 39 is a configuration diagram illustrating an example of question information, according to a variation of an embodiment of the present invention;

FIG. 41 is an image diagram illustrating an example of a conference creating screen, according to a variation of an embodiment of the present invention;

FIG. 45 is a configuration diagram illustrating an example of a question sending message, according to a variation of an embodiment of the present invention;

FIG. 46 is a configuration diagram illustrating an example of a question forwarding message, according to a variation of an embodiment of the present invention;

FIG. 47 is an image diagram illustrating an example of a question selecting screen, according to a variation of an embodiment of the present invention;

FIG. 48 is a configuration diagram illustrating an example of a selection information transmitting message, according to a variation of an embodiment of the present invention;

FIG. 49 is a configuration diagram illustrating an example of a selected question sending message, according to a variation of an embodiment of the present invention;

FIG. 51 is a configuration diagram illustrating another example of a question sending message, according to a variation of an embodiment of the present invention;

FIG. 52 is a configuration diagram illustrating another example of question information, according to a variation of an embodiment of the present invention;

FIG. 53 is a configuration diagram illustrating another example of a question sending message, according to a variation of an embodiment of the present invention;

FIG. 54 is a configuration diagram illustrating another example of question information, according to a variation of an embodiment of the present invention;

FIG. 55 is a configuration diagram illustrating another example of a question sending message, according to a variation of an embodiment of the present invention;

FIG. 56 is a configuration diagram illustrating another example of question information, according to a variation of an embodiment of the present invention;

FIG. 61A is a configuration diagram illustrating an example of a question-list obtainment requesting message, according to a variation of an embodiment of the present invention;

FIG. 61B is a configuration diagram illustrating an example of a question-list obtainment requesting message, according to a variation of an embodiment of the present invention;

FIG. 62A is a configuration diagram illustrating an example of a question history transmitting message, according to a variation of an embodiment of the present invention;

FIG. 62B is a configuration diagram illustrating an example of a question history transmitting message, according to a variation of an embodiment of the present invention;

FIG. 63 is an image diagram illustrating an example of a question history screen, according to a variation of an embodiment of the present invention;

FIG. 64 is an image diagram illustrating another example of a question history screen, according to a variation of an embodiment of the present invention;

FIG. 66A is a functional block diagram illustrating an example of a display control unit of a client terminal, according to a variation of an embodiment of the present invention;

FIG. 66B is a functional block diagram illustrating an example of a communication unit of a client terminal, according to a variation of an embodiment of the present invention;

FIG. 66C is a functional block diagram illustrating an example of an information processing unit of a client terminal, according to a variation of an embodiment of the present invention;

FIG. 66D is a functional block diagram illustrating an example of an information management unit of a client terminal, according to a variation of an embodiment of the present invention;

FIG. 67A is a functional block diagram illustrating an example of a communication unit of a conference server device, according to a variation of an embodiment of the present invention;

FIG. 67B is a functional block diagram illustrating an example of an information processing unit of a conference server device, according to a variation of an embodiment of the present invention;

FIG. 68 is a configuration diagram illustrating an example of questionnaire information, according to a variation of an embodiment of the present invention;

FIG. 69 is a configuration diagram illustrating an example of reference information associated with a questionnaire, according to a variation of an embodiment of the present invention;

FIG. 70 is an image diagram illustrating an example of a screen for registering and editing a questionnaire through an administrator terminal, according to a variation of an embodiment of the present invention;

FIG. 71 is an image diagram illustrating an example of a screen for registering and editing a questionnaire through an administrator terminal, according to a variation of an embodiment of the present invention;

FIG. 72 is an image diagram illustrating an example of a screen for registering and editing a questionnaire through an administrator terminal, according to a variation of an embodiment of the present invention;

FIG. 73 is an image diagram illustrating an example of a screen for registering and editing a questionnaire through an organizer terminal, according to a variation of an embodiment of the present invention;

FIG. 78 is an image diagram illustrating an example of a questionnaire-answered screen, according to a variation of an embodiment of the present invention; and FIG. 79 is a configuration diagram illustrating an example of an aggregated questionnaire result, according to a variation of an embodiment of the present invention.

DETAILED DESCRIPTION OF THE PREFERRED EMBODIMENTS

The following description explains embodiments of the present invention in detail. Although a conference system is taken as an example in the embodiments, the present invention is applicable to another system for sharing a screen displaying a handout, such as a seminar system, a presentation system, an orientation system, or an education system.

First Embodiment

<System Configuration>

Figure 1:
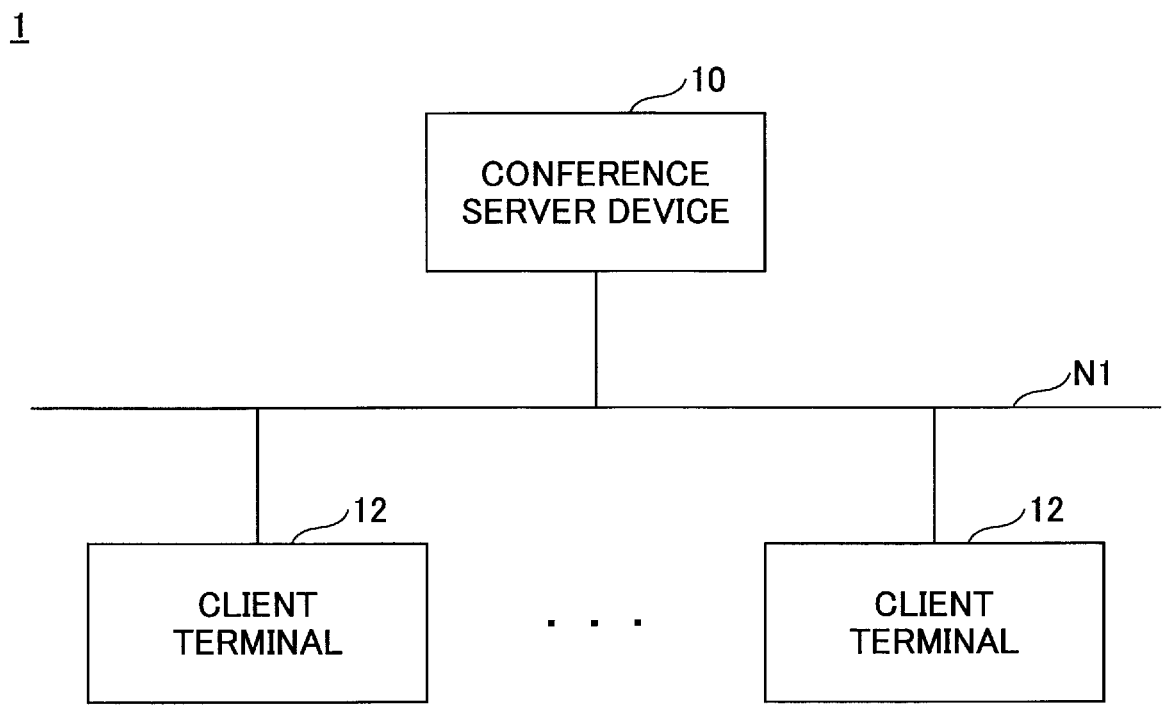
FIG. 1 is a configuration diagram illustrating an example of a conference system, according to an embodiment of the present invention.

FIG. 1 is a configuration diagram illustrating an example of a conference system according to the present embodiment. As an example, a configuration of the conference system 1 as illustrated in FIG. 1 includes a conference server device 10 and multiple client terminals 12, which are coupled to a network N1 such as a local area network (LAN).

The conference server device 10 accepts a request for registering a conference, a handout, etc., to be stored as conference information. Further, the conference server device 10 controls to start a conference or controls participation in a conference. The conference server device 10 may be actualized by a software program or a service that can be operated on one or more computers. Further, the conference server device 10 may be actualized in a format of what is referred to as a cloud service. The conference server device 10 may be actualized, for example, by a device dedicated to the conference system 1, a general work station or an information processing apparatus such as a PC, etc.

Client terminals 12 include an administrator terminal operated by an administrator of a conference and a participant terminal operated by a participant of a conference, which are explained in the following description. A client terminal 12 that is an administrator terminal is loaded with an administration tool for a conference. The administration tool has functions including a function for registering a conference or a handout in a conference server device 10, a function for registering a participant, a function for instructing a participant terminal to perform a process, etc.

Further, the administration tool may be provided with functions common to a participant terminal (e.g., a function for downloading handout data, a function for joining or leaving a conference, a function for displaying a handout in a synchronized manner during a conference). Nevertheless, the administration tool is only required to execute a function for assisting a conference, and therefore such functions common to a participant terminal as described above are not required to be provided.

As described above, the administration tool may be specialized in functions for assisting a conference (e.g., functions for providing an instruction to a participant terminal and for displaying a status), so as to be able to efficiently assist a conference without being required, while assisting a conference, to perform communication relating to processes for downloading a handout data, joining or leaving a conference, displaying a handout in a synchronized manner during a conference, etc.

Further, a client terminal 12 that is a participant terminal is provided with an application program for a conference (hereinafter simply referred to as conference application). The conference application is provided with a function for executing a process in response to an instruction (e.g., an instruction for joining a conference, an instruction for leaving a conference, an instruction for downloading a handout, an instruction for checking a status of a participant terminal, etc.) provided from an administration tool. Further, the conference application of a participant terminal displays a handout of a conference in which the participant terminal participates. At least one participant is a presenter. The screen (e.g., a displayed page, memos, etc.) of a participant terminal operated by a presenter is synchronized on participant terminals operated by participants other than the presenter.

A client terminal 12 may be a terminal device such as a PC, a tablet terminal, a smartphone, a mobile phone, a personal digital assistant (PDA), or a wearable terminal, or may be a virtual machine, a projector, an electric blackboard, a device dedicated for the conference system 1, etc. Further, the conference application, which is operated on a client terminal 12, may be a native application or may be configured with a web browser and a web application that is operated on the web browser.

Before starting a conference, an administrator registers conference information in a conference server device 10 through an administration tool provided on an administrator terminal, which is a client terminal 12. As the conference information, a handout used during a conference is set. An administrator may utilize the administration tool for instructing a participant terminal, which is a client terminal 12, to join a conference, to download a handout, etc.

The conference application of a participant terminal, which is a client terminal 12, performs a process for joining a conference upon an instruction provided from an administration tool. Further, the conference application performs a process for downloading a handout, upon an instruction provided from an administration tool. Through the above way, the conference application of a participant terminal, which is a client terminal 12, displays a handout of a conference in which the participant terminal participates.

During a conference, a handout displayed on a client terminal 12 operated by a presenter is also displayed on a client terminal 12 operated by a participant other than the presenter. A client terminal 12 operated by a participant other than the presenter receives, on a real-time basis, an input operation (e.g., turning a page, etc.) from a client terminal 12 operated by a presenter via a conference server device 10, such that a display screen is shared. For example, when a page of a handout is turned on a client terminal 12 operated by a presenter, the page of the handout is also turned on client terminals 12 operated by participants other than the presenter, such that the same screen is shared.

Further, when a handwriting memo such as a mark, a line, or a text, is added through an operation by use of a stylus pen or a mouse on a client terminal 12 operated by a presenter, the handwriting memo is also added on the screen of client terminals 12 operated by participants other than the presenter.

Further, in a first variation, a second variation, and a third variation of the present embodiments, client terminals 12 include an organizer terminal operated by an organizer of a conference and a participant terminal operated by a participant of a conference, which are explained in the following description. A client terminal 12 that is an organizer terminal is loaded with an administration tool for a conference. The administration tool is provided with a function for registering a conference or a handout in a conference server device 10, a function for registering an organizer or a participant, a function for accepting an operation of selecting a question to be delivered to participant terminals from among questions provided from participants.

Before a conference is started, an organizer registers conference information in a conference server device 10 through an administration tool of a client terminal 12 that is an organizer terminal. As conference information, a setting of a handout to be used during a conference is provided. The conference application of a client terminal 12 that is a participant terminal performs a process for joining a conference. Further, the conference application performs a process for downloading a handout. Through the above way, the conference application of a participant terminal, which is a client terminal 12, displays a handout of a conference in which the participant terminal participates.

Further, in a fourth variation of the present embodiments, client terminals 12 include an administrator terminal operated by an administrator (or an operator) of a conference and a participant terminal operated by a participant of a conference. A client terminal 12 that is an administrator terminal is loaded with an application program which is referred to as administration tool. The administration tool is provided with a function for registering a conference, handout data, a questionnaire in a conference server device 10, a function for registering a participant of a conference, etc.

Further, a client terminal 12 that is a participant terminal is provided with an application program for a conference (hereinafter simply referred to as conference application). The conference application is provided with a function for displaying a list of conferences, a handout, a questionnaire, etc.

Further, a client terminal 12 that is a participant terminal is provided with functions for acquiring conference information from a conference server device 10, for downloading handout data, for joining a conference, etc. Note that, in the conference system 1, any user participating in a conference may be allowed to become a presenter.

Before a conference is started, conference information, handout data, questionnaire information, etc., are registered in a conference server device 10 through a client terminal 12 by an administrator or a presenter. Each participant of the conference logs in to the conference server device 10 through a client terminal 12 that is a participant terminal. The conference server device 10 performs authentication, based on whether authentication information such as a login ID and a password, which is received from a client terminal 12 at the time of a login process, matches authentication information stored in a user information DB, which is explained in the following description.

Upon a success of the authentication, a session that is associated with the login ID is established between the client terminal 12 and the conference server device 10. Note that authentication information may not be required by the conference server device 10 when a client terminal 12 performs a login process. In the above case, the conference server device 10 issues a communication ID for specifying a communication-partner (i.e., a client terminal 12) to be assigned to the client terminal 12, so as to associate an established session with the communication ID.

Note that a client terminal 12 may be allowed to log in to the conference server device 10 using authentication information at a desired timing, after a session is established with the conference server device 10 without using authentication information. In the above case, a session associated with a login ID, instead of the communication ID, is established.

Then, a client terminal 12 of a participant designates a conference to join from among conferences included in conference information, which is received from the conference server device 10, so that a joining request with a conference ID of the selected conference is transmitted to the conference server device 10, in order for the client terminal 12 to join the conference.

Specifically, the conference server device 10 manages a participation status with respect to a conference, in association with a received login ID or communication ID corresponding to a client terminal 12 that has transmitted a joining request with a conference ID. With such management as explained above, the conference server device 10 can comprehend which client terminal 12 is participating in which conference. Note that in a case where a conference server device 10 receives a request for leaving a conference from a client terminal 12, the conference server device 10 updates the participation status of the client terminal 12 such that the login ID or communication ID is not associated with the conference ID. After the update of the participation status with respect to the conference, the conference server device 10 obtains handout data that is associated with the conference ID in the conference information DB and transmits the obtained handout data to each client terminal 12 from which a joining request is transmitted. A client terminal 12 that has received the handout data, which is operated by a participant of the conference, displays a screen based on the received handout data.

A screen displaying a handout is synchronized on a participant terminal participating in a conference, which is a client terminal 12, and on a participant terminal (hereinafter referred to as a presenter terminal) operated by a presenter of the conference. A presenter terminal is provided, as role information, with information indicative of authority as a presenter. The information indicative of authority for a presenter may be voluntarily obtained upon being provided with an operation, which is entered to a presenter terminal, or may be obtained from a conference server device 10 when being designated by another client terminal 12.

A participant terminal (hereinafter referred to as an audience terminal) operated by an audience member, not a presenter, receives operation information indicative of an input operation (i.e., turning a page, taking a memo, etc.), which is transmitted from the conference server device 10 upon an operation entered to the presenter terminal, through a session on a real-time basis. Further, the audience terminal updates the screen displaying a handout with the same operation, based on the received operation information, such that a display screen is shared with the presenter terminal. Transmission of operation information may be actualized such that the conference server device 10 transmits, through a session, to each participating client terminal 12 corresponding to a login ID or communication ID associated with a conference ID with which the presenter terminal is also associated. An audience terminal is not provided, as role information, with the information indicative of authority as a presenter. A client terminal 12 that is not provided with the information indicative of authority as a presenter may receive information indicative of an audience member from the conference server device 10. Note that the information indicative of authority as a presenter may be provided to multiple client terminals 12 at a conference.

For example, when a page represented by handout data is turned on a presenter terminal, the page of handout data is also turned on audience terminals, such that the same screen is shared. Further, when a presenter adds a handwriting memo such as a mark, a line or a text, through an operation by use of a stylus pen or a mouse on the presenter terminal, the screens of audience terminals are also updated.

Further, a questionnaire, which is registered in the conference server device 10 by a presenter in advance or registered in the conference server device 10 during a conference, may be delivered to audience terminals. An answering result of a questionnaire is processed by the conference server device 10 on a real-time basis, so as to update display of the presenter terminal. The presenter may end a questionnaire and cause audience terminals to display the result of the questionnaire, so as to share the result of the questionnaire with audience members. Note that delivering a questionnaire, ending a questionnaire, and sharing a result of a questionnaire may be performed through an administrator terminal as well.

An administrator (or an operator) of a conference as described above may provide a support to a presenter during a conference. With such a support from an administrator, a presenter can concentrate on explanation. In the conference system 1 according to the present variation, an operation for starting a questionnaire, ending a questionnaire, sharing a result of a questionnaire, etc., may be provided by either an administrator or a presenter.

In the conference system 1, a conference server device 10 and a client terminal 12 are able to perform data communication via the network N1. The network N1 may be a LAN, the internet, a leased line, etc., and may be wired or wireless.

<Hardware Configuration>

Figure 2:
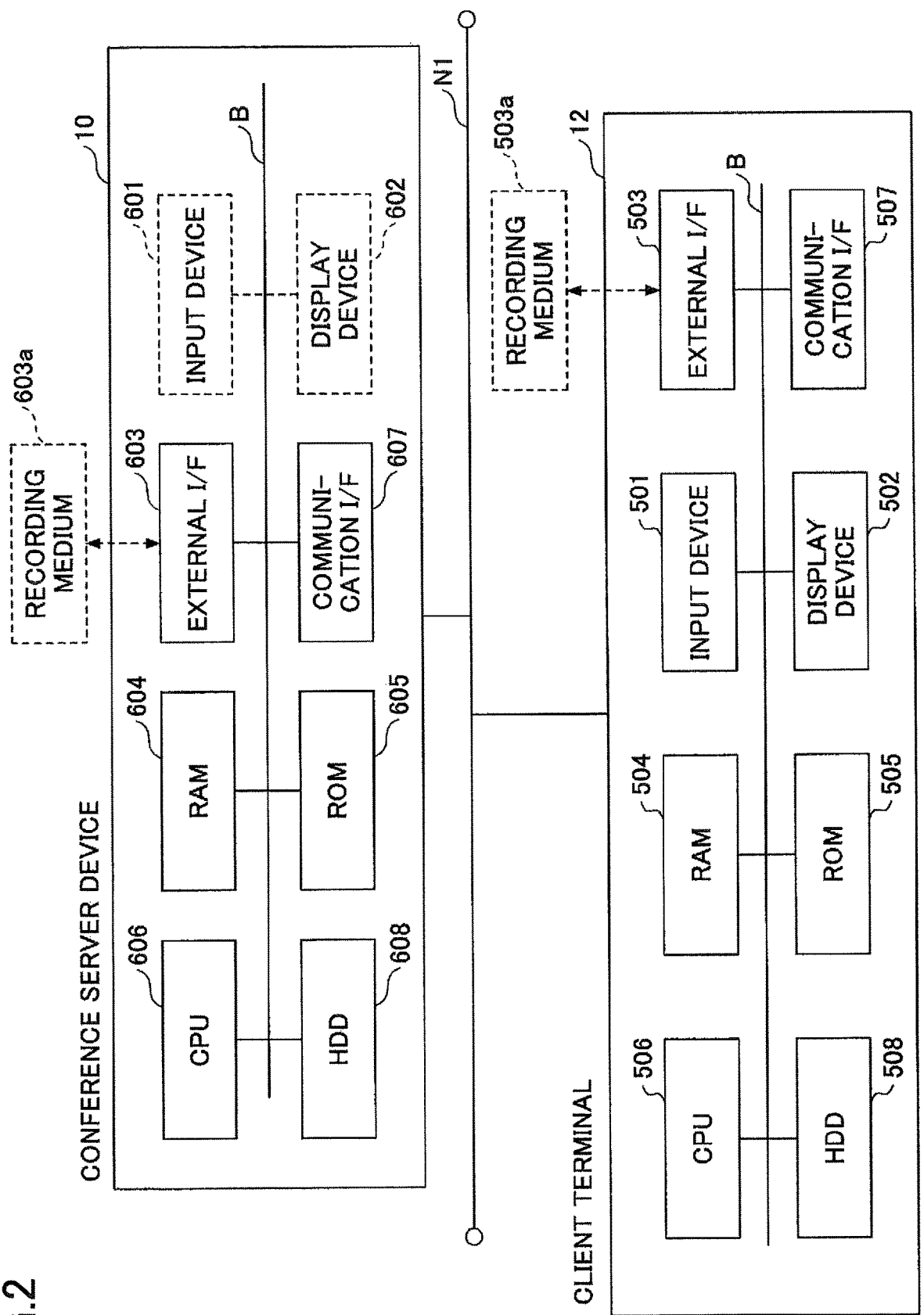
FIG. 2 is a hardware configuration diagram illustrating an example of computers constituting a conference system, according to an embodiment of the present invention.

A conference server device 10 and a client terminal 12 may be actualized, based on such a hardware configuration as illustrated in FIG. 2. FIG. 2 is a hardware configuration diagram illustrating an example of computers constituting a conference system according to the present embodiment.

The client terminal 12 illustrated in FIG. 2 includes an input device 501, a display device 502, an external interface (I/F) 503, a random access memory (RAM) 504, a read-only memory (ROM) 505, a central processing unit (CPU) 506, a communication I/F 507, a hard disk drive (HDD) 508, etc., which are interconnected with each other via a bus B. Note that the client terminal 12 may include a camera, microphone, a speaker, etc.

The input device 501 may include a keyboard, a mouse, a touchscreen, etc., so as to be used by a user for inputting various operation signals. The display device 502 may include a display, etc., so as to display a result of processing performed by a computer. The communication I/F 507 is an interface for connecting a computer with various types of networks, which enables the computer to perform data communication via the communication I/F 507.

Further, the HDD 508 is an example of a non-volatile memory device storing a program and data. The program and data stored in the HDD 508 may include an operation system (OS), which is a basic software program for entirely controlling a computer, and application software programs (hereinafter simply referred to as an application) operated on the OS for providing various functions, etc. Note that, instead of the 508, a computer may be provided with a drive device (e.g., a solid state drive (SSD)), in which a flash memory is employed as a recording medium.

The external I/F 503 is an interface to an external device. The external device may be a recording medium 503*a*, etc. The external I/F 503 enables a computer to perform read/write processing on the recording medium 503*a* via the external I/F 503. The recording medium 503*a* may be a flexible disk, a compact disk (CD), a digital versatile disk (DVD), a secure digital (SD) memory card, a universal serial bus (USB) memory, a subscriber identity module (SIM) card, etc.

The ROM 505 is an example of a non-volatile semiconductor memory (memory device) that is able to store a program and data even when the power is off. The ROM 505 stores a program and data relating to a basic input/output system (BIOS), a OS setting, a network setting, etc. The RAM 504 is an example of a volatile semiconductor memory (memory device) for temporarily storing a program and data.

The CPU 506 is an arithmetic device that retrieves a program and data from a memory device such as the ROM 505 or the HDD 508 onto the RAM 504 for executing processing for entirely controlling a computer and actualizing a function. The CPU 506 may be actualized by one processor or may be actualized by multiple processors. The client terminal 12 may execute a program for actualizing various processing explained in the following description, by use of the hardware configuration as described above, etc.

The conference server device 10 illustrated in FIG. 2 includes an input device 601, a display device 602, an external I/F 603, a RAM 604, a ROM 605, a CPU 606, a communication I/F 607, a HDD 608, etc., which are interconnected with each other via a bus B. The hardware configuration of the conference server device 10 may be the same as the hardware configuration of the client terminal 12. Further, the input device 601 and the display device 602 may be optionally connected, when needed. The conference server device 10 may execute a program for actualizing various processing explained in the following description, by use of the hardware configuration as described above, etc.

<Software Configuration>

In a conference system 1 according to the present embodiment, a conference server device 10, an administrator terminal 12A, which is a client terminal 12 operated by an administrator of a conference, a participant terminal 12B, which is a client terminal 12 operated by a participant of a conference, are actualized as illustrated in the functional block diagrams, which are explained in the following description.

<<Administrator Terminal>>

Figure 3:
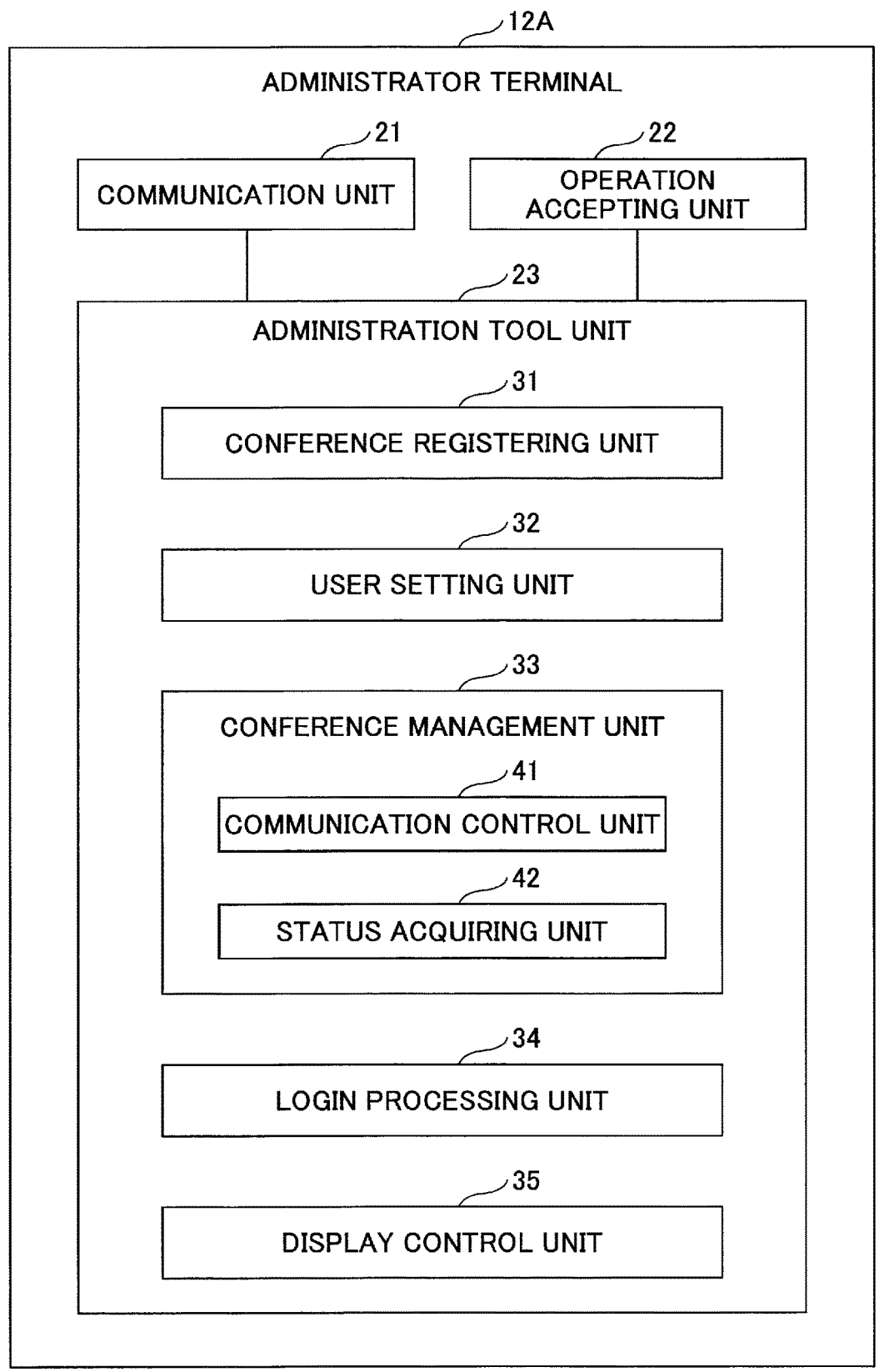
FIG. 3 is a functional block diagram illustrating an example of an administrator terminal, according to an embodiment of the present invention.

FIG. 3 is a functional block diagram illustrating an example of an administrator terminal. Note that the functional block diagram of FIG. 3 illustrates functions that are necessary for explaining the present embodiment among all functions provided by an administrator terminal 12A, which means that the administrator terminal 12A illustrated in FIG. 3 may include more functions.

The administrator terminal 12A illustrated in FIG. 3 executes a program to actualize a communication unit 21, an operation accepting unit 22, or an administration tool unit 23. The administration tool unit 23 includes a conference registering unit 31, a user setting unit 32, a conference management unit 33, a login processing unit 34, and a display control unit 35. The conference management unit 33 includes a communication control unit 41 and a status acquiring unit 42.

The communication unit 21 of the administrator terminal 12A controls communication with the conference server device 10. The operation accepting unit 22 accepts an operation entered by an administrator and performs control based on the entered operation. The administration tool unit 23 provides the administrator with functions for administrating a conference. For example, the administration tool unit 23 includes a function for registering a conference or a handout in the conference server device 10, a function for registering a participant, a function for instructing a participant terminal 12B to perform a process, etc.

The conference registering unit 31 performs a process, for example, for registering a conference or a handout in the conference server device 10, based on an operation entered by an administrator. The user setting unit 32 performs a process, for example, for registering user information of a participant in the conference server device 10, based on an operation entered by an administrator. The conference management unit 33 manages control of a participant terminal 12B, which is performed by an administrator through an administrator terminal 12A. The login processing unit 34 performs a login process for logging in to the conference server device 10.

Further, the communication control unit 41 of the conference management unit 33 transmits an instruction to a participant terminal 12B via the conference server device 10, based on an operation entered by an administrator, so as to cause the participant terminal 12B to execute a process for joining a conference, for downloading a handout, etc. The status acquiring unit 42 provides an instruction to a participant terminal 12B, based on an operation entered by an administrator, so as to acquire information indicative of a status such as a status of downloading a handout. The display control unit 35 controls display of a screen of the administration tool.

<<Participant Terminal>>

Figure 4:
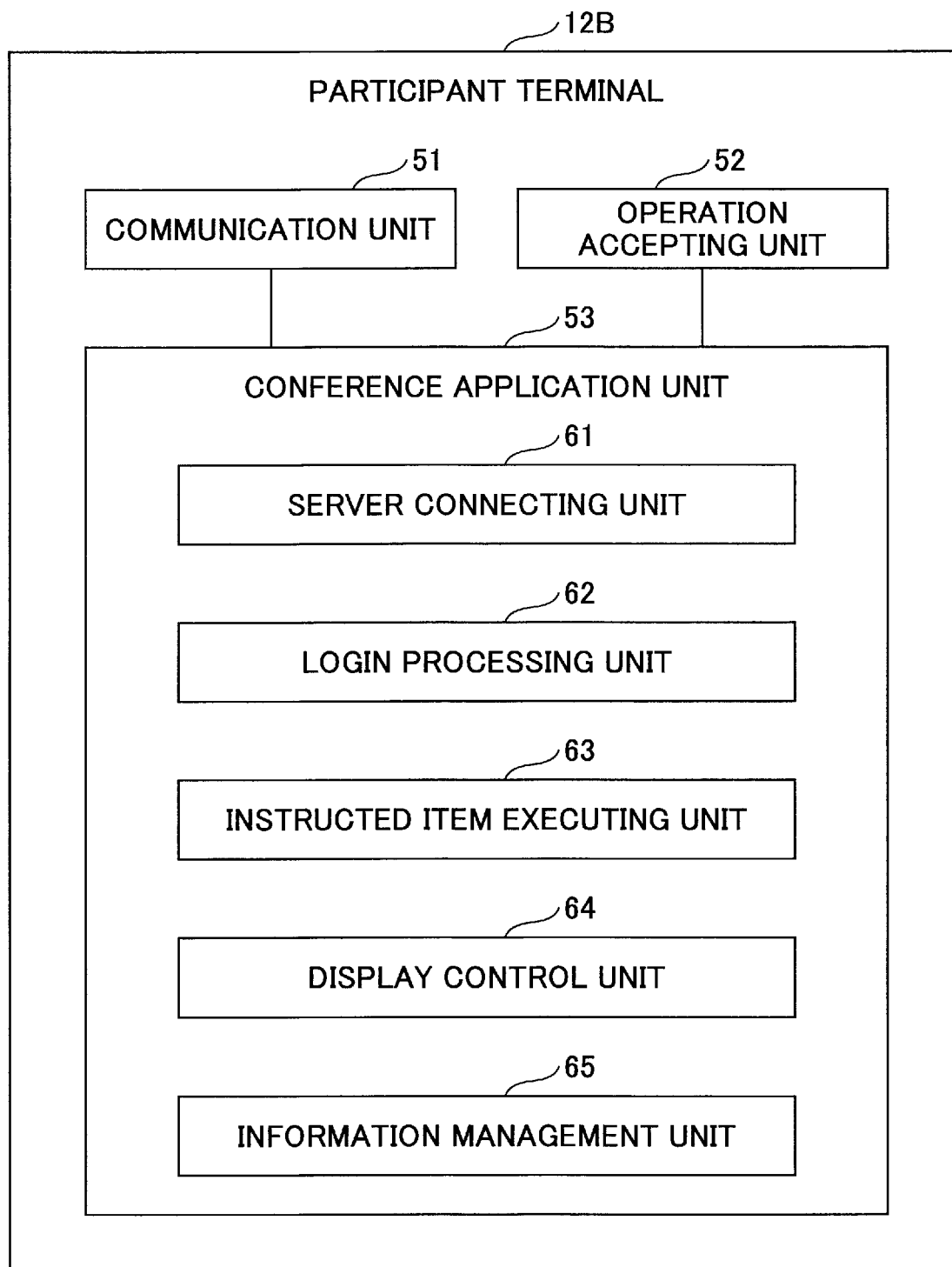
FIG. 4 is a functional block diagram illustrating an example of a participant terminal, according to an embodiment of the present invention.

FIG. 4 is a functional block diagram illustrating an example of a participant terminal. Note that the functional block diagram of FIG. 4 illustrates functions that are necessary for explaining the present embodiment among all functions provided by a participant terminal 12B, which means that the participant terminal 12B illustrated in FIG. 4 may include more functions.

The participant terminal 12B illustrated in FIG. 4 executes a program to actualize a communication unit 51, an operation accepting unit 52, and a conference application unit 53. The conference application unit 53 includes a server connecting unit 61, a login processing unit 62, an instructed item executing unit 63, a display control unit 64, and an information management unit 65.

The communication unit 51 of the participant terminal 12B controls communication with the conference server device 10. The operation accepting unit 52 accepts an operation entered by a participant and performs control based on the entered operation. The conference application unit 53 performs a process pertaining to a conference. For example, the conference application unit 53 may include functions executed based on an instruction provided by an administrator terminal 12A, such as a function for performing a process for joining a conference, downloading a handout, etc., or a function for displaying a handout of a conference at a conference in a synchronized manner with a participant terminal 12B of a presenter.

The server connecting unit 61 connects to a conference server device 10 to establish a session. The login processing unit 62 performs a login process to log in to a conference server device 10. The instructed item executing unit 63 performs a process for joining a conference, downloading a handout, etc., based on an instruction provided from an administrator terminal 12A. The display control unit 64 controls display of a handout of a conference, etc. The information management unit 65 manages necessary information in the participant terminal 12B.

<<Conference Server Device>>

Figure 5:
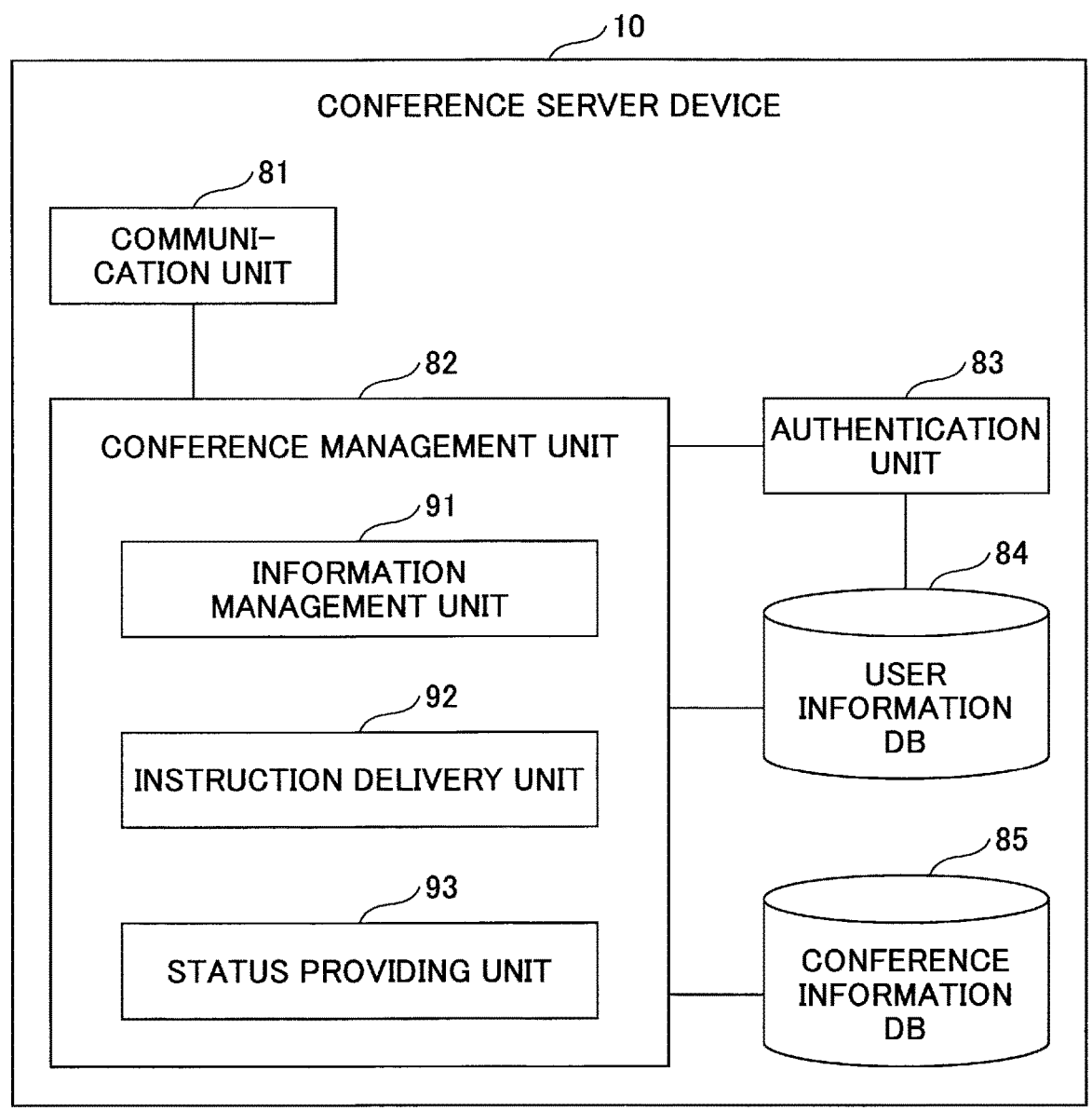
FIG. 5 is a functional block diagram illustrating an example of a conference server device, according to an embodiment of the present invention.

FIG. 5 is a functional block diagram illustrating an example of a conference server device. Note that the functional block diagram of FIG. 5 illustrates functions that are necessary for explaining the present embodiment among all functions provided by a conference server device 10, which means that the conference server device 10 illustrated in FIG. 5 may include more functions.

The conference server device 10 illustrated in FIG. 5 executes a program to actualize a communication unit 81, a conference management unit 82, an authentication unit 83, a user information DB 84, and a conference information DB 85. The conference management unit 82 includes an information management unit 91, an instruction delivery unit 92, and a status providing unit 93.

The communication unit 81 controls communication with a client terminal 12. The conference management unit 82 performs management of a conference, as explained in the following description, by use of user information stored in the user information DB 84, conference information stored in the conference information DB 85, etc. The authentication unit 83 authenticates a user who operates a client terminal 12, by use of information such as user information stored in the user information DB 84. The information management unit 91 performs information processing such as registration of a conference and control of a conference.

The instruction delivery unit 92 delivers a destination-designated instruction provided from an administrator terminal 12A to the participant terminal 12B, which is designated as the destination. The status providing unit 93 delivers a destination-designated instruction provided from an administrator terminal 12A to the participant terminal 12B, which is designated as the destination, for checking a status of the participant terminal 12B. Further, the status providing unit 93 provides information indicative of the status acquired from the participant terminal 12B to the administrator terminal 12A.

Note that the conference server device 10 may be actualized by a single information processing apparatus and may be actualized by multiple information processing apparatuses. Further, the conference server device 10 and the administrator terminal 12A may be unified and actualized by a single information processing apparatus.

<Processing>

<<Overall Processing>>

Figure 6:
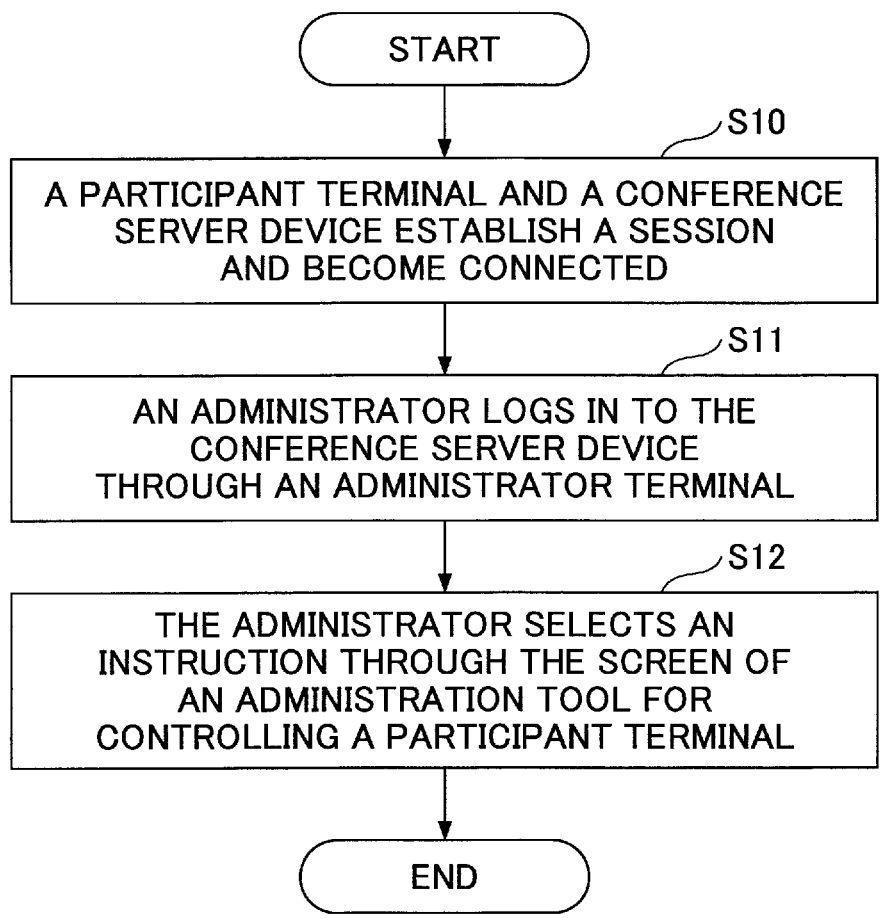
FIG. 6 is a flowchart illustrating an example of a sequence for causing a participant terminal to perform a process upon an instruction from an administrator terminal, in a conference system, according to an embodiment of the present invention.

In the conference system 1 according to the present embodiment, through such a sequence as illustrated in FIG. 6, an instruction is provided from an administrator terminal 12A to a participant terminal 12B for causing the participant terminal 12B to perform processing in accordance with the instruction.

FIG. 6 is a flowchart illustrating an example of a sequence for causing a participant terminal to perform a process upon an instruction from an administrator terminal, in the conference system according to the present embodiment. At Step S10, after a participant terminal 12B runs a conference application, the server connecting unit 61 transmits, via the communication unit 51, a connection request to a uniform resource identifier (URI) of a preset conference server device 10, so that the participant terminal 12B establishes a session to become connected to the conference server device 10. Upon receiving the connection request, the conference server device 10 issues a communication ID for identifying a communication-partner (i.e., a participant terminal 12B) from network resources, and assigns the issued communication ID to the corresponding participant terminal 12B, so as to manage the session established with the participant terminal 12B.

After becoming connected, upon an operation entered to the participant terminal 12B, the login processing unit 62 may perform a login process by use of a user ID, which is explained in the following description. Note that authentication information such as a user ID and a password may be entered by a user at the time of establishing a session with the conference server device 10, such that the login processing unit 62 performs a login process by use of the user ID. Note that the authentication information may be information for specifying a terminal, not a user. That is to say, the authentication information includes a terminal ID, other than a user ID. In the above case, the conference server device 10 may associate a user ID or a terminal ID, for use as a communication ID, with a participant terminal 12B, such that the conference server device 10 manages a session established with the participant terminal 12B, as illustrated in FIG. 17, without issuing a communication ID.

FIG. 17 is a configuration diagram illustrating an example of session information. The session information as illustrated in FIG. 17 is information for managing a user ID associated with a conference ID of a conference in which the user of the user ID is participating. For example, in the example of FIG. 17, the users of user ID "A" and user ID "B" are participating in "CONFERENCE A", and the users of user ID "C", user ID "D", and user ID "E" are participating in "CONFERENCE B". The user of user ID "F" is not participating in any conferences.

Note that the conference server device 10 may manage network address information of a participant terminal 12B, such as an IP address, in association with a communication ID, a user ID, or a terminal ID corresponding to the participant terminal 12B.

At Step S11, an administrator utilizes administrative authority to log into the conference server device 10 through an administration tool of an administrator terminal 12A. Specifically, the login processing unit 34 transmits a login request to the conference server device 10, via the communication unit 21. The login request includes authentication information of a user having the administrative authority. The authentication information may include, for example, a user ID and a password. The conference server device 10 stores the user ID and the password in the user information DB 84 in advance, as identification information of the user having the administrative authority. Further, when the conference server device 10 receives the login request via the communication unit 81, the authentication unit 83 determines whether the authentication information included in the received login request matches the authentication information of the user having the administrative authority, which is stored in the user information DB 84.

In a case of determining that the authentication information does not match, the authentication unit 83 transmits error information, which indicates that the login has failed, to the administrator terminal 12A via the communication unit 81. Contrarily, in a case of determining that the authentication information matches, processing proceeds to Step S12, where the administrator can utilize the administrative authority to check, on the screen of the administration tool, a list of participant terminals 12B connected to the conference server device 10. Here, a session is established between the conference server device 10 and the administrator terminal 12A, similarly to the participant terminal 12B as explained at Step S10, so as to manage the administrator terminal 12A in association with the user ID having the administrative authority. The conference server device 10 may manage the administrator terminal 12A by use of network address information, such as an IP address, associated with the user ID, similarly to the participant terminal 12B. Further, the administrator may select, on the screen of the administration tool, an instruction to a participant terminal 12B, so as to control the participant terminal 12B to perform a process. In the above way, the administrator is able to control a conference or control a participant terminal 12B through the administration tool of the administrator terminal 12A.

Figure 7:
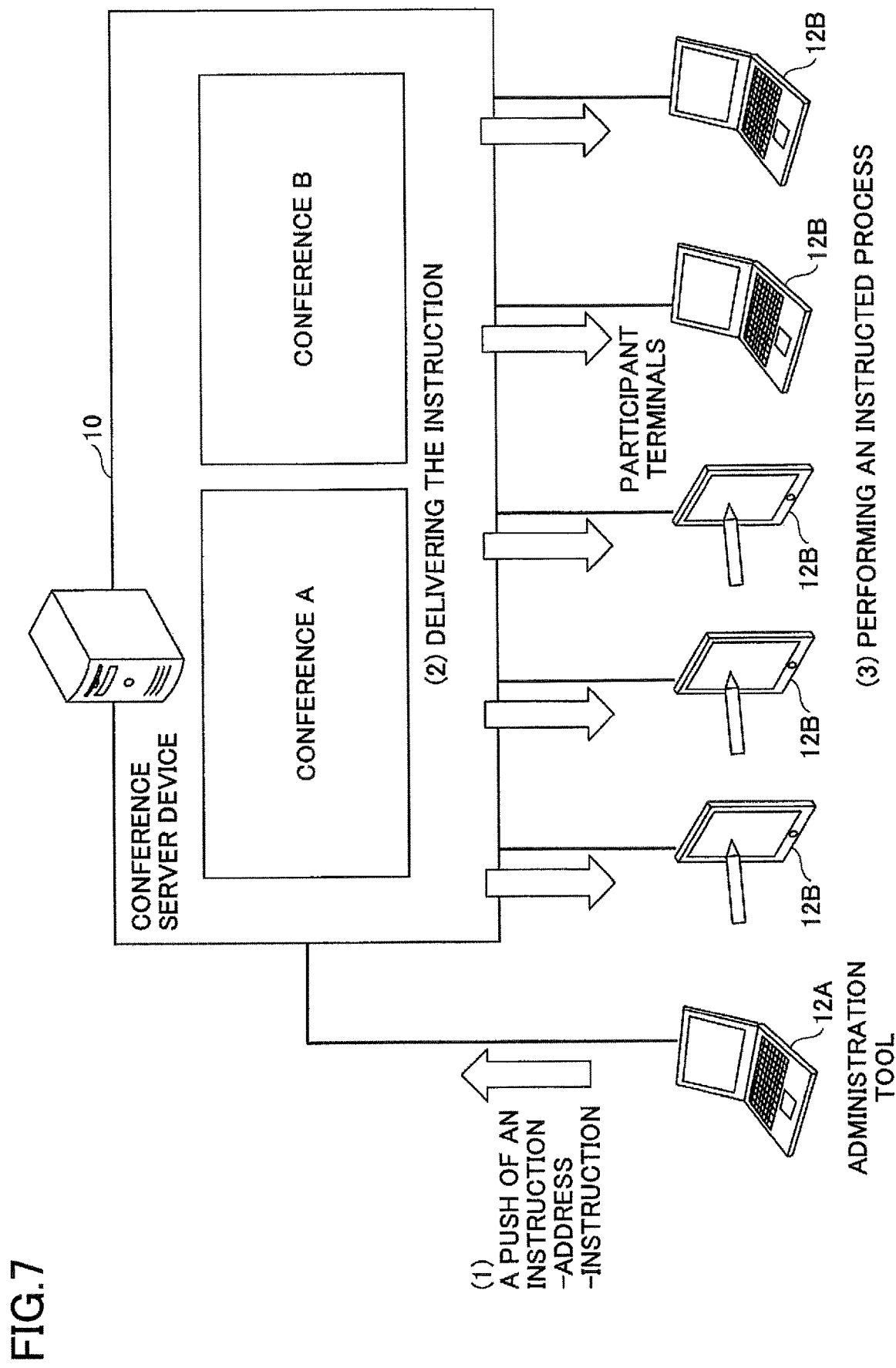
FIG. 7 is an image diagram illustrating an example of a sequence for a participant terminal to perform a process, based on an instruction provided from an administration tool, according to an embodiment of the present invention.

Specifically, the administrator controls a participant terminal 12B to perform a process through the administration tool, in such a flow as illustrated in FIG. 7. FIG. 7 is an image diagram illustrating an example of a sequence for a participant terminal to perform a process, based on an instruction provided from the administration tool. Through an established session, the administrator terminal 12A issues, by means of the communication control unit 41 of the administration tool, a message directed to the conference server device 10 for controlling a participant terminal 12B. The message includes an address designating the participant terminal 12B as a control target and includes an instruction directed to the participant terminal 12B. Upon receiving the message issued by the administration tool of the administrator terminal 12A, the instruction delivery unit 92 of the conference server device 10 transmits a message including the instruction through the established session to the participant terminal 12B, which is designated as the destination.

Note that communications protocol for transmitting and receiving a message may be, for example, one that is used for instant messenger, such as Extensible Messaging and Presence Protocol (XMPP), or Hypertext Transfer Protocol (HTTP). Further, another communications protocol for enabling communication of a message may be employed. Upon receiving the message through a session, the instructed item executing unit 63 of a participant terminal 12B performs a process, based on an instruction included in the received message.

In the conference system 1 according to the present embodiment, through such a processing flow as illustrated in FIG. 7, an administrator may utilize an administration tool of an administrator terminal 12A for collectively controlling participant terminals 12B connected to a conference server device Hat a conference from one situation to another. For example, there may be a case where, at a conference, an administrator such as an operator or an administrating office offers participant terminals 12B to reduce burdens and complexity for participants. Further, there may be a case where an administrator operates participant terminals 12B to participate in a conference and to download a handout before a conference is started. In the above cases, in a conventional conference system, the burden of the administrator increases with the number of participant terminals. In the present embodiment, as an administrator can utilize an administration tool of an administrator terminal 12A for collectively controlling participant terminals 12B connected to a conference server device 10 at a conference from one situation to another, such a burden of the administrator can be reduced.

<<Screen of an Administration Tool>>

Figure 8:
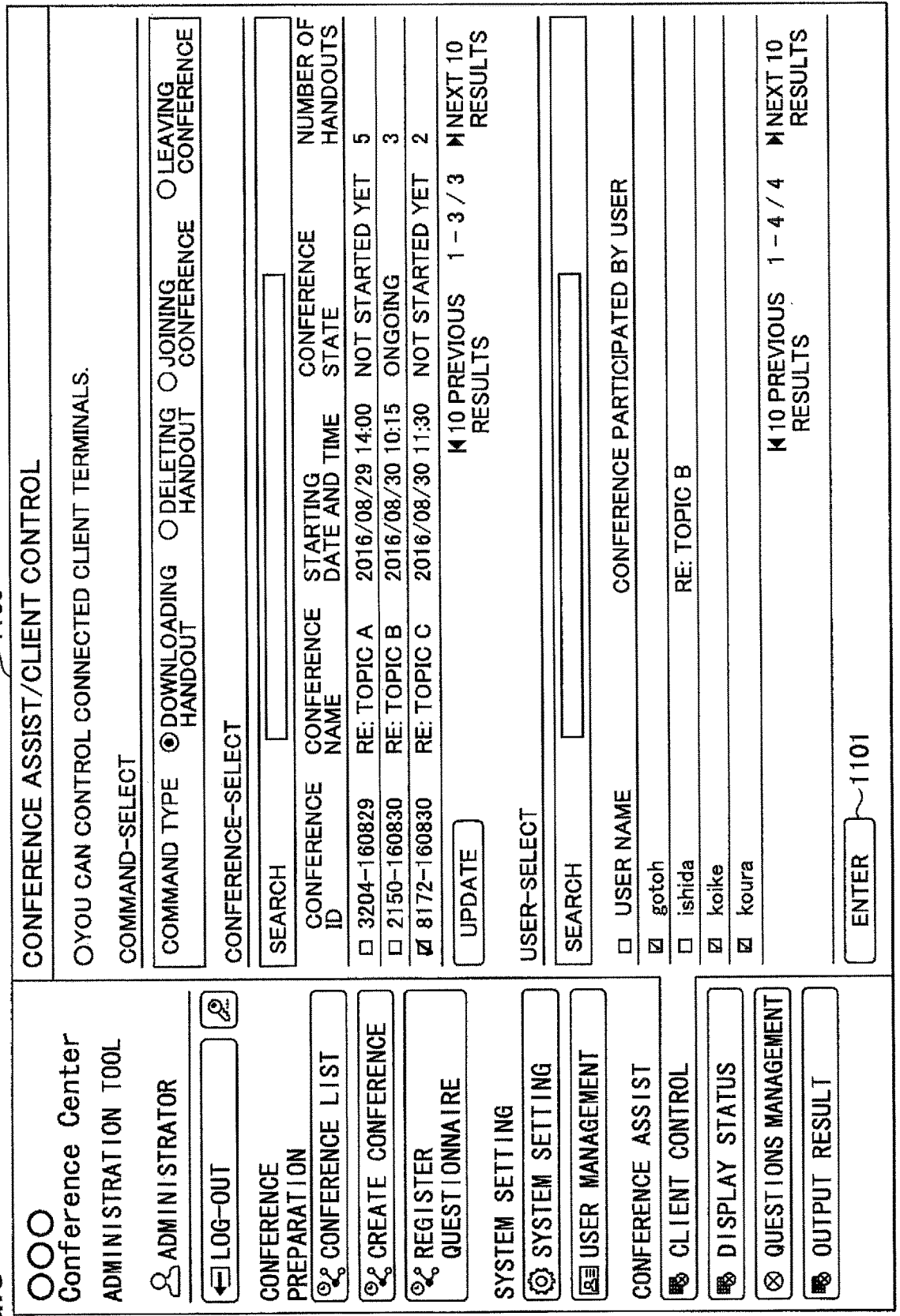
FIG. 8 is an image diagram illustrating an example of a screen of an administration tool, according to an embodiment of the present invention.

FIG. 8 is an image diagram illustrating an example of a screen of an administration tool. A screen 1100 of an administration tool as illustrated in FIG. 8 is displayed when an administrator logs in to a conference server device 10 using administrative authority through the administration tool of an administrator terminal 12A. The screen 1100 of the administration tool is an example of a screen displayed in a case of selecting "CLIENT CONTROL" tab, which is in the "CONFERENCE ASSIST" functions.

On the screen 1100 of the administration tool, an instruction directed to a participant terminal 12B is selected through "COMMAND-SELECT" on the top of the screen. On the screen 1100 illustrated in FIG. 8, "DOWNLOADING HANDOUT", "DELETING HANDOUT", "JOINING CONFERENCE", and "LEAVING CONFERENCE" are displayed as examples of a command type that is selectable through "COMMAND-SELECT" on the top of the screen. Further, in the example of the screen 1100 illustrated in FIG. 8, "DOWNLOADING HANDOUT" is selected through "COMMAND-SELECT".

On the screen 1100 of the administration tool, at least one conference, to which an instruction selected through "COMMAND-SELECT" is directed, is selected through "CONFERENCE-SELECT" on the middle of the screen. Further, on the screen 1100 of the administration tool, at least one participant terminal 12B, to which an instruction is directed, is selected through "USER-SELECT" near the bottom of the screen. The administrator may collectively control the at least one participant terminal 12B to perform a process, by pressing an enter button 1101 on the screen 1100 of the administration tool.

For example, when the enter button 1101 is pressed by the administrator on the screen 1100 of the administration tool illustrated in FIG. 8, a message designating participant terminals 12B with user names of "gotoh", "koike", and "koura" as destinations is transmitted to the conference server device 10. An instruction included in the message is downloading a handout of the conference with conference ID "8172-160830".

<<Message>>

Configuration of a message transmitted by use of an administration tool from an administrator terminal 12A to a conference server device 10 through an established session is as illustrated in each example of FIGS. 9A through 9E. FIGS. 9A through 9E are configuration diagrams illustrating an example of a message issued by an administration tool.

In FIGS. 9A through 9E, messages of "DOWNLOADING HANDOUT", "JOINING CONFERENCE", "LEAVING CONFERENCE", "DELETING HANDOUT", and "OBTAINING STATUS" are illustrated as examples. In FIG. 9A, an example of a message for downloading a handout is illustrated. In FIG. 9B, an example of a message for joining a conference is illustrated. In FIG. 9C, an example of a message for leaving a conference is illustrated. In FIG. 9D, an example of a message for deleting a handout is illustrated. In FIG. 9E, an example of a message for obtaining a status is illustrated.

As illustrated in FIGS. 9A through 9E, with respect to each message, an address is designated. Although a user ID or a terminal ID is designated as an address in a case of transmitting a message to a specific user or a participant terminal 12B, designation of an address is not required. Note that, in a case where an address is not designated, processing may be performed such that a message is transmitted to all participant terminals 12B connected to the conference server device 10.

Further, with respect to each message, a conference ID is designated. When a conference ID is designated, the administrator terminal 12A can transmit a message to participant terminals 12B participating in a conference corresponding to the conference ID. Note that designation of a conference ID is not required. That is to say, in a case where a conference ID is not designated, a message may be transmitted to all participant terminals 12B that have established a session with the conference server device 10.

Further, with respect to each message, a user ID of an administrator who has logged in to utilize the administration tool is designated. When a user ID of an administrator is designated, the conference server device 10 can detect the administrator from which a message is transmitted. Note that designation of a user ID of an administrator is not required. Further, with respect to each message illustrated in FIGS. 9A through 9E, information for specifying an instruction, such as downloading a handout or joining a conference, is designated. Further, with respect to a message for downloading a handout as illustrated in FIG. 9A or a message for deleting a handout as illustrated in FIG. 9D, a handout ID may be included as identification information for identifying specific handout data, which is designated through the administration tool.

Specifically, in FIG. 9A, an instruction for downloading a handout is illustrated. In FIG. 9B, an instruction for joining a conference is illustrated. In FIG. 9C, an instruction for leaving a conference is illustrated. In FIG. 9D, an instruction for deleting a handout is illustrated. In FIG. 9E, an instruction for obtaining a status is illustrated.

<<Downloading a Handout>>

In the conference system 1 according to the present embodiment, through the procedure as illustrated in FIG. 7, it is possible to control a process performed by a participant terminal 12B prior to or during a conference through an administration tool of an administrator terminal 12A. The following description explains a case of controlling a participant terminal 12B to download a handout before a conference is started.

Figure 10:
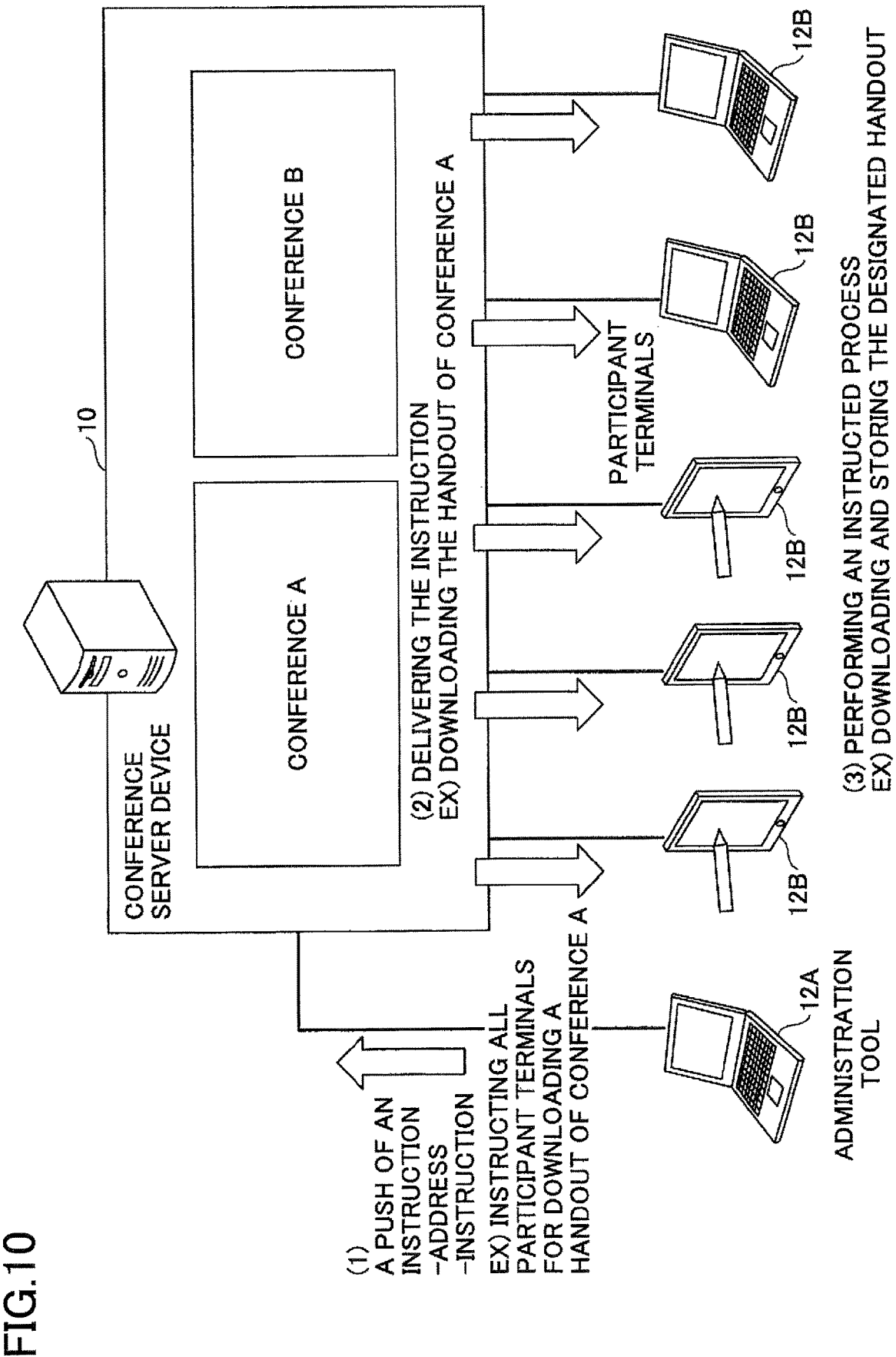
FIG. 10 is an image diagram illustrating an example of a procedure for a participant terminal to perform a process for downloading a handout upon an instruction for downloading a handout, which is provided from an administration tool, according to an embodiment of the present invention.

FIG. 10 is an image diagram illustrating an example of a procedure for a participant terminal to perform a process for downloading a handout upon an instruction for downloading a handout, which is provided from an administration tool. As an example, suppose that all participant terminals 12B connected to a conference server device 10 will join "CONFERENCE A". In the above case, an administrator operates a screen 1100 of an administration tool of an administrator terminal 12A before the conference is started, such that the communication control unit 41 transmits, via the communication unit 21, a message including an instruction for downloading a handout of "CONFERENCE A" to the conference server device 10. The message including an instruction for downloading a handout is exemplified by the message illustrated in FIG. 9A, supposing that the message designates "CONFERENCE A" as a conference ID.

Upon receiving the message through the communication unit 81, the conference server device 10 transmits, by means of the instruction delivery unit 92, a message including an instruction for downloading a handout of "CONFERENCE A" to all of the connected participant terminals 12B via the communication unit 81. After the message is received via the communication unit 51 of a client terminal 12B, a process for downloading handout data of "CONFERENCE A" is performed by the instructed item executing unit 63, based on the instruction included in the message. The downloaded handout data of "CONFERENCE A" is stored and managed by the information management unit 65. When a conference is actually started, in a case of displaying a handout, the display control unit 64 of the participant terminal 12B utilizes the stored handout data to perform display control. Note that the participant terminal 12B performs the download process, based on information indicative of an instruction for downloading a handout, which is included in the message as illustrated in FIG. 9A.

Handout data may be electronic data in a format of, for example, PDF, PPT, WORD, EXCEL, JPEG, PNG, BMP, HTML, XML, or in another format. Further, handout data may be electronic data of either an image or a video. In the present embodiment, the following description explains a case where handout data is electronic data representing multiple pages.

In the conference system 1 according to the present embodiment, a delay of starting a conference due to waiting time for participant terminals 12B to download handout data can be prevented, as handout data is downloaded by participant terminals 12B in advance by means of an instruction provided from an administrator terminal 12A before the conference is started. Further, in the conference system 1 according to the present embodiment, a concentrated situation of downloading a handout at a time of starting a conference can be prevented. Further, the download process can be performed without requesting each participant to enter an operation for downloading a handout.

Further, in the conference system 1 according to the present embodiment, a load on the network N1 or on the conference server device 10 is not drastically increased at the time of starting a conference, as a handout is downloaded in advance by each of the participant terminals 12B that will join the conference. Consequently, even in a case where there is an additional participant terminal 12B that is suddenly joined to the conference, the handout is smoothly downloaded.

Further, in addition to downloading a handout, each participant terminal 12B acquires a handout ID, which is associated with handout data, for specifying a handout associated with the handout data. The conference server device 10 may manage handout IDs in association with conference IDs, so that, upon receiving a message designating a conference ID, the conference server device 10 is able to specify handouts that are registered for the conference. Note that, in a case where multiple handout IDs are associated with a conference ID, each participant terminal 12B may be controlled to download multiple items as handout data. Further, a handout ID is managed in association with information indicative of latest update date and time of corresponding handout data. Handout data registered in the conference server device 10 may be re-registered and overwritten. Upon being overwritten, latest update date and time is updated.

Further, a handout may be deleted through the same communication, by use of another message as illustrated in FIG. 9D. Upon receiving the message as illustrated in FIG. 9D, a participant terminal 12B deletes handout data associated with a conference ID. Note that the message as illustrated in FIG. 9D may include a handout ID for specifying a handout. Having such a configuration as described above, in a case where there are multiple items associated with a conference ID as handout data, a participant terminal 12B is able to delete only specific handout data designated through the administration tool.

In combination of such instructions for downloading a handout and for deleting a handout as described above, even in a case of a sudden need for replacing a handout, a process for replacement can be easily performed through the administration tool, without inconveniencing to participants.

Figure 18:
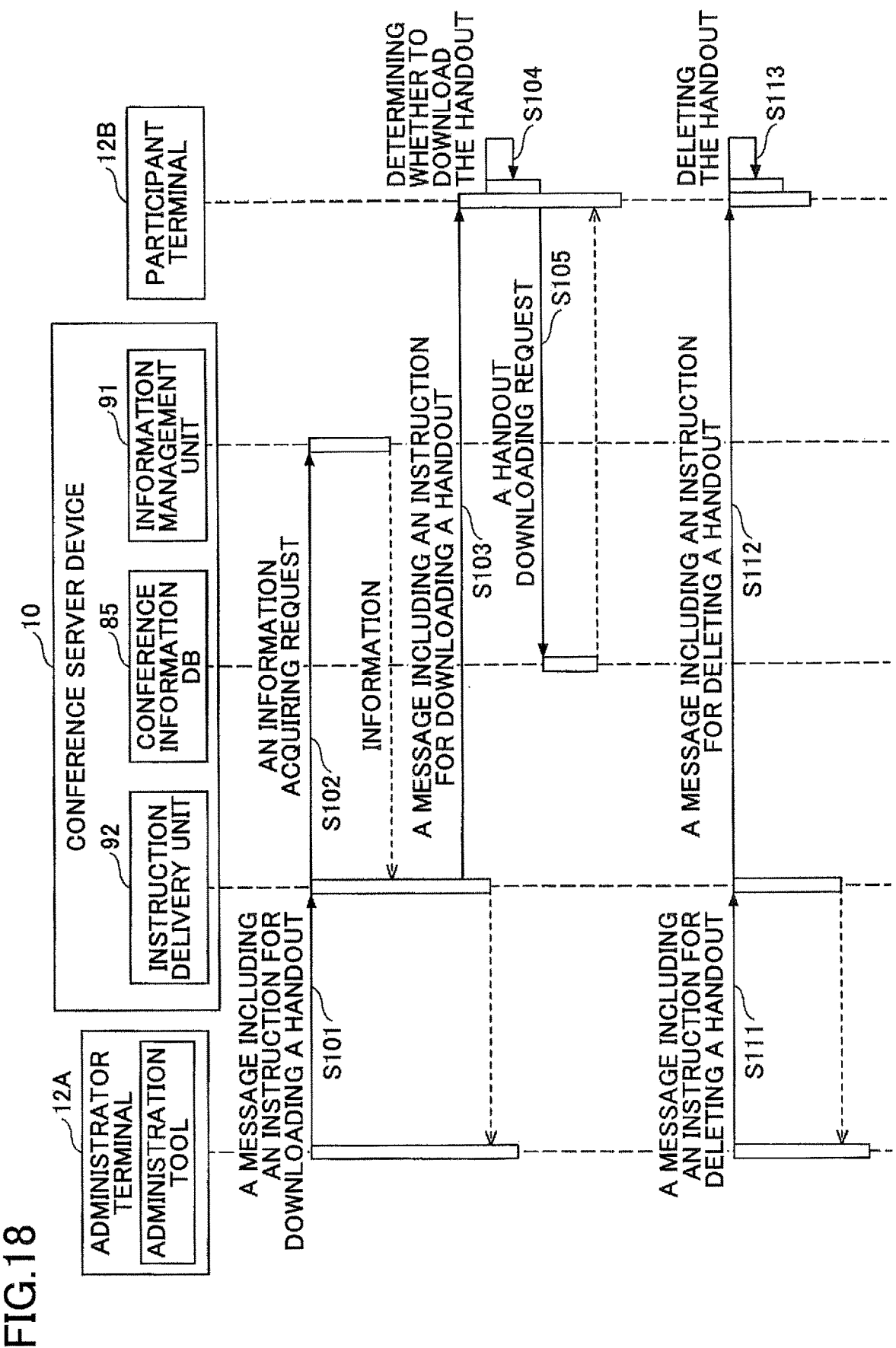
FIG. 18 is a sequence diagram illustrating an example of a procedure for a participant terminal to perform a process for downloading a handout and a process for deleting a handout, upon an instruction for downloading a handout and an instruction for deleting a handout provided through an administration tool, according to an embodiment of the present invention.

FIG. 18 is a sequence diagram illustrating an example of a procedure for a participant terminal to perform a process for downloading a handout and a process for deleting a handout, upon an instruction for downloading a handout and an instruction for deleting a handout provided through an administration tool.

An administrator operates a screen 1100 of an administration tool of an administrator terminal 12A before a conference is started, so as to provide an instruction for downloading a handout of the conference. At Step S101, the communication control unit 41 of the administrator terminal 12A transmits, via the communication unit 21, a message including an instruction for downloading a handout of the conference to the conference server device 10. Here, with respect to the message, a conference ID, a handout ID, and an address to which the instruction for downloading a handout is directed may be designated.

Upon receiving the message via the communication unit 81, in a case where the message includes a designated conference ID, the instruction delivery unit 92 of the conference server device 10 acquires, from the information management unit 91, a handout ID of handout data that is associated with the conference ID and information indicative of latest update date and time of the handout data, at Step S102.

Further, in a case where the message includes a designated handout ID, the instruction delivery unit 92 acquires information indicative of latest update date and time of the handout data corresponding to the handout ID. Further, in a case where the message does not include any designated conference ID or handout ID, the instruction delivery unit 92 acquires, from the information management unit 91, handout IDs of all items registered as handout data and information indicative of latest update date and time of the handout data.

At Step S103, the instruction delivery unit 92 transmits, via the communication unit 81, a message including an instruction for downloading a handout of a conference to all participant terminals 12B designated as destinations, based on the message. Note that, in a case where the message does not include any designated destination, the instruction delivery unit 92 transmits, via the communication unit 81, a message including an instruction for downloading a handout of a conference to all participant terminals 12B that are connected. The transmitted message includes the handout ID and the information indicative of latest update date and time of the handout data corresponding to the handout ID, which were acquired at Step S102.

When the message including an instruction for downloading a handout of a conference is received by a participant terminal 12B via the communication unit 51, the instructed item executing unit 63 determines, at Step S104, whether to download the handout, based on the handout ID and the information indicative of latest update date and time of the handout data corresponding to the handout ID, which are included in the message.

For example, the instructed item executing unit 63 determines whether to download the handout in such a way as described below. The instructed item executing unit 63 determines to download the handout, in a case where the handout data corresponding to the handout ID included in the message has not been downloaded. Further, the instructed item executing unit 63 determines to download the handout, even in a case where the handout data corresponding to the handout ID included in the message has been downloaded if information indicative of latest update date and time of the downloaded handout data differs from the information indicative of latest update date and time of the handout data included in the message. Note that the instructed item executing unit 63 determines not to download the handout, in a case where the handout data corresponding to the handout ID included in the message has been downloaded and information indicative of latest update date and time of the downloaded handout data is the same as the information indicative of latest update date and time of the handout data included in the message.

In a case of determining to download the handout data, the instructed item executing unit 63 performs, at Step S105, a process for downloading the handout data of the conference, in accordance with the instruction included in the message. Then, the information management unit 65 of the participant terminal 12B stores and manages the downloaded handout data of the conference.

Further, through Steps S111 to S113, a handout is deleted through the same communication, by use of another message as illustrated in FIG. 9D. The administrator operates the screen 1100 of the administration tool of the administrator terminal 12A before the conference is started, so as to provide an instruction for deleting a handout of the conference. At Step S111, the communication control unit 41 of the administrator terminal 12A transmits a message including an instruction for deleting a handout of the conference to the conference server device 10 via the communication unit 21. Here, with respect to the message, a conference ID, a handout ID, and an address to which the instruction for deleting a handout is directed may be designated.

At Step S112, the instruction delivery unit 92 transmits, via the communication unit 81, a message including an instruction for deleting a handout of the conference to all participant terminals 12B designated as destinations, based on the message. Note that, in a case where the message does not include any designated destination, the instruction delivery unit 92 transmits, via the communication unit 81, the message including an instruction for deleting a handout of the conference to all participant terminals 12B that are connected.

At Step S113, upon receiving the message including an instruction for deleting a handout of the conference via the communication unit 51, the instructed item executing unit 63 of a participant terminal 12B performs a process for deleting handout data corresponding to a handout ID included in the message.

<<Login by a Participant Terminal>>

Figure 11:
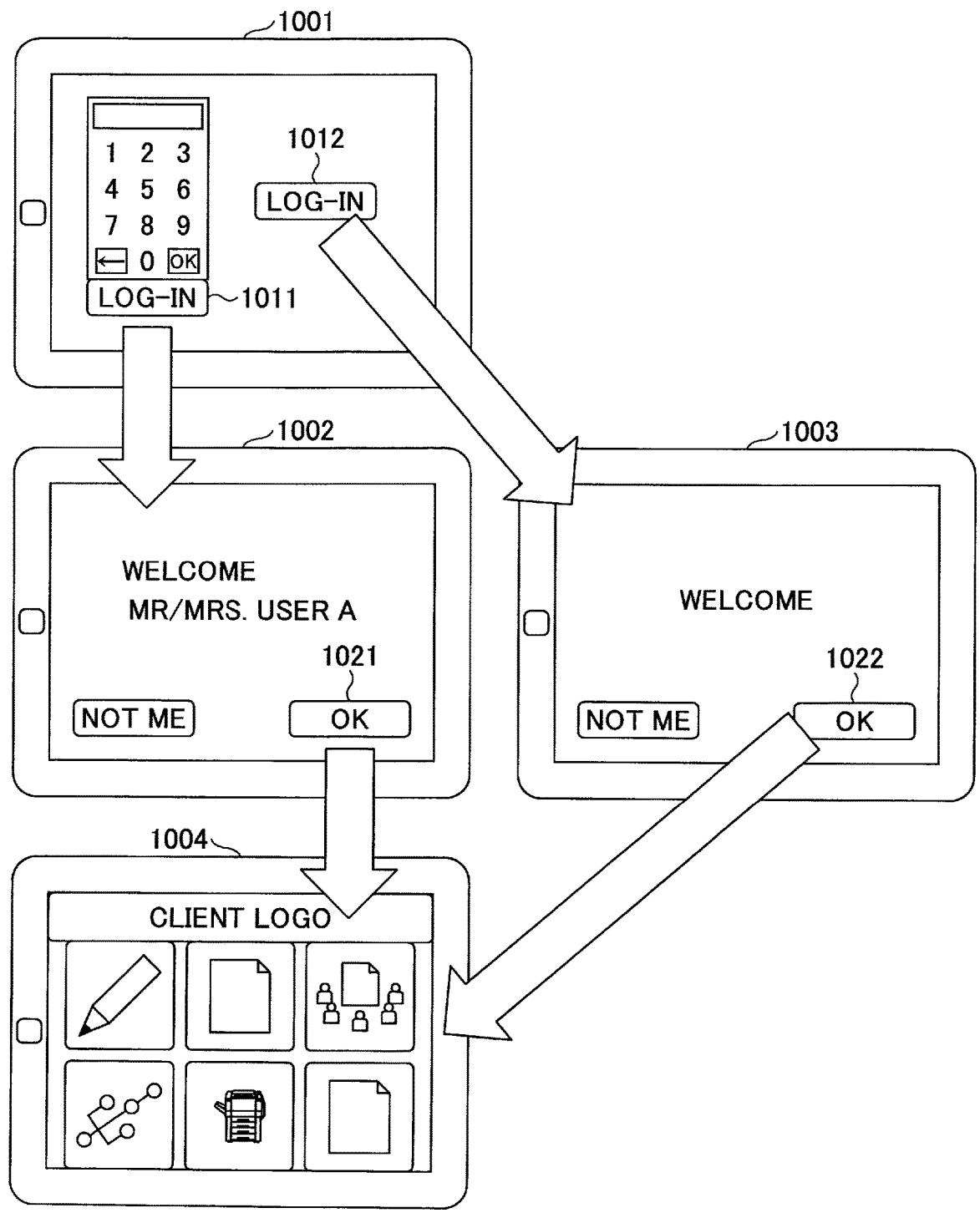
FIG. 11 is an image diagram illustrating an example of a login process performed by a participant terminal, according to an embodiment of the present invention.

In the conference system 1 according to the present embodiment, in such a case where an administrator such as an operator or an administrating office hosting a conference offers participant terminals 12B for the conference, each participant terminal 12B may log in to a conference server device 10 as explained at Step S10 of FIG. 6, through such a procedure as illustrated in FIG. 11.

FIG. 11 is an image diagram illustrating an example of a login process performed by a participant terminal. The display control unit 64 of a participant terminal 12B displays a login screen 1001 at a time of login. The login screen 1001 is provided with a login button 1011 for logging in with a number to specify a participant and a login button 1012 for logging in without specifying a user. For example, the name of a participant may be checked at a reception of a conference to specify a number of the participant. Then, a person at the reception enters the specified number of the participant to the login screen 1001 and then presses the login button 1011.

When the login with the number succeeds, the participant terminal 12B displays a login-success screen 1002. On the login-success screen 1002 illustrated in FIG. 11, the name of the participant specified by the number is displayed. When an OK button 1021 on the login-success screen 1002 is pressed, the participant terminal 12B displays a portal screen 1004. The portal screen 1004 is a screen displayed before the conference is started.

Note that, in a case where the login button 1012 for logging in without specifying a user is pressed, the participant terminal 12B displays a login-success screen 1003. When an OK button 1022 on the login-success screen 1003 is pressed, the participant terminal 12B displays the portal screen 1004.

Figure 12:
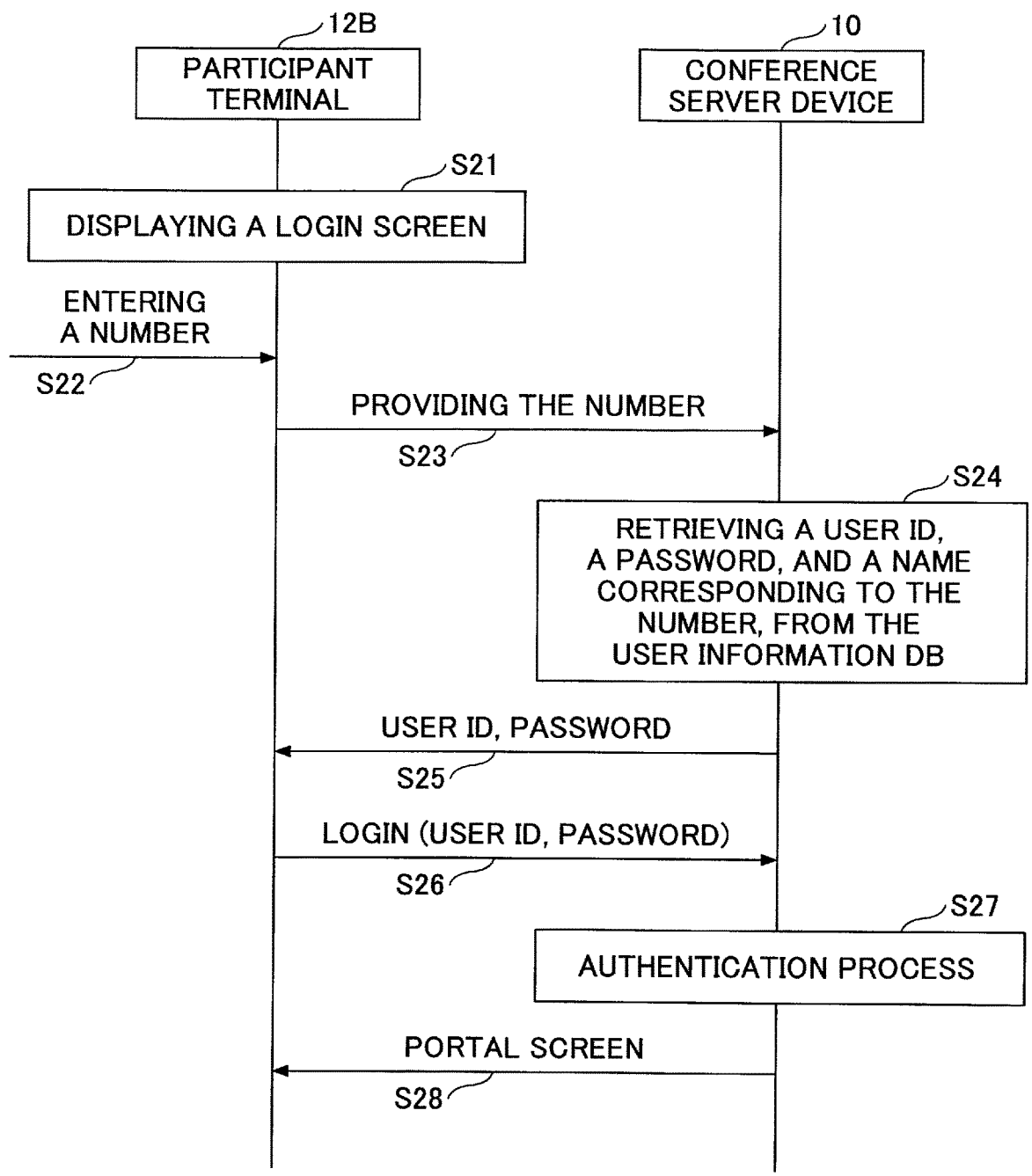
FIG. 12 is a sequence diagram illustrating an example of a login process for logging in with a number to specify a participant, according to an embodiment of the present invention.

The login process for logging in with a number to specify a participant is performed through such a procedure as illustrated in FIG. 12. FIG. 12 is a sequence diagram illustrating an example of a login process for logging in with a number to specify a participant.

At Step S21, the display control unit 64 of a participant terminal 12B displays a login screen 1001 as illustrated in FIG. 11. At Step S22, the operation accepting unit 52 of the participant terminal 12B accepts such a login operation as entering a number on the login screen 1001 and pressing a login button 1011. Upon accepting the login operation, at Step S23, the login processing unit 62 of the participant terminal 12B provides the number to the conference server device 10 via the communication unit 51 to request for a user ID and a password corresponding to the number.

A number to specify a participant is registered in the conference server device 10 as user information, in association with a user ID and a password, as illustrated in FIG. 13. FIG. 13 is a configuration diagram illustrating an example of user information. In the user information illustrated in FIG. 13, each number is associated with a user ID, a password, and a name of a participant.

At Step S24, the information management unit 91 of a conference server device 10 retrieves, from the user information DB 84, a user ID, a password and a name corresponding to the number provided at Step S23. At Step S25, the information management unit 91 of the conference server device 10 provides the user ID, the password and the name corresponding to the number to the participant terminal 12B via the communication unit 81.

At Step S26, the login processing unit 62 of the participant terminal 12B requests for login to the conference server device 10 via the communication unit 51, designating authentication information such as the user ID and the password provided at Step S25. At Step S27, the authentication unit 83 of the conference server device 10 determines whether the login succeeds or fails, based on an authentication process for determining whether the designated user ID and password match a pre-registered user ID and password. In a case where the login succeeds, at Step S28, the conference server device 10 transmits screen information of a portal screen 1004 to the participant terminal 12B via the communication unit 81, so that the display control unit 64 of the participant terminal 12B displays the portal screen 1004. Further, in a case where the login fails, the authentication unit 83 of the conference server device 10 provides information indicative of failure of login to the participant terminal 12B via the communication unit 81.

According to the login process as illustrated in FIG. 11, a participant terminal 12B is able to login to a conference server device 10 with a user ID and a password, through such a simple operation as entering a number. Note that, in a case where a participant terminal 12B has anonymously logged in without a user ID and a password, the participant terminal 12B first closes the session established with the conference server device 10, and then performs, by means of the login processing unit 62, a login process using a user ID and a password, so as to be logged back in as a user specified by the user ID.

<<Joining a Conference>>

Figure 14:
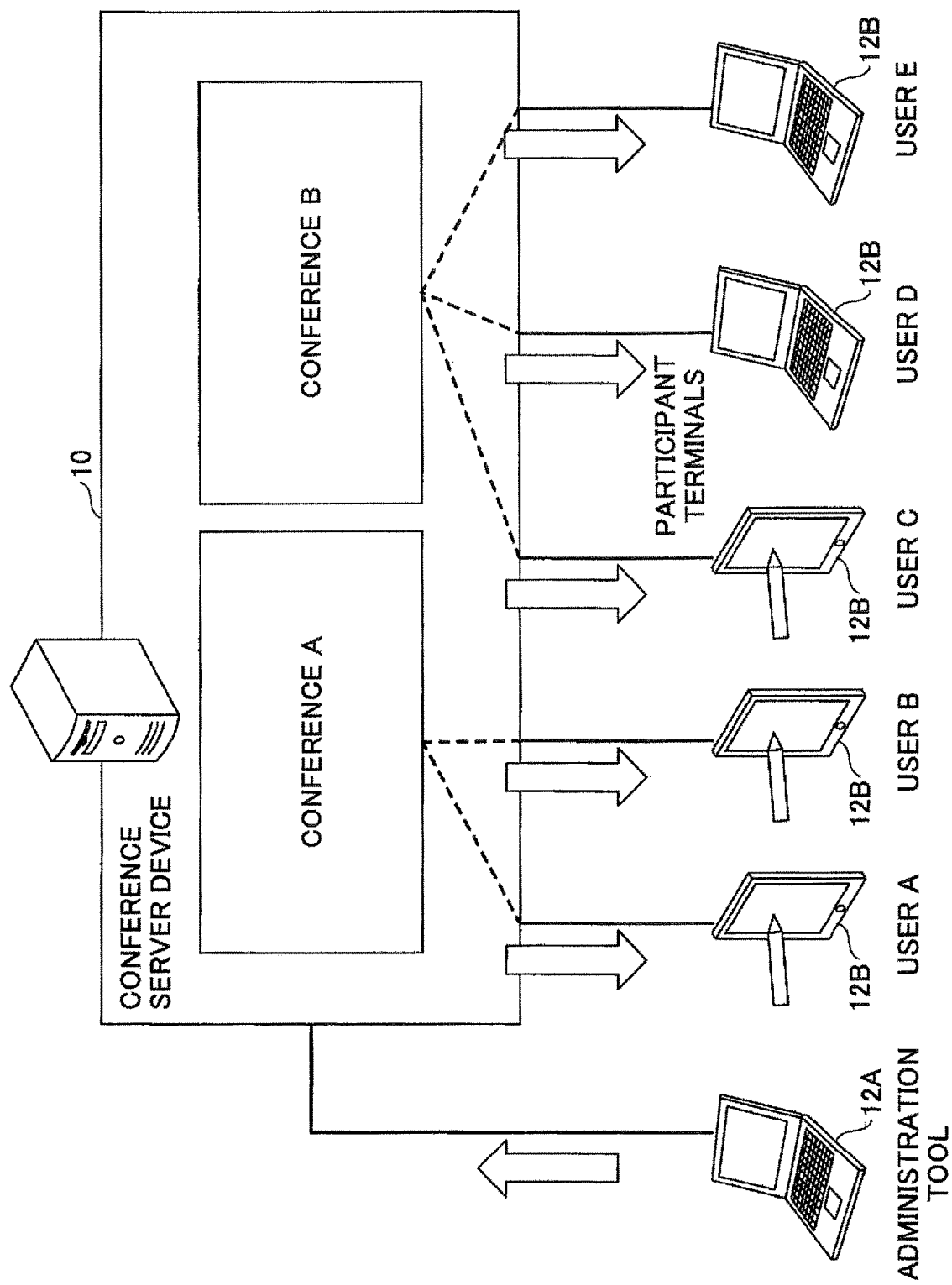
FIG. 14 is an image diagram illustrating an example of a procedure for a participant terminal to perform a process for joining a conference, based on an instruction to join a conference, which is provided from an administration tool, according to an embodiment of the present invention.

Next, the following description explains an example of controlling a participant terminal 12B to join a session for a conference, which is managed by a conference server device 10. FIG. 14 is an image diagram illustrating an example of a procedure for a participant terminal to perform a process for joining a conference, based on an instruction to join a conference, which is provided from an administration tool. An administrator selects "JOINING CONFERENCE" on a screen 1100 of an administration tool through a command-select. Then, the administrator selects a conference and a user and presses the enter button 1101.

The communication control unit 41 of the administration tool transmits a message including an instruction for joining a conference, which is directed to each user designated on the screen 1100, to a conference server device 10 via the communication unit 21. Upon receiving the message via the communication unit 81, the instruction delivery unit 92 of the conference server device 10 transmits, via the communication unit 81, a message including an instruction for joining a conference to each participant terminal 12B designated as a destination of the message, so as to deliver the instruction to each participant terminal 12B. A participant terminal 12B performs a process for joining a conference, based on the instruction included in the message received via the communication unit 21. The message including the instruction for joining the conference is exemplified by the message illustrated in FIG. 9B, supposing that the message designates "CONFERENCE A" or "CONFERENCE B" as a conference ID.

For example, in FIG. 14, an example of controlling participant terminals 12B of "USER A" and "USER B" to join "CONFERENCE A" is illustrated. Further, in FIG. 14, an example of controlling participant terminals 12B of "USER C", "USER D", and "USER E" to join "CONFERENCE B" is illustrated. For example, the administration tool adds an instruction for joining "CONFERENCE A" to a message directed to "USER A" and "USER B". Further, the administration tool adds an instruction for joining "CONFERENCE B" to a message directed to "USER C", "USER D", and "USER E". Note that, in a case where the administrator desires to simply transmit a message to participants of "CONFERENCE A", designation of destinations is not required, and the administrator may designate "CONFERENCE A" as a conference ID.

In the example of FIG. 14, upon receiving the message, each of the participant terminals 12B of "USER A" and "USER B" performs a process for joining "CONFERENCE A". Further, in the example of FIG. 14, upon receiving the message, each of the participant terminals 12B of "USER C", "USER D", and "USER E" performs a process for joining "CONFERENCE B". Note that each of the participant terminals 12B performs the process for joining a conference, based on information indicative of an instruction for joining a conference, which is included in a message as illustrated in FIG. 9B.

In the conference system 1 according to the present embodiment, through such a procedure as illustrated in FIG. 14, an administrator is able to collectively control, through an administration tool of an administrator terminal 12A, participant terminals 12B connected to a conference server device 10 to join a conference. Note that a process for leaving a conference can be performed, by use of a message as illustrated in FIG. 9C, through a procedure similar to the process for joining a conference.

Figure 15:
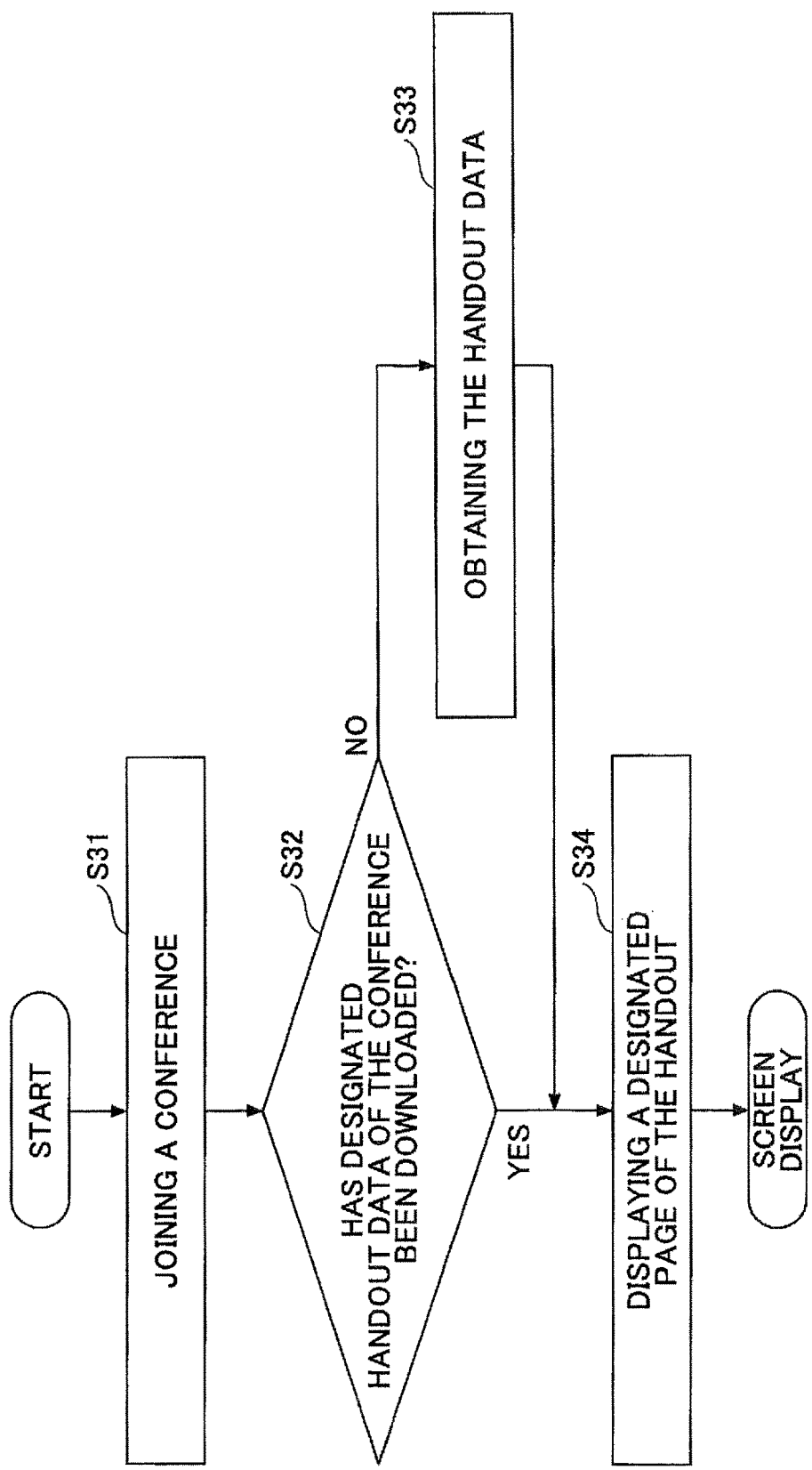
FIG. 15 is a flowchart illustrating an example of a process performed by a participant terminal at a time of joining a conference, according to an embodiment of the present invention.

Note that, although an example of controlling participant terminals 12B to preliminarily download a handout before a conference is started is explained in the above description with respect to the conference system 1 according to the present invention, there may be a case where download of a handout has failed or a case of using a participant terminal 12B that has not been provided with a download instruction from an administration tool. Therefore, a participant terminal 12B performs such a process as illustrated in FIG. 15, at the time of joining a conference. FIG. 15 is a flowchart illustrating an example of a process performed by a participant terminal at the time of joining a conference.

At Step S31, a participant terminal 12B receives a message including an instruction for joining a conference and performs a process for joining a conference, based on the message. At Step S32, the participant terminal 12B determines whether or not handout data of the conference, which is designated by the message, has been downloaded.

In a case where the handout data of the conference, which is designated by the message, has not been downloaded, at Step S33, the participant terminal 12B downloads the handout data of the conference from a conference server device 10. After the handout data of the conference is downloaded at Step S33, the participant terminal 12B displays a designated page of the handout at Step S34. Note that, in a case of having the handout date of the conference, which is designated by the message, the participant terminal 12B skips Step S33 and displays the designated page of the handout.

Note that, in the conference system 1 according to the present embodiment, a message including an instruction for responding back with a handout ID of downloaded handout data may be transmitted to a participant terminal 12B through an administration tool, so as to cause the participant terminal 12B to provide a response to the conference server device 10 along with a handout ID of handout data that has been successfully downloaded. Based on the response, an administrator is able to check, through an administration tool, participant terminals 12B that have failed to download the handout data or that have not downloaded the handout data.

Figure 16:
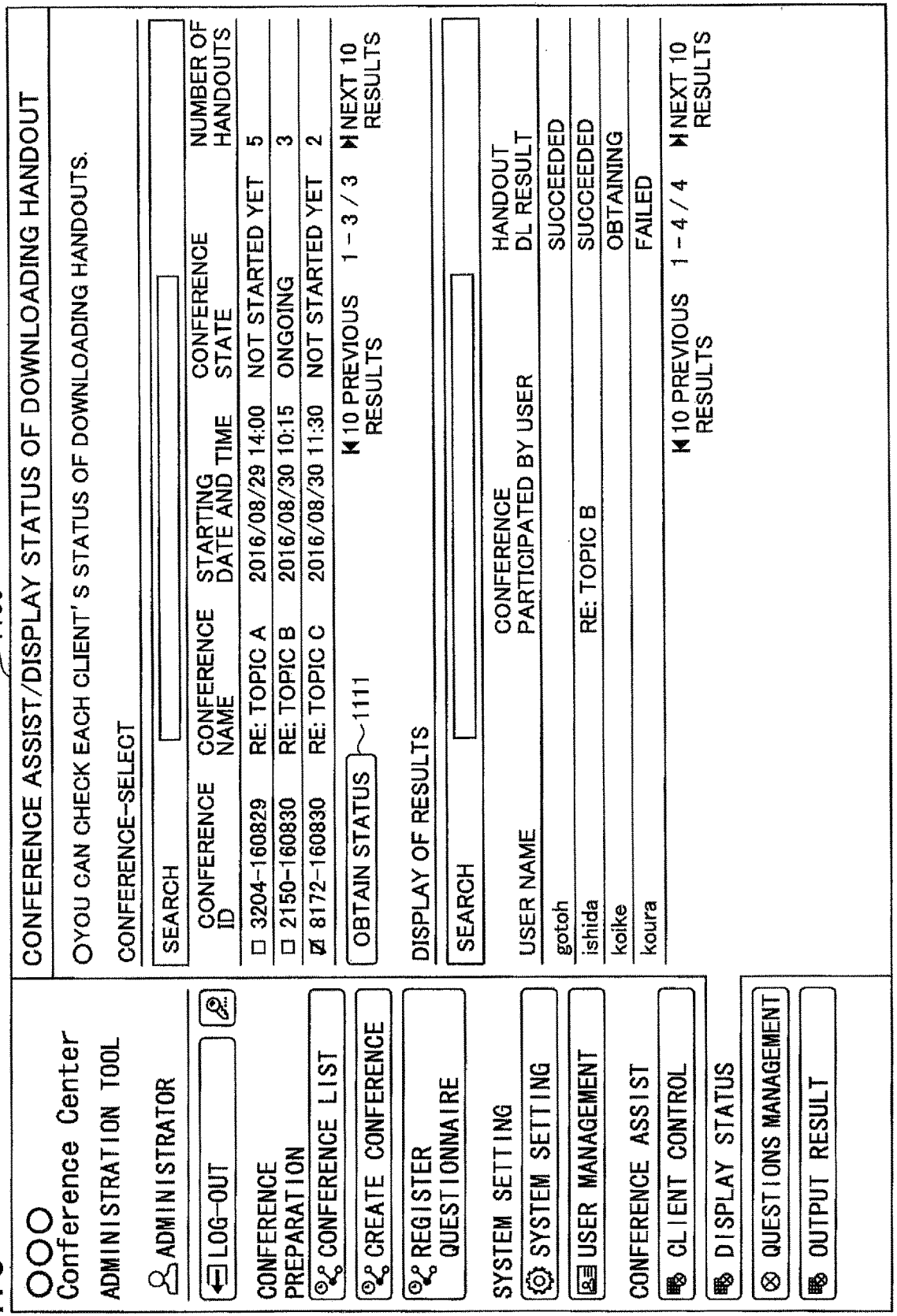
FIG. 16 is an image diagram illustrating another example of a screen of an administration tool, according to an embodiment of the present invention.

FIG. 16 is an image diagram illustrating another example of a screen of an administration tool. A screen 1100 of the administration tool illustrated in FIG. 16 is an example of a screen displayed in a case of selecting "DISPLAY STATUS"

tab, which is included in the "CONFERENCE ASSIST" functions. On the screen 1100 illustrated in FIG. 16, when an administrator presses an obtain-status button 1111, the status acquiring unit 42 transmits a message to request for a status information to a participant terminal 12B via a conference server device 10, so that the status providing unit 93 of the conference server device 10 obtains, via the communication unit 81, status information included in a response to be transmitted by the participant terminal 12B, which is indicative of such a status as to whether the participant terminal 12B has downloaded a handout. The status providing unit 93 transmits, via the communication unit 81 to the administrator terminal 12A, the status information that has been obtained and status information that is indicative of a participation status of the participant terminal 12B, which is managed by the information management unit 91 of the conference server device 10. The status acquiring unit 42 of the administrator terminal 12A obtains the status information, which is received by the communication unit 51, and displays a status of each participant terminal 12B on the screen 1100, based on acquired status information. In the screen example as illustrated in FIG. 16, for each user corresponding to a participant terminal 12B, the conference in which the user is participating and the download status of handout data are displayed as a status of a participant terminal 12B.

As described above, in the conference system 1 according to the present embodiment, a mechanism for controlling a participant terminal 12B through an administration tool is achieved. The mechanism in the conference system 1 according to the present embodiment enables to control a participant terminal 12B to perform a process for downloading a handout, joining a conference, etc., based on an instruction provided through an administration tool of an administrator terminal 12A, such a process having conventionally been performed by a participant or an administrator by operating the participant terminal 12B. That is to say, in the conference system 1 according to the present embodiment, a burden on a participant or an administrator may be reduced.

Note that an instruction provided through an administration tool is not limited to downloading a handout, joining a conference, leaving a conference, deleting a handout and obtaining a status, which are taken as examples of the instruction in the present embodiment. Further, a message including an instruction provided through an administration tool may be replaced by any other form of processes that can be performed at each stage of a conference, such as before a conference, during a conference, or after a conference.

Second Embodiment

In the second embodiment, a memo function used by a participant terminal 12B during a conference is added to the conference system 1 according to the first embodiment. Note that the explanation of the conference system 1 according to the first embodiment is on the premise that handout data is downloaded to a participant terminal 12B. In a conference system 1 according to the second embodiment, a setting as to whether taking out of handout data is "allowed" or "not allowed" can be provided. Taking out of handout data means to download handout data that is registered to a conference to a device personally owned by a participant or to print out the handout data by use of a copy machine, etc. Note that the second embodiment is the same as the first embodiment for the most part, and therefore explanation of the second embodiment may be partly omitted where appropriate. The memo function used by a participant terminal 12B during a conference may be utilized through processing that follows Step S34 of FIG. 15.

<Processing>
<<Preliminary Setting>>

The memo function used by a participant terminal 12B during a conference requires a preliminary setting as explained below, regarding taking out of handout data. The preliminary setting regarding taking out of handout data may be performed as a process performed at Step S12 of FIG. 6, for example.

Specifically, in the flow as illustrated in FIG. 7, an administrator operates an administration tool to perform a preliminary setting regarding taking out of handout data. FIG. 19 is an image diagram illustrating an example of a screen of an administration tool. A screen 1100 of the administration tool as illustrated in FIG. 19 is an example of a screen displayed in a case of selecting "CREATE CONFERENCE" tab, which is included in the "CONFERENCE PREPARATION" functions on the screen 1100 of the administration tool illustrated in FIG. 8.

An administrator may provide, on the screen 1100 of the administration tool illustrated in FIG. 19, a setting to a setting item "TAKING OUT OF HANDOUT" with either "ALLOWED" or "NOT ALLOWED", at the time of creating a conference. Taking out of handout data is allowed in a case where "ALLOWED" is set to the setting item "TAKING OUT OF HANDOUT" with respect to the handout data, on the screen 1100 of the administration tool illustrated in FIG. 19. Contrarily, taking out of handout data is not allowed in a case where "NOT ALLOWED" is set to the setting item "TAKING OUT OF HANDOUT" with respect to the handout data, on the screen 1100 of the administration tool illustrated in FIG. 19.

Further, an administrator may operate a screen 1200 for registering handout data as illustrated in FIG. 20, to provide a setting to the setting item "TAKING OUT OF HANDOUT" with either "ALLOWED" or "NOT ALLOWED" with respect to each handout data registered to a conference. FIG. 20 is an image diagram illustrating an example of a screen for registering handout data. The screen 1100 illustrated in FIG. 19 is an example of a screen displayed in a case where taking out of handout data of handout name "PRESENTATION HANDOUT" is allowed and taking out of handout data of handout name "REFERENCE HANDOUT" is not allowed.

Based on settings provided on the screen 1100 of an administration tool as illustrated in FIG. 19 and the screen 1200 for registering handout data as illustrated in FIG. 20, the conference management unit 82 of a conference server device 10 may create conference information as illustrated in FIG. 21. FIG. 21 is a configuration diagram illustrating an example of conference information provided, as parameters, with settings as to whether taking out of handout data is allowed or not allowed. Note that a setting item "ALLOWANCE FOR TAKING OUT OF HANDOUT OF CONFERENCE" of the conference information as illustrated in FIG. 21 includes information indicative of a setting provided to the setting item "TAKING OUT OF HANDOUT" on the screen 1100 illustrated in FIG. 19. A setting item "ALLOWANCE FOR TAKING OUT" of the conference information as illustrated in FIG. 21 includes information indicative of a setting provided to the setting item "TAKING OUT OF HANDOUT" on the screen 1200 illustrated in FIG. 20.

Ina case where the setting item "ALLOWANCE FOR TAKING OUT OF HANDOUT OF CONFERENCE" of the conference information as illustrated in FIG. 21 is "NOT ALLOWED", the setting item "ALLOWANCE FOR TAKING OUT" with respect to all handout data that are registered to a conference becomes "NOT ALLOWED".

<<Memo Function during a Conference>>

In the conference system 1 according to the second embodiment, processing as illustrated in FIG. 15 is performed in a state where a preliminary setting of conference information is provided as illustrated in FIG. 21. Through the processing as illustrated in FIG. 15, a participant terminal 12B joins a conference at Step S31, and then displays a designated page of handout data at Step S34. Note that, at Step S31, the participant terminal 12B receives conference information as illustrated in FIG. 21, which corresponds to a conference ID of a conference to join, from the conference server device 10. The memo function used by the participant terminal 12B during the conference may be utilized through processing that follows Step S34 of FIG. 15, at which a handout is displayed.

As described above, during a conference, a handout displayed on a participant terminal 12B operated by a presenter is also displayed on participant terminals 12B operated by participants other than the presenter. A participant terminal 12B operated by a participant other than the presenter includes a presenter mode, such that the participant terminal 12B operated by a participant other than the presenter receives, via the conference server device 10, an operation (i.e. turning a page, etc.) entered to the participant terminal 12B operated by the presenter on a real-time basis, so that the displayed is shared.

Additionally, a participant terminal 12B operated by a participant other than the presenter includes a personal mode, such that the participant terminal 12B operated by a participant other than the presenter does not cause the participant terminal 12B operated by the presenter to share the displayed screen. A participant other than the presenter may switch modes to the personal mode for personally providing an operation to a handout or for using the memo function. FIG. 22 is a flowchart illustrating an example of a process for a participant, other than a presenter, to use a memo function during a conference.

A participant, other than a presenter, who uses the memo function during a conference, operates a participant terminal 12B at Step S201 to request for switching modes from the presenter mode to the personal mode. The conference application unit 53 of the participant terminal 12B switches modes from the presenter mode to the personal mode. At Step S202, the participant operates the participant terminal 12B, to request for the memo function. The conference application unit 53 of the participant terminal 12B accepts selection of the memo function.

Figure 23A:
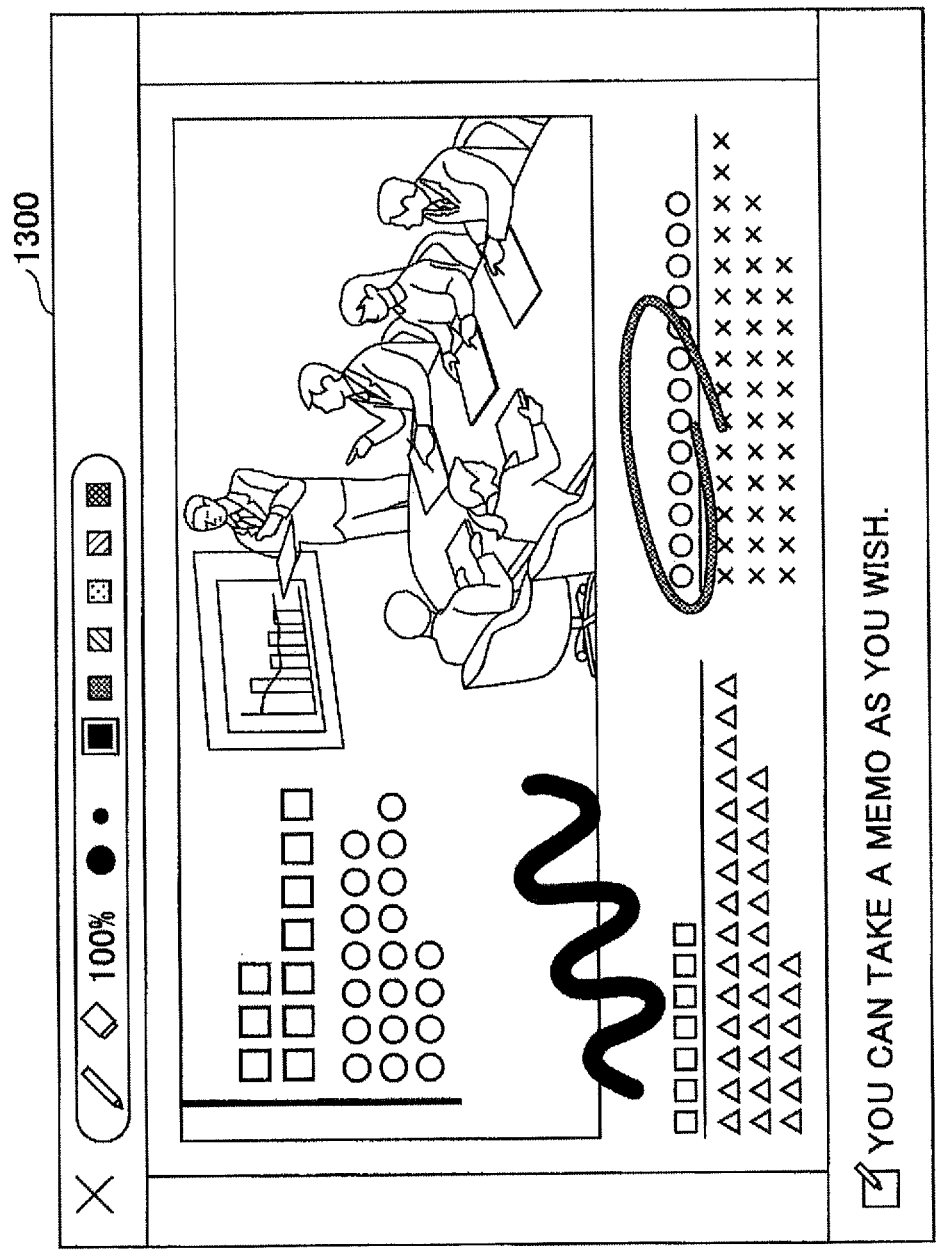
FIG. 23A is an image diagram illustrating an example of a screen for taking a memo, according to an embodiment of the present invention.

At Step S203, the conference application unit 53 of the participant terminal 12B determines whether a setting as to taking out of handout data is "ALLOWED" or "NOT ALLOWED", with respect to handout data on which the participant will use the memo function. Determination about the setting as to taking out of handout data may be performed by reference to conference information as illustrated in FIG. 21, which is received from a conference server device 10. In a case where the setting as to taking out of handout data on which the memo function is used is "ALLOWED", the conference application unit 53 of the participant terminal 12B displays, at Step S204, a screen 1300 on which a memo can be taken on a handout that is displayed based on the handout data, as illustrated in FIG. 23A. The conference application unit 53 of the participant terminal 12B enables taking a memo on the handout, based on an operation from the participant.

Figure 23B:
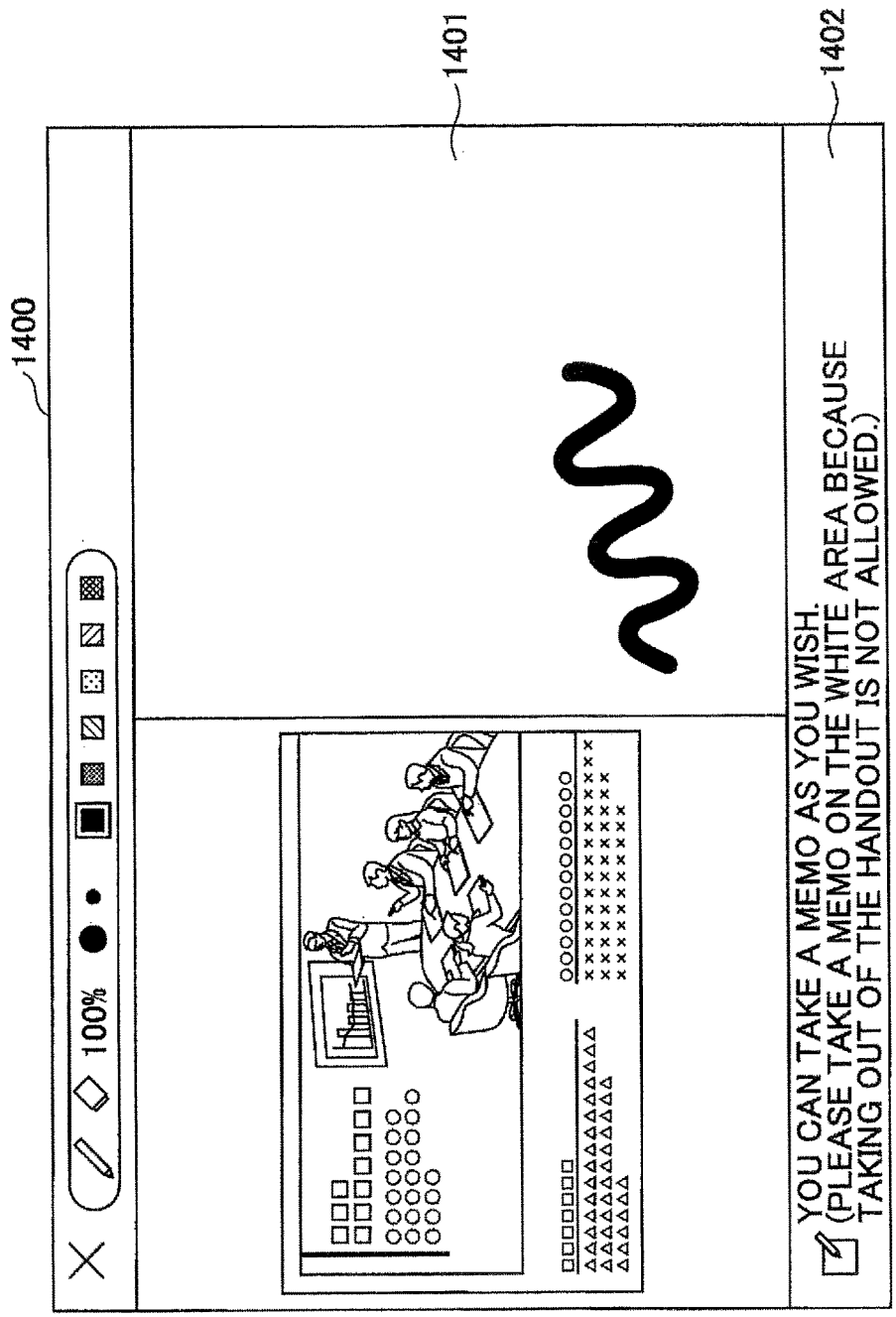
FIG. 23B is an image diagram illustrating an example of a screen for taking a memo, according to an embodiment of the present invention.

Contrarily, in a case where the setting as to taking out of handout data on which the memo function is used is "NOT ALLOWED", the conference application unit 53 of the participant terminal 12B displays, at Step S205, a screen 1400 including a blank memo area 1401 as illustrated in FIG. 23B. At Step S206, the conference application unit 53 of the participant terminal 12B displays, on a message area 1402 of the screen 1400, a caution indicating that memos cannot be taken on the handout. At Step S207, the conference application unit 53 of the participant terminal 12B enables taking a memo on the memo area 1401, based on an operation from the participant. Note that the reason for using the blank memo area 1401 for taking a memo, in the case where the setting as to taking out of handout data on which the memo function is used is "NOT ALLOWED", is as explained in the following description.

For example, in a case of taking a memo on a handout as illustrated in FIG. 23A, a participant may take a memo using (i.e., in relation with) description of a displayed handout. In such a case, the participant may understand the meaning or the purpose of the memo only when seeing the memo being taken on the handout. However, even though a memo is taken on a handout, in a case where the participant is not allowed to take out the handout, the participant may not understand the meaning or the purpose of the memo, because the participant only obtains the memo. Therefore, in the present embodiment, in a case where the setting as to taking out of handout data is "NOT ALLOWED", a participant has to take a memo on the memo area 1401 as illustrated in FIG. 23B, so that the participant is encouraged to take a memo such that the participant can understand the meaning or the purpose without the handout.

The memo area 1401 may be created on a basis of each page of a handout, a handout, or a conference. In a case of using one memo area 1401 for a conference, the memo area 1401 including memos taken in the conference is displayed, no matter which page of the memo function is used. Note that in a case where all space of the memo area 1401 is taken because of memos, a memo page may be added to obtain more space to take memos.

In a case of using one memo area 1401 for a page of a handout, for example, when the memo function is used while displaying the second page of the handout, a memo that was taken on the second page of the handout is displayed. When the memo function is used while displaying a page other than the second page, a memo corresponding to the page is displayed. On the memo area 1401, taking a memo, editing a memo, and deleting a memo can be performed.

FIG. 24 is a configuration diagram illustrating an example of memo data of memos taken by use of a memo function during a conference. The memo data illustrated in FIG. 24 includes columns of handout IDs, page numbers, pen colors, pen sizes, and stroke coordinates. Stroke coordinates are represented by aggregation of combinations of an X-coordinate and a Y-coordinate expressing a stroke. Memo data is stored in each participant terminal 12B until the end of a conference. Then, after the end of a conference, a participant terminal 12B transmits, to a conference server device 10, the memo data in association with information indicative of the participant who took the memo of the memo data, through a procedure as illustrated in FIG. 25.

Figure 25:
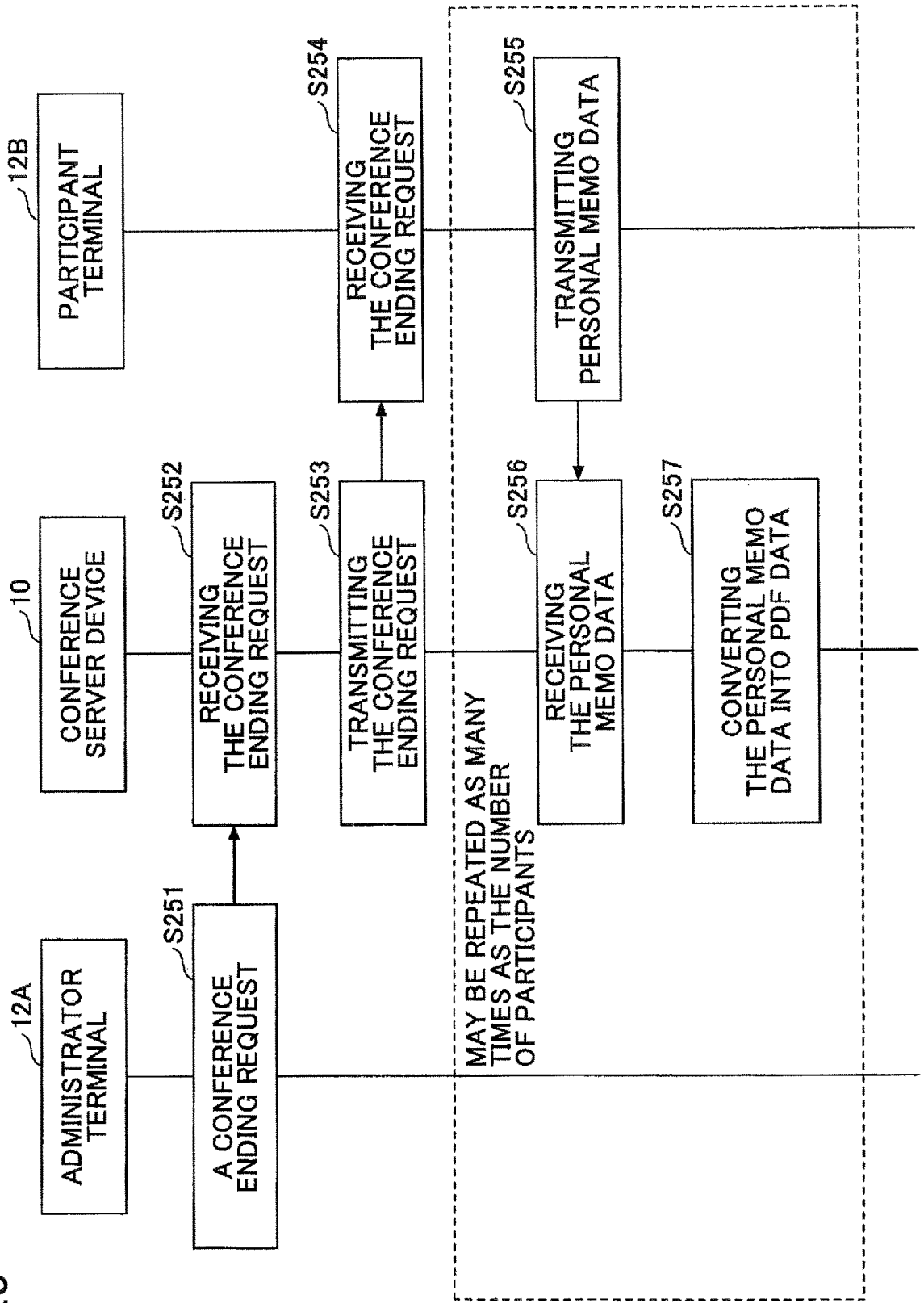
FIG. 25 is a sequence diagram illustrating an example of a process for transmitting memo data from a participant terminal to a conference server device, according to an embodiment of the present invention.

FIG. 25 is a sequence diagram illustrating an example of a process for transmitting memo data from a participant terminal to a conference server device. The conference application unit 53 of a participant terminal 12B stores and manages memo data until the end of a conference. When a conference ends, the administration tool unit 23 of an administrator terminal 12A transmits, at Step S251, a conference ending request to a conference server device 10.

The conference management unit 82 of the conference server device 10, which has received the conference ending request at Step S252, transmits the conference ending request to a participant terminal 12B. At Step S254, the conference application unit 53 of the participant terminal 12B receives the conference ending request. At Step S255, the conference application unit 53 of the participant terminal 12B transmits, to the conference server device 10, memo data of a memo taken by the participant by use of the memo function during the conference. The conference management unit 82 of the conference server device 10, which has received the memo data at Step S256, converts the memo data into PDF data, at Step S257. Note that conversion of the memo data into PDF data is an example of a process for electronically distributing, exchanging, and storing memo data. Note that the process at Step S257 may be performed as a background task (i.e. by use of a sub-thread) of the conference server device 10, as appropriate. The processes of Steps S255 through S257 are repeated as many times as the number of participants in the conference.

Figure 26:
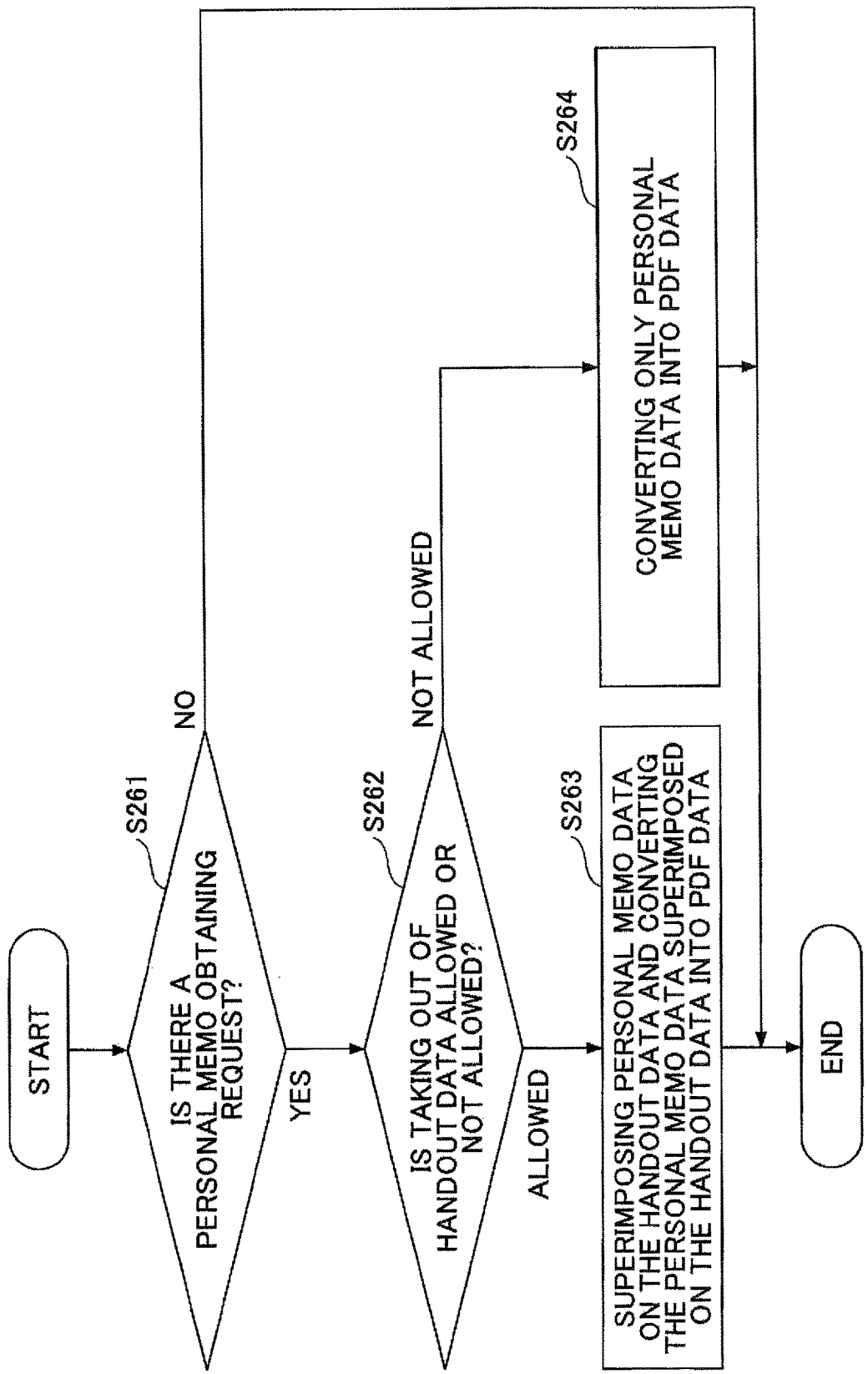
FIG. 26 is a flowchart illustrating an example of a process for converting memo data into PDF data, according to an embodiment of the present invention.

Conversion of memo data into PDF data at Step S257 is performed through a procedure as illustrated in FIG. 26. FIG. 26 is a flowchart illustrating an example of a process for converting memo data into PDF data. At Step S261, the conference management unit 82 of the conference server device 10 determines whether there is a personal memo obtaining request (i.e., a request for taking out a memo) from a participant corresponding to memo data.

In a case where there is not a personal memo obtaining request from a participant corresponding to memo data, the conference management unit 82 of the conference server device 10 terminates the processing of the flowchart as illustrated in FIG. 26. Thus, in a case where there is not a personal memo obtaining request from a participant corresponding to memo data, the conference management unit 82 of the conference server device 10 does not perform a process for converting memo data into PDF data, and therefore a process load is reduced.

In a case where there is a personal memo obtaining request from a participant corresponding to memo data, the conference management unit 82 of the conference server device 10 determines whether the setting as to taking out of handout data is "ALLOWED" or "NOT ALLOWED", at Step S262. In a case where the setting as to taking out of handout data is "ALLOWED", the conference management unit 82 of the conference server device 10 superimposes the memo data on the handout data and converts the memo data superimposed on the handout data into PDF data, at Step S263. In a case where the setting as to taking out of handout data is "NOT ALLOWED", the conference management unit 82 of the conference server device 10 performs a process for converting the memo data into PDF data at Step S264.

As the process for converting into PDF data may be performed as a background task (i.e., by use of a sub-thread), a participant may transmit a personal memo obtaining request at a timing desired by the participant. For example, in a case where a participant, who has not transmitted a personal memo obtaining request, transmits a personal memo obtaining request, the conference management unit 82 of the conference server device 10 may perform the process for converting into PDF data, based on the newly received personal memo obtaining request, after processing all tasks of performing the process for converting into PDF data.

Figure 27:
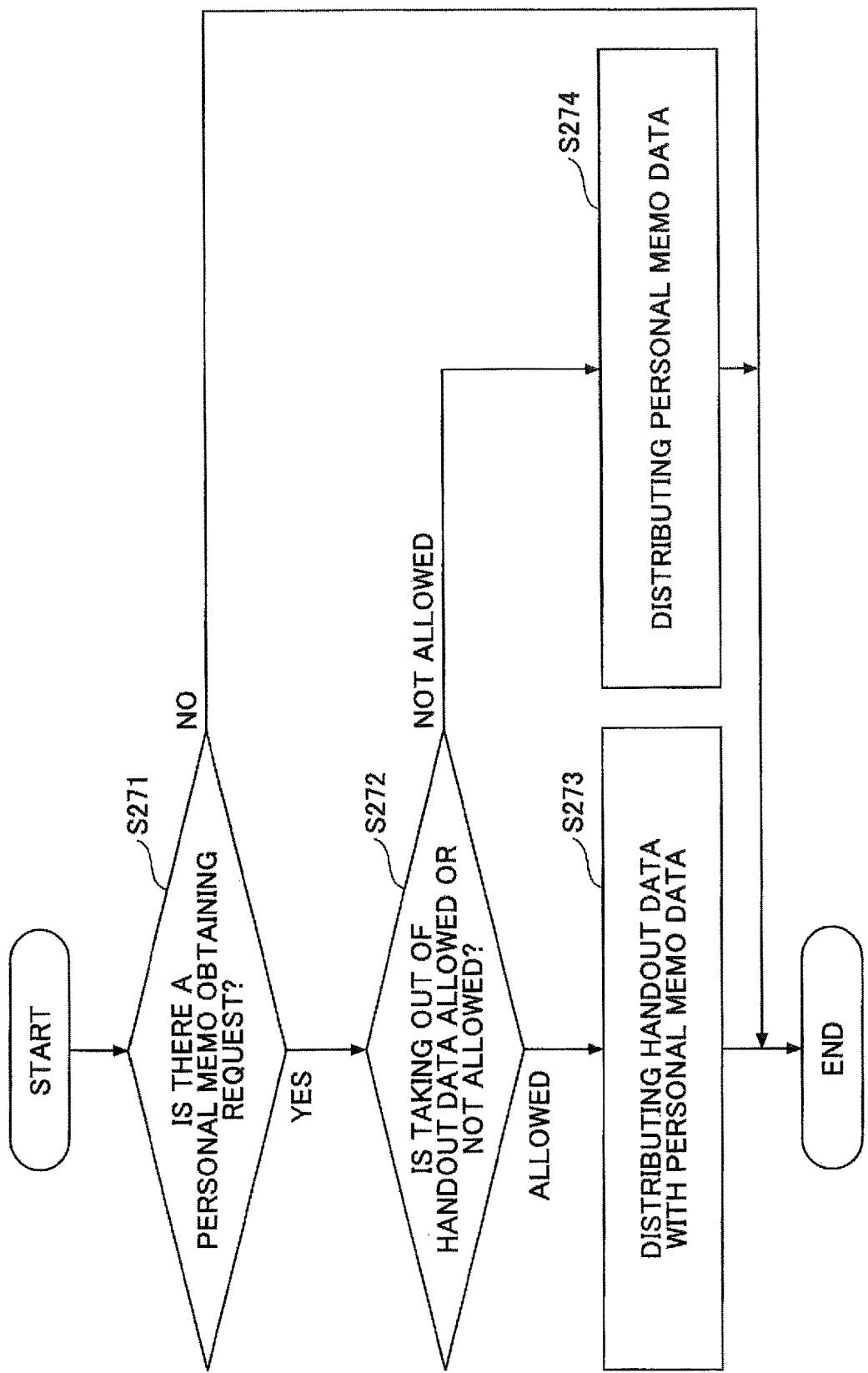
FIG. 27 is a flowchart illustrating an example of a process for distributing a personal memo to a participant, according to an embodiment of the present invention.

Distribution of a personal memo to a participant is performed through a procedure as illustrated in FIG. 27. FIG. 27 is a flowchart illustrating an example of a process for distributing a personal memo to a participant. A participant operates a portal screen 1004 displayed on a participant terminal 12B, to indicate an intention to obtain memo data of a memo taken during a conference.

At Step S271, the conference management unit 82 of the conference server device 10 determines whether there is a personal memo obtaining request. In a case where there is not a personal memo obtaining request from a participant, the conference management unit 82 of the conference server device 10 terminates the processing of the flowchart illustrated in FIG. 27. In a case where there is a personal memo obtaining request from a participant, the conference management unit 82 of the conference server device 10 determines whether the setting as to taking out of handout data is "ALLOWED" or "NOT ALLOWED", at Step S272. In a case where the setting as to taking out of handout data is "ALLOWED", the conference management unit 82 of the conference server device 10 superimposes the memo data on the handout data and distributes PDF data converted from the memo data superimposed on the handout data, at Step S273. In a case where the setting as to taking out of handout data is "NOT ALLOWED", the conference management unit 82 of the conference server device 10 distributes PDF data converted from the memo data, at Step S274.

Note that distribution of a file converted into a PDF format may be performed in various ways. For example, in a case of immediately distributing a file converted into a PDF format, a participant may be informed of a URL, which is prepared for the purpose of distribution. Further, the file converted into a PDF format may be sent via an email. Further, in a need of distributing the file converted into a PDF format for a purpose of promoting a business, the file converted into a PDF format may be distributed via a person who is in charge of the promotion.

Third Embodiment

In the third embodiment, a log function for saving an operation history during a conference and a function for utilizing an operation history saved during a conference are added to the conference system 1 according to the first embodiment or the second embodiment. Note that the conference system 1 according to the third embodiment is the same as the conference system 1 according to the first embodiment or the second embodiment for the most part, and therefore explanation of the third embodiment may be partly omitted where appropriate.

<Processing>

<<Log Function for Saving an Operation History During a Conference>>

Figure 28:
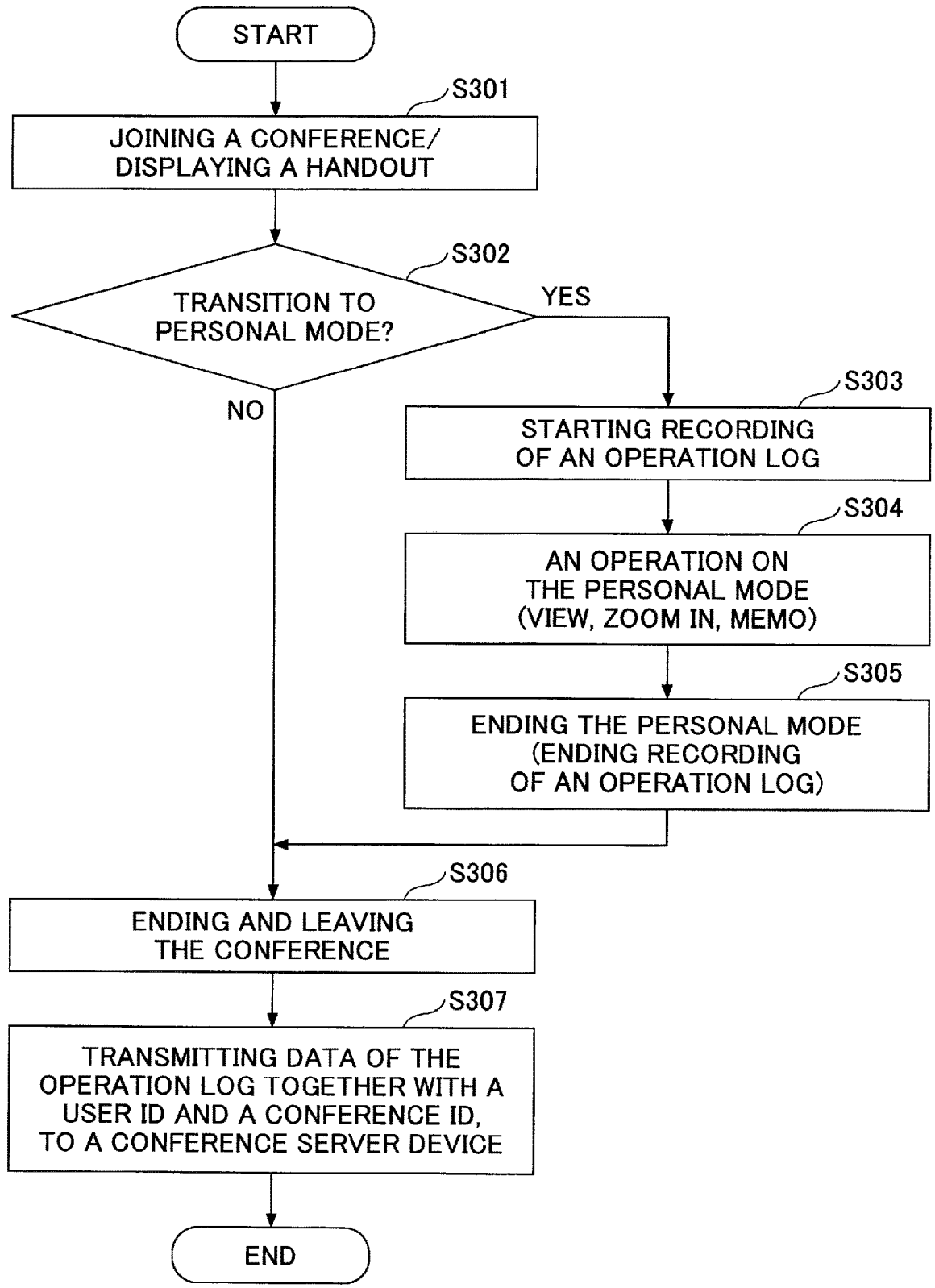
FIG. 28 is a flowchart illustrating an example of a processing procedure of a log function for saving an operation history during a conference, according to an embodiment of the present invention.

FIG. 28 is a flowchart illustrating an example of a processing procedure of a log function for saving an operation history during a conference. The processes in the flowchart illustrated in FIG. 28 are performed in parallel with the processes as previously explained with reference to FIG. 22. FIG. 28 is a flowchart of processing for a participant terminal 12B to collect an operation history during a conference and to save the operation history in a conference server device 10. Note that an operation history in personal mode during a conference includes viewing another page, zooming in on a screen, taking a memo, etc. Such an operation history in personal mode during a conference is indicative of interest of a participant.

At Step S301, the conference application unit 53 of a participant terminal 12B performs a process for joining a conference and displaying a handout. Upon transition from presenter mode to personal mode, the processing proceeds from Step S302 to Step S303, at which the information management unit 65 of the participant terminal 12B starts a process for recording an operation history in the personal mode as an operation log. At S304, the information management unit 65 records such an operation log as illustrated in FIG. 29.

FIG. 29 is a configuration diagram illustrating an example of an operation log recorded by a participant terminal. The operation log illustrated in FIG. 29 includes columns of handout IDs, pages, operations, starting times/ending times, and detailed data. Upon transition from the personal mode to the presenter mode (i.e., upon the end of the personal mode), the information management unit 65 ends the process for recording an operation history during the personal mode as an operation log.

At Step S306, the conference application unit 53 of the participant terminal 12B performs a process for ending and leaving the conference. At Step S307, the communication unit 51 of the participant terminal 12B transmits the operation log recorded at Step S304 to the conference server device 10 together with a user ID and a conference ID. The information management unit 91 of the conference server device 10 saves the received operation log in association with the user ID and the conference ID, as illustrated in FIG. 30.

FIG. 30 is a configuration diagram illustrating an example of an operation log saved in a conference server device. The operation log as illustrated in FIG. 30 is indicative of interest of a participant. Hence, after the end of a conference, the conference management unit 82 of a conference server device 10 may utilize the operation log as illustrated in FIG. 30 to digitalize interest of each participant for a purpose of business promotion, etc.

FIG. 31 is an image diagram illustrating an example of a screen displaying an aggregated operation log. FIG. 31 is a drawing illustrating a user interface (UI) screen 1500 displayed in a case of selecting "OUTPUT RESULT" tab, which is included in the "CONFERENCE ASSIST" functions on the screen 1100 of the administration tool illustrated in FIG. 8. The screen 1100 is displayed at Step S12 of FIG. 6. The UI screen 1500 illustrated in FIG. 31 includes names of participants, which are arranged in rows, and pages of a handout, which are arranged as columns. Further, a numerical value 1501 displayed at a location where a row and a column cross is indicative of a time (seconds) for which a corresponding page is displayed by the participant in the personal mode.

A numerical value 1502 displayed in the row of "TOTAL" is sum of numerical values 1501 per a page, which is indicative of a time (seconds). Note that the numerical value 1501 and the numerical value 1502 are not required to be indicative of time. That is to say, the numerical value 1501 and the numerical value 1502 may be values indicative of how much a participant is interested in a page. For example, the numerical value 1501 and the numerical value 1502 may be replaced with values that are calculated from parameters, each of which is weighted, such as a time during which a participant was viewing a page in the personal mode, whether the participant took a note on the page, and whether the participant provided an operation of zooming in on the page.

When a participant took a memo on a page, a pen icon 1503 is displayed right next to a numerical value 1501 of the page. When a participant provides an operation of zooming in on a page, a magnifier icon 1504 is displayed right next to a numerical value 1501 of the page. When a pen icon 1503 is clicked on, a conference server device 10 utilizes an operation log as illustrated in FIG. 30 and re-renders the memo taken by a participant. When a magnifier icon 1504 is clicked on, a conference server device 10 utilizes an operation log as illustrated in FIG. 30 and re-renders a displayed area zoomed in by a participant. Note that re-rendering of a displayed area zoomed in by a participant may be performed by use of colors or frames, such that the displayed area that is zoomed in becomes distinct.

A numerical value 1505 displayed in the row of "NUMBER OF MEMOS" is indicative of the number of participants who took a memo, with respect to a page. An administrator or an organizer of a conference may refer to the UI screen 1500 as illustrated in FIG. 31 for checking, with respect to each page of a handout of the conference, how long a participant of the conference was viewing a page in the personal mode, the number of participants who took a memo, information noted as a memo, information that is zoomed in, etc. According to the present embodiment, an operation log collected by a participant terminal 12B during a conference may be aggregated by a conference server device 10 to provide a feedback of the aggregation result to an administrator or an organizer of the conference. Consequently, an administrator or an organizer of a conference is able to know information in which each participant becomes interested.

(Variations 1 through 3)

In recent years, there has been growing use of an electronic conference system, such as a paperless conference system using digitalized handouts, which is displayed on a terminal such as a tablet terminal and a laptop personal computer (PC) used by a participant at a conference or a seminar. In such an electronic conference system, a conference or a seminar can be conducted more effectively if a displayed page and memos of a terminal used by a presenter are synchronized on terminals used by participants.

For example, conventionally, there has been an information displaying system in which a participant can submit a question or an opinion to a presenter at a presentation and the question or the opinion is displayed on a real-time basis at the presentation (see PTL 2, for example).

In the conventional information displaying system, there may be a chance of disturbing progress of a conference because a question or an opinion from a participant is displayed even though the question or the opinion is inappropriate, incomplete, duplicated, etc.

The first variation, the second variation, and the third variation of the above embodiments are provided in view of the above issue, and therefore aim to provide an information processing system in which, from among information entered by one or more screen-sharing terminals, information to be delivered to another screen-sharing terminal can be selected through an administrator terminal.

According to the present variations, a conference or a seminar may be smoothly progressed, as information to be delivered to another screen-sharing terminal can be selected through an administrator terminal from among information entered by one or more screen-sharing terminals.

(First Variation)
<Software Configuration>

A conference server device 10, an organizer terminal 12C, which is a client terminal 12 operated by an organizer of a conference, and a participant terminal 12D, which is a client terminal 12 operated by a participant of a conference, may be actualized as illustrated in the functional block diagrams that are explained in the following description.

<<Organizer Terminal>>

Figure 32:
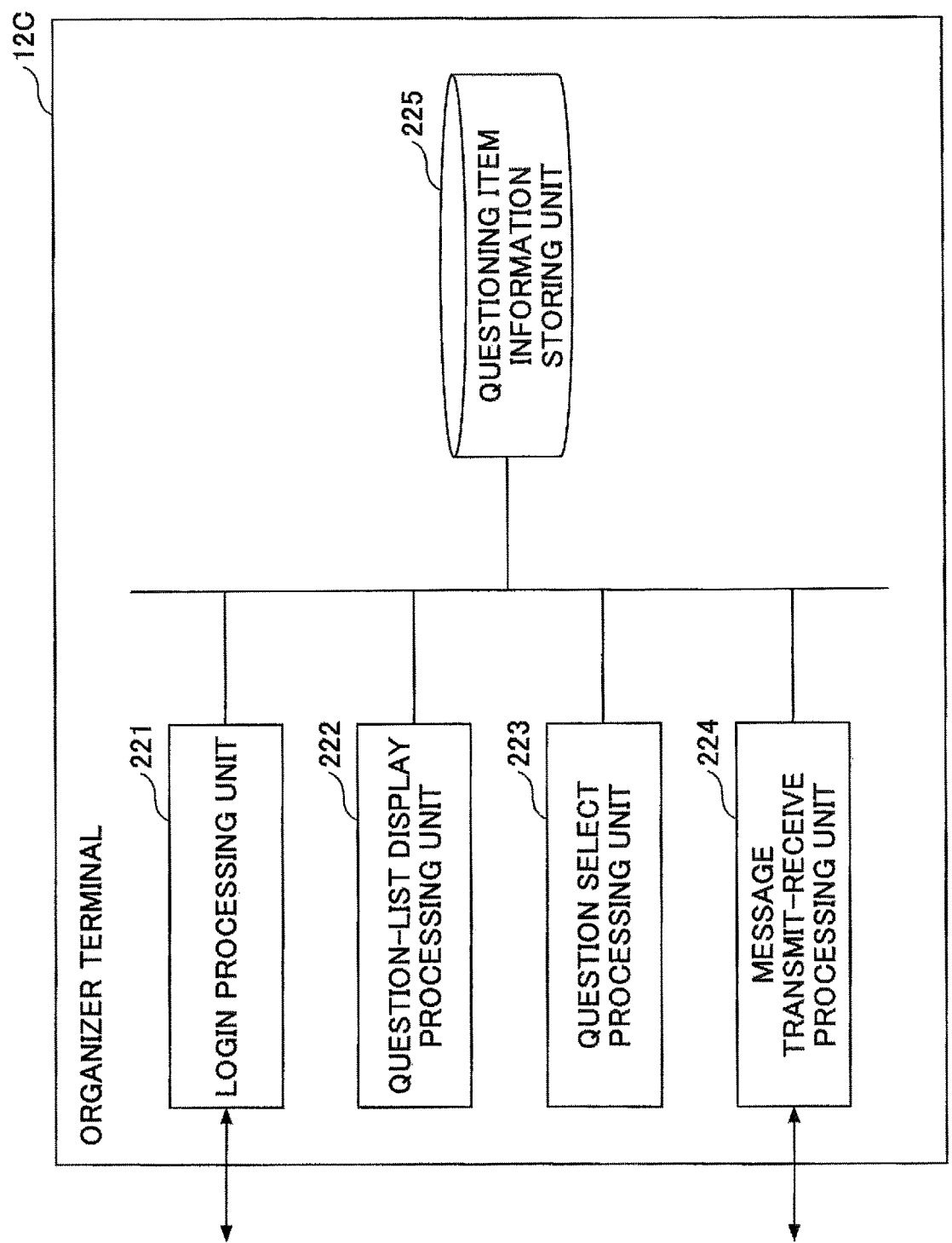
FIG. 32 is a functional block diagram illustrating an example of an organizer terminal, according to a variation of an embodiment of the present invention.

FIG. 32 is a functional block diagram illustrating an example of an organizer terminal. Note that the functional block diagram of FIG. 32 illustrates functions that are necessary for explaining the present variation among all functions provided by an organizer terminal 12C, which means that the organizer terminal 12C illustrated in FIG. 32 may include more functions.

The organizer terminal 12C as illustrated in FIG. 32 executes a program for actualizing a login processing unit 221, a question-list display processing unit 222, a question select processing unit 223, a message transmit-receive processing unit 224, and a questioning item information storing unit 225.

The login processing unit 221 performs a process for the organizer terminal 12C to log in to a conference server device 10. The question-list display processing unit 222 performs a process for displaying a list of questions received from the conference server device 10.

The question select processing unit 223 accepts an input by an organizer to select a question from the displayed list of questions. The question select processing unit 223 performs a process for sending a question selected by the organizer from the list of questions to the conference server device 10. The message transmit-receive processing unit 224 performs communication with the conference server device 10. The questioning item information storing unit 225 stores questioning item information as explained in the following description.

<<Participant Terminal>>

Figure 33:
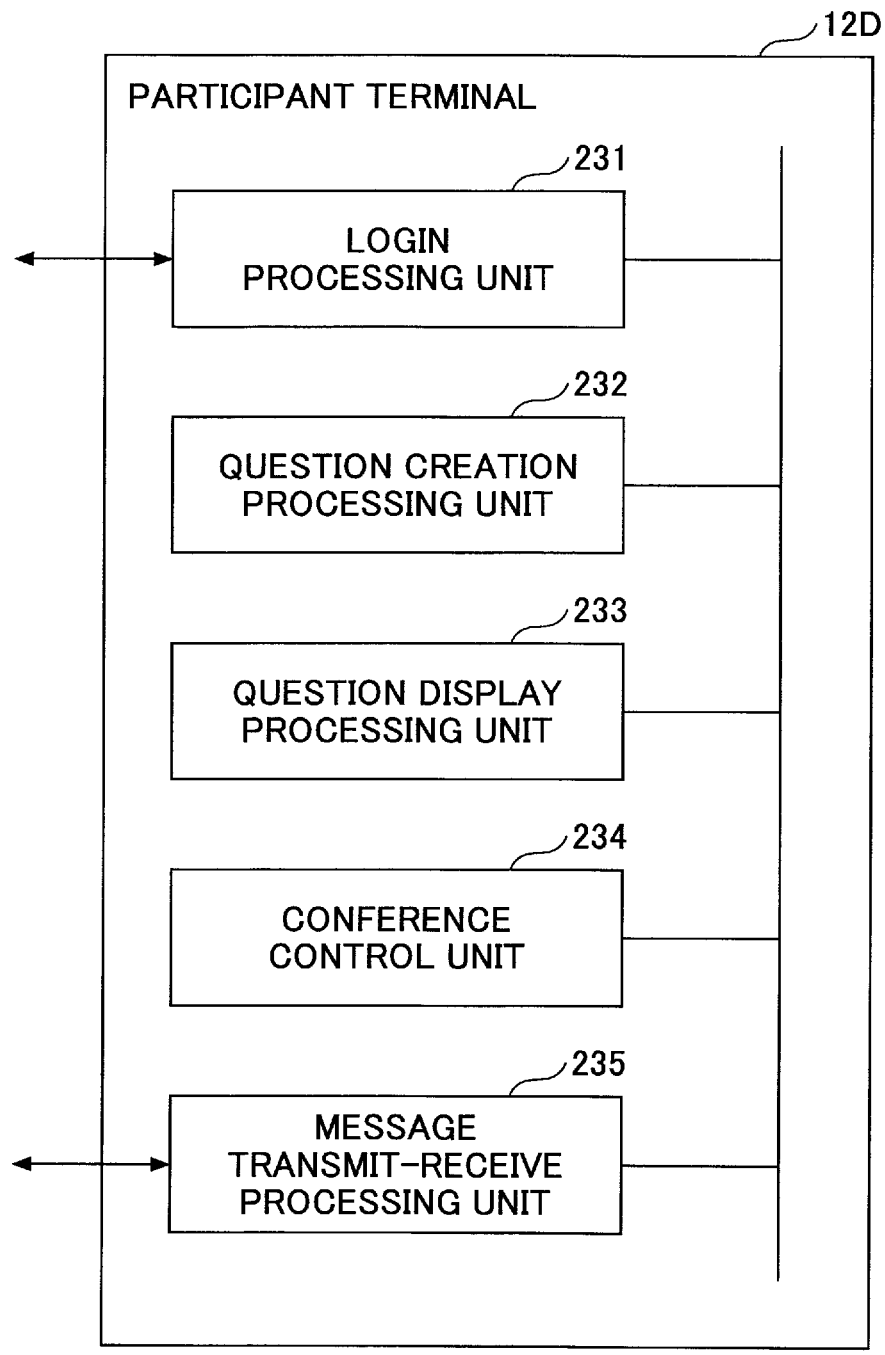
FIG. 33 is a functional block diagram illustrating an example of a participant terminal, according to a variation of an embodiment of the present invention.

FIG. 33 is a functional block diagram illustrating an example of a participant terminal. Note that the functional block diagram of FIG. 33 illustrates functions that are necessary for explaining the present variation among all functions provided by a participant terminal 12D, which means that the participant terminal 12D illustrated in FIG. 33 may include more functions.

The participant terminal 12D as illustrated in FIG. 33 executes a program for actualizing a login processing unit 231, a question creation processing unit 232, a question display processing unit 233, a conference control unit 234, and a message transmit-receive processing unit 235.

The login processing unit 231 performs a process for the participant terminal 12D to log in to the conference server device 10. The question creation processing unit 232 performs a process for accepting an input of a question from a participant and for sending the question to the conference server device 10. The question display processing unit 233 performs a process for displaying a question sent from the conference server device 10.

The conference control unit 234 controls processes for joining a conference, leaving a conference, downloading a handout, displaying a handout at a conference to synchronize with the screen of a presenter terminal, etc. The message transmit-receive processing unit 235 performs communication with the conference server device 10.

<<Conference Server Device>>

Figure 34:
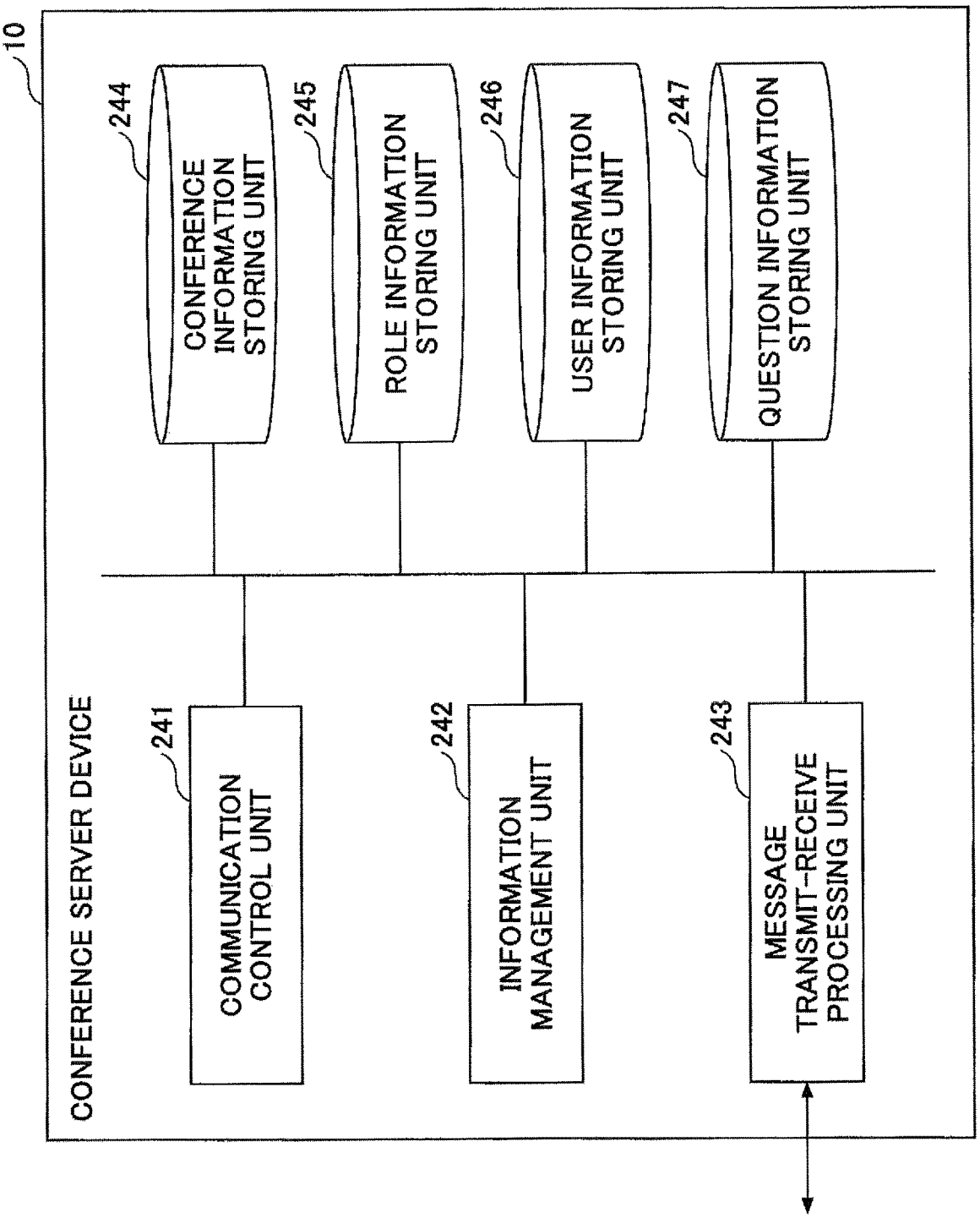
FIG. 34 is a functional block diagram illustrating another example of a conference server device, according to a variation of an embodiment of the present invention.

FIG. 34 is a functional block diagram illustrating an example of a conference server device. Note that the functional block diagram of FIG. 34 illustrates functions that are necessary for explaining the present variation among all functions provided by a conference server device 10, which means that the conference server device 10 illustrated in FIG. 34 may include more functions. The conference server device 10 as illustrated in FIG. 34 executes a program for actualizing a communication control unit 241, an information management unit 242, a message transmit-receive processing unit 243, a conference information storing unit 244, a role information storing unit 245, a user information storing unit 246, and a question information storing unit 247.

The communication control unit 241 performs communication control performed to have a conference or to join a conference, communication control for delivering an operation entered to a presenter terminal on a real-time basis to participant terminals 12D participating in a conference, communication control for forwarding a question provided from a participant to an organizer terminal 12C and for delivering a question selected by the organizer terminal 12C to the participant terminals 12D, etc. The information management unit 242 performs management of conference information, role information, user information, question information, etc. The message transmit-receive processing unit 243 performs communication with an organizer terminal 12C and a participant terminal 12D.

Further, the conference information storing unit 244 stores conference information, which is explained in the following description. The role information storing unit 245 stores role information, which is explained in the following description. The user information storing unit 246 stores user information, which is explained in the following description. The question information storing unit 247 stores question information, which is explained in the following description.

Note that a conference server device 10 may be actualized by a single information processing apparatus and may be actualized by multiple information processing apparatuses. Further, a conference server device 10 and an organizer terminal 12C may be unified and actualized by a single information processing apparatus.

<<Information>>

FIG. 35 is a configuration diagram illustrating an example of questioning item information. The questioning item information illustrated in FIG. 35 is stored in the questioning item information storing unit 225. The questioning item information illustrated in FIG. 35 includes columns of question IDs and questions. A question ID is an example of identification information for identifying a question. A question is a question from a participant. As described above, a question from a participant is stored in association with a question ID, as questioning item information.

FIG. 36 is a configuration diagram illustrating an example of conference information. Conference information as illustrated in FIG. 36 is stored in the conference information storing unit 244. The conference information illustrated in FIG. 36 includes columns of conference IDs, conference names, organizer IDs, and handouts. A conference ID is an example of identification information for identifying a conference. A conference name is a name of a conference. An organizer ID is an example of identification information for identifying an organizer. A handout is a handout to be used at a conference. As described above, as conference information, a conference name, an organizer ID, and a handout are stored in association with a conference.

FIG. 37 is a configuration diagram illustrating an example of role information. Role information as illustrated in FIG. 37 is stored in the role information storing unit 245. The role information illustrated in FIG. 37 includes columns of conference IDs, user IDs, and roles. A user ID is an example of identification information for identifying a user. A role is a role to perform at a conference. In the example of FIG. 37, there are an organizer, a participant, and a presenter, as roles at a conference. As described above, as role information, a role is stored in association with a user at a conference. Note that, with respect to roles of FIG. 37, a role as an organizer is indicated by "ORGANIZER", a role as a participant is indicated by "PARTICIPANT", and a role as a presenter is indicated by "PRESENTER".

FIG. 38 is a configuration diagram illustrating an example of user information. User information as illustrated in FIG. 38 is stored in the user information storing unit 246. The user information illustrated in FIG. 38 includes columns of user IDs and passwords. A password is an example of security information. As illustrated, as user information, a user ID of a user registered in a conference server device 10 is stored in association with a password.

FIG. 39 is a configuration diagram illustrating an example of question information. The question information as illustrated in FIG. 39 is stored in the question information storing unit 247. The question information illustrated in FIG. 10 includes columns of conference IDs, question IDs, questions, and selects. As illustrated, a question from a participant is stored in association with a conference, as question information. Note that information in "SELECT" column is indicative of whether a question is selected by an organizer and delivered to participants.

<Processing>
<<Login Process>>

Figure 40:
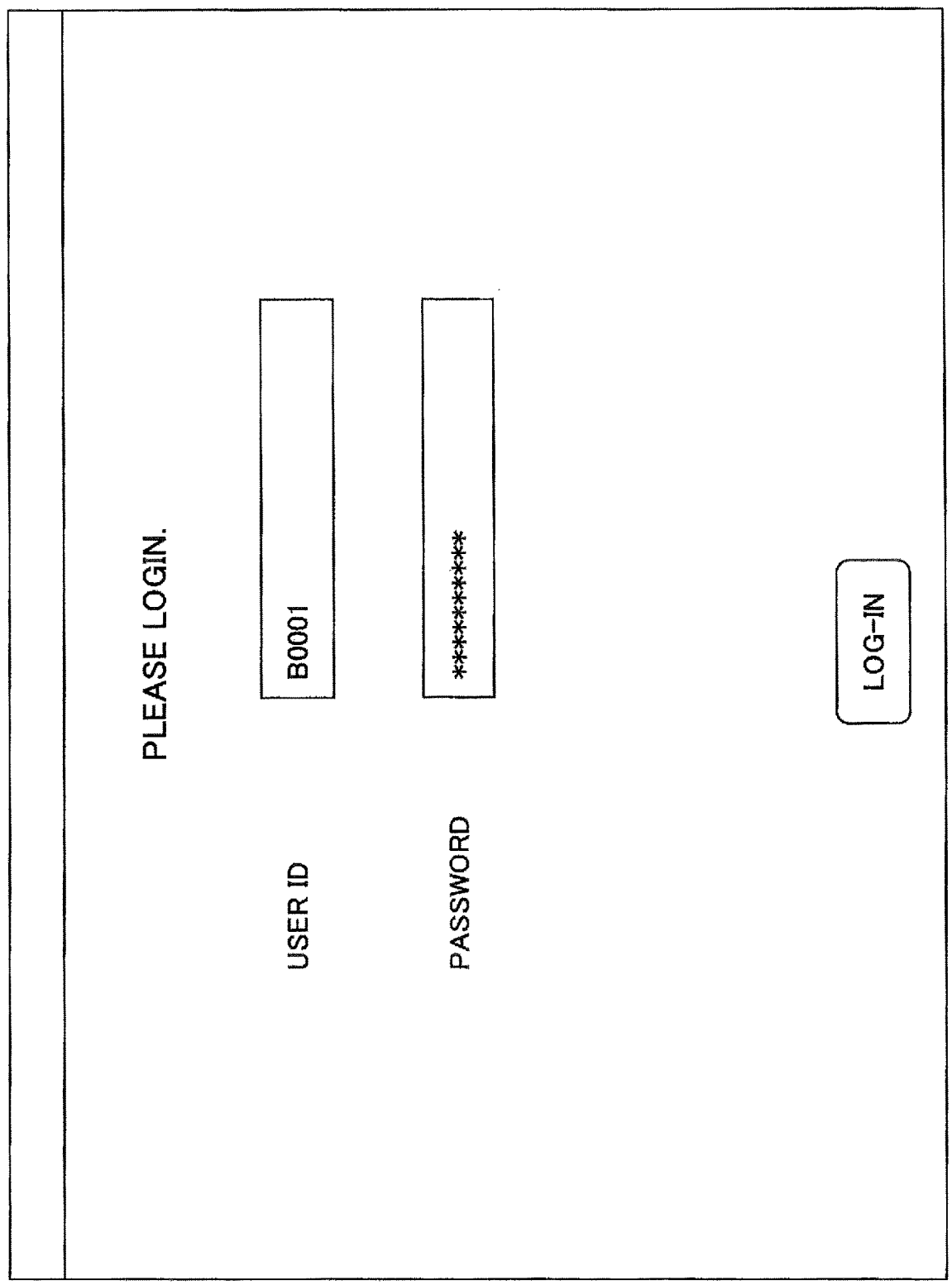
FIG. 40 is an image diagram illustrating an example of a login screen, according to a variation of an embodiment of the present invention.

FIG. 40 is an image diagram illustrating an example of a login screen. A login screen illustrated in FIG. 40 is an example of a screen for an organizer terminal 12C and a participant terminal 12D to log in to a conference server device 10. An organizer or a participant may start a login process to log in to a conference server device 10 by entering a user ID and a password on the login screen as illustrated in FIG. 40 and pressing a log-in button. In a case where an accepted set of a user ID and a password is included in user information as illustrated in FIG. 38, the conference server device 10 authorizes the login process. After the success of the login process, the conference server device 10 becomes connected to a organizer terminal 12C or a participant terminal 12D, which has successfully logged in. Note that the conference server device 10 may determine a role of a logged-in user, referring to role information as illustrated in FIG. 37. The login process may be performed by the login processing unit 221 of an organizer terminal 12C as illustrated in FIG. 32 and the login processing unit 231 of a participant terminal 12D as illustrated in FIG. 33, respectively.

<<Process for Creating a Conference>>

FIG. 41 is an image diagram illustrating an example of a conference creating screen. The conference creating screen as illustrated in FIG. 41 is displayed on an organizer terminal 12C operated by an organizer. An organizer may register conference information on a conference server device 10, by entering a conference name, an organizer ID, and a handout (i.e., HANDOUT OF CONFERENCE) on the conference creating screen as illustrated in FIG. 41 and pressing a register button. Registration of conference information is performed as a previous step before a conference is started. The conference server device 10 assigns a conference ID, which is unique with respect to a conference, in association with information entered on the conference creating screen as illustrated in FIG. 41, and stores the information associated with the conference ID in the conference information storing unit 244 as conference information. As the conference creating screen as illustrated in FIG. 41 is displayed on an organizer terminal 12C operated by an organizer, a field for entering an organizer may be omitted.

<<Question Process>>

Figure 42:
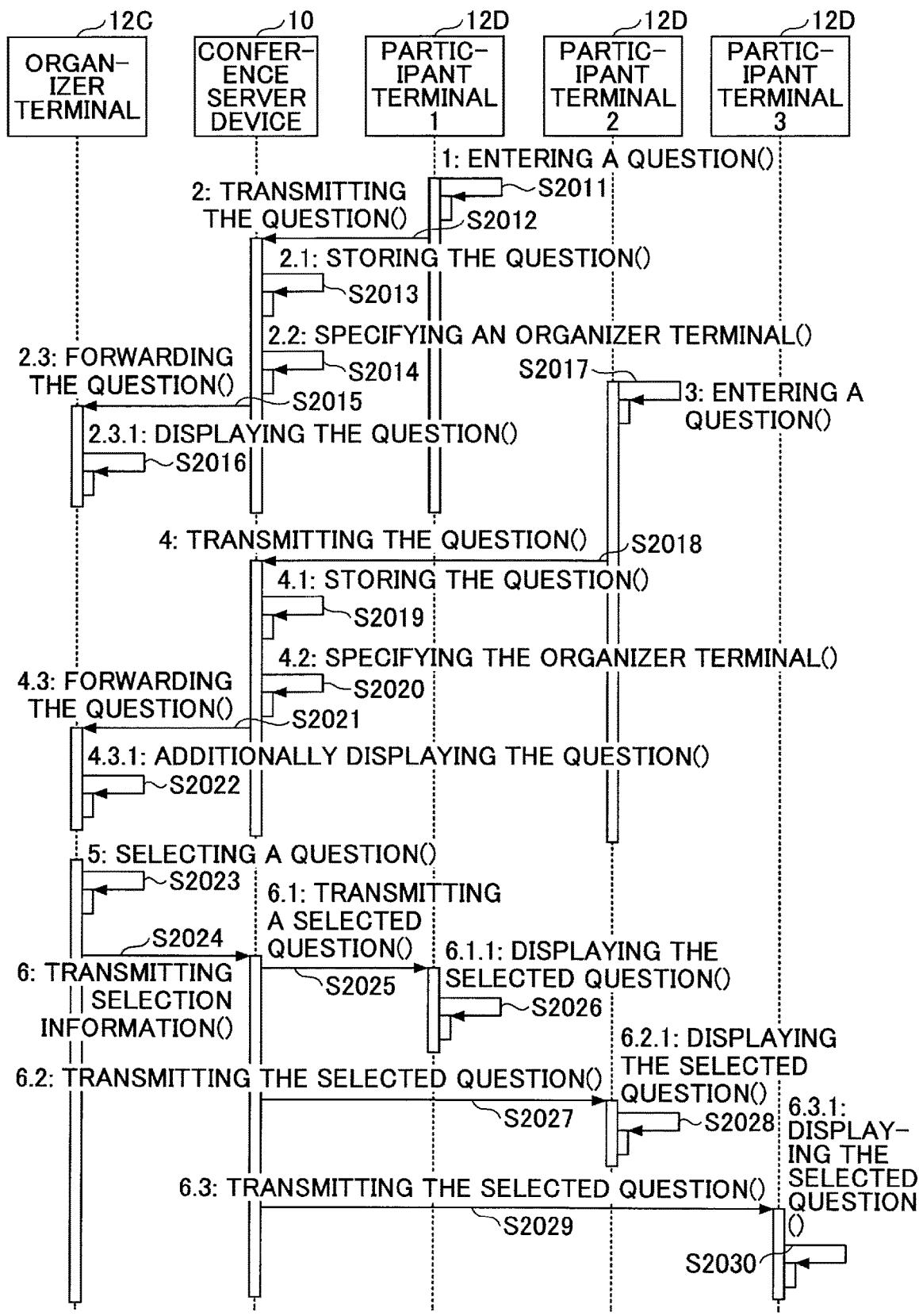
FIG. 42 is a sequence diagram illustrating an example of a processing sequence from entering a question to displaying the question, according to a variation of an embodiment of the present invention.
Figure 43:
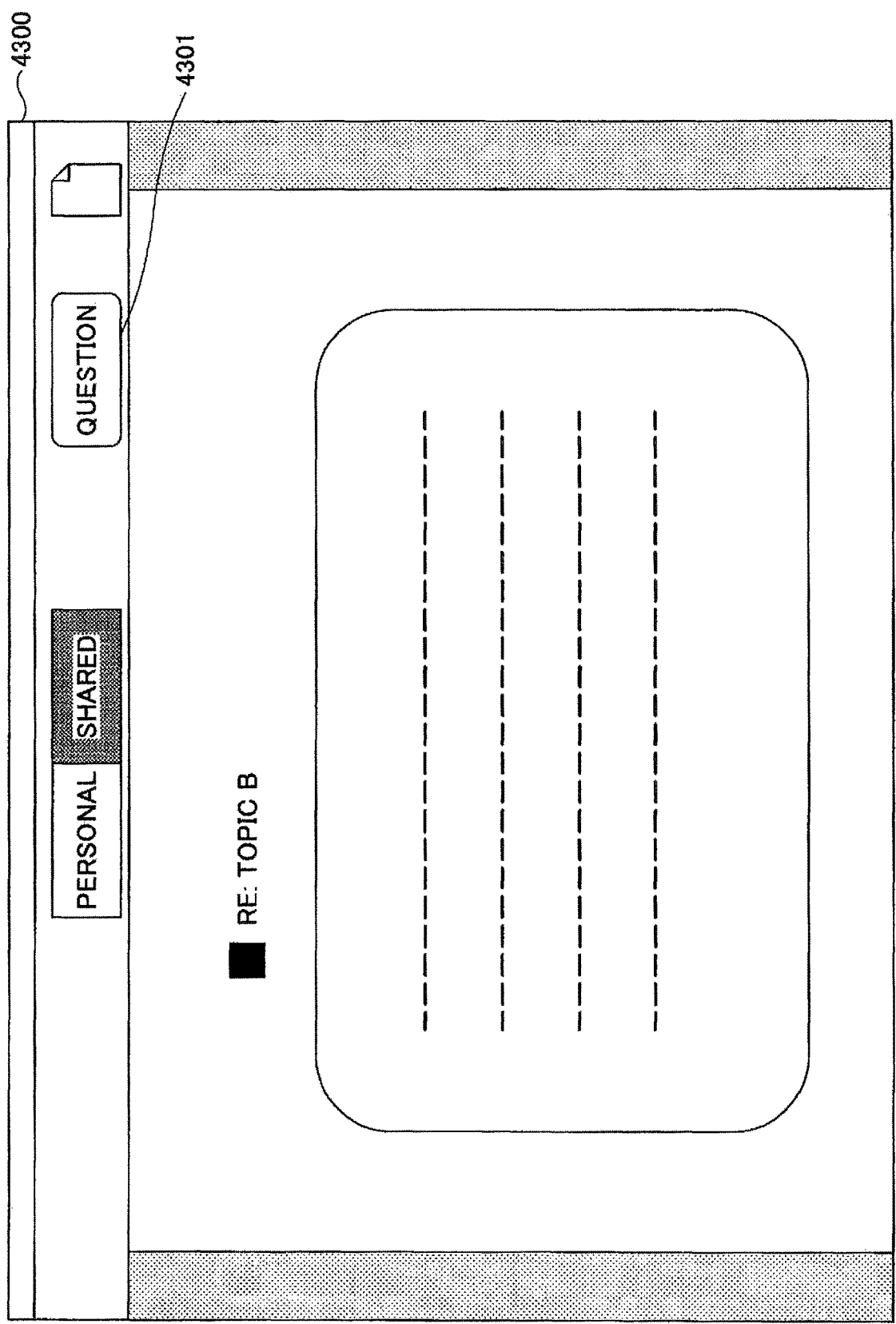
FIG. 43 is an image diagram illustrating an example of a handout viewing screen, according to a variation of an embodiment of the present invention.

FIG. 42 is a sequence diagram illustrating an example of a processing sequence from entering a question to displaying the question. After a conference is started, a handout to be shared at the conference is displayed on a participant terminal 12D participating in the conference, as illustrated in FIG. 43. FIG. 43 is an image diagram illustrating an example of a handout viewing screen. The handout viewing screen 4300 illustrated in FIG. 43 is provided with a question button 4301. A participant of the conference may press the question button 4301 to display such a question entering screen 4400 as illustrated in FIG. 44 on the participant terminal 12D.

Figure 44:
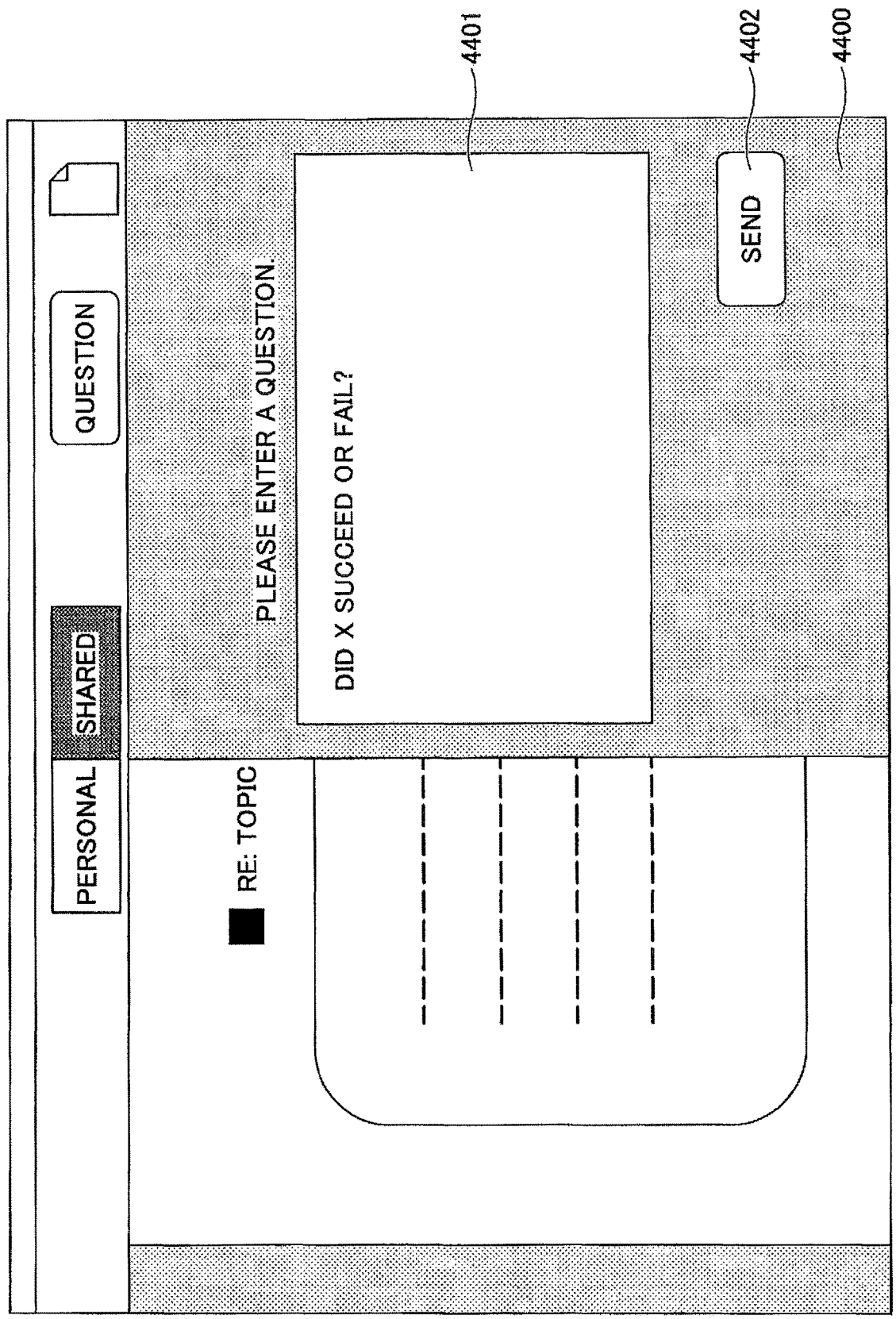
FIG. 44 is an image diagram illustrating an example of a question entering screen, according to a variation of an embodiment of the present invention.

FIG. 44 is an image diagram illustrating an example of a question entering screen. The question entering screen 4400 illustrated in FIG. 44 includes a question entering field 4401 and a send button 4402. A participant of a conference may enter a question in the question entering field 4401 of the question entering screen 4400 displayed on a participant terminal 12D and press the send button 4402, to provide an instruction for sending the question. The participant terminal 12D creates such a question sending message as illustrated in FIG. 45 and sends the question sending message to a conference server device 10.

For example, in the sequence diagram illustrated in FIG. 42, at Step S2011, a participant presses the question button 4301 of the handout viewing screen 4300 as illustrated in FIG. 43. The question creation processing unit 232 of the participant terminal 12D displays the question entering screen 4400 as illustrated in FIG. 44. The participant enters a question in the question entering field 4401 of the question entering screen 4400 and presses the send button 4402. At Step S2012, the message transmit-receive processing unit 235 of the participant terminal 12D creates a question sending message as illustrated in FIG. 45 and transmits the question sending message to the message transmit-receive processing unit 243 of the conference server device 10. The question sending message illustrated in FIG. 45 is used in a case of transmitting a question text "DID X SUCCEED OR FAIL?", which is entered by a participant.

FIG. 45 is a configuration diagram illustrating an example of a question sending message. A question sending message is an example of a message for communication, and is configured with a header and a body. For example, a header defines a type of a message. A body defines a body of a message. A question sending message is used for sending a question, which is entered to a participant terminal 12D, from the participant terminal 12D to a conference server device 10. A body defines a question text that is entered by a participant.

At Step S2013, the communication control unit 241 of the conference server device 10, which has received the question sending message, assigns the question with a question ID, which is unique to the question, and a conference ID, which is unique to a conference, and stores the question in the question information storing unit 247. At Step S2014, the communication control unit 241 of the conference server device 10 accesses conference information as illustrated in FIG. 36 or role information as illustrated in FIG. 37, to specify an organizer terminal 12C of a corresponding conference. Then, at Step S2015, the message transmit-receive processing unit 243 of the conference server device 10 creates a question forwarding message as illustrated in FIG.

46 and transmits the question forwarding message to the message transmit-receive processing unit 224 of the organizer terminal 12C.

FIG. 46 is a configuration diagram illustrating an example of a question forwarding message. A question forwarding message is also an example of a message for communication, and is configured with a header and a body. The question forwarding message as illustrated in FIG. 46 is used for forwarding a question sending message received from a participant terminal 12D to an organizer terminal 12C. A body defines a QID text, which is a question ID, and a Q text, which is a body of a question. Note that the question forwarding message illustrated in FIG. 46 is used in a case of forwarding a question text "DID X SUCCEED OR FAIL?", which is entered by a participant, and a QID text "1234", which is a question ID.

At Step S2016, the question-list display processing unit 222 of the organizer terminal 12C stores the question received by means of the question forwarding message in the questioning item information storing unit 225, and then displays the question additionally on a question selecting screen 4700 as illustrated in FIG. 47. Note that a question may be additionally displayed on the question selecting screen 4700 every time a question forwarding message is received or upon an update operation provided from an organizer.

FIG. 47 is an image diagram illustrating an example of a question selecting screen. On the question selecting screen 4700 as illustrated in FIG. 47, a list 4701 of questions forwarded from a conference server device 10 to an organizer terminal 12C is displayed in a selectable manner using a radio button. Note that, for a question entered by another participant and displayed at Steps S2017 through S2022, the same processing as Steps S2011 through S2016 is performed as well.

At Step S2023, the organizer operates the organizer terminal 12C to select, from the list 4701 of questions on the question selecting screen 4700 as illustrated in FIG. 47, a question to be delivered to all participants participating in the conference, and to press the send button 4702. Note that the question selecting screen 4700 as illustrated in FIG. 47 may be provided with a function for assisting an organizer to select a question. For example, on the question selecting screen 4700 as illustrated in FIG. 47, a question including a prioritized keyword or prohibited keyword, which is pre-registered, may be displayed in a different color, so as to be visually distinguishable. The process of Step S2023 is performed by the question select processing unit 223 of the organizer terminal 12C.

At Step S2024, the message transmit-receive processing unit 224 of the organizer terminal 12C creates such a selection information transmitting message as illustrated in FIG. 48 and transmits the selection information transmitting message to the message transmit-receive processing unit 243 of the conference server device 10. FIG. 48 is a configuration diagram illustrating an example of a selection information transmitting message. A selection information transmitting message is also an example of a message for communication, and is configured with a header and a body. The selection information transmitting message as illustrated in FIG. 48 is used for sending a question selected from the list 4701 of questions on the question selecting screen 4700 by an organizer to a conference server device 10. The body defines a QID, which is a question ID selected by an organizer. Note that the selection information transmitting message illustrated in FIG. 48 is used in a case of transmitting QID texts "1234", "2345", and "3456", which are QIDs of questions selected by an organizer.

The communication control unit 241 of the conference server device 10, which has received the selection information transmitting message, retrieves a question ID defined in the selection information transmitting message and acquires a question corresponding to the question ID from the question information as illustrated in FIG. 39. Further, the communication control unit 241 of the conference server device 10, which has received the selection information transmitting message, retrieves the question ID defined in the selection information transmitting message and assigns the question information corresponding to the question ID with information of "SELECTED", which indicates that the question is selected by the organizer and delivered to participants. At Step S2025, the message transmit-receive processing unit 243 of the conference server device 10 creates such a selected question sending message as illustrated in FIG. 49, based on the acquired question, and transmits the selected question sending message to the message transmit-receive processing unit 235 of participant terminals 12D.

FIG. 49 is a configuration diagram illustrating an example of a selected question sending message. A selected question sending message is also an example of a message for communication, and is configured with a header and a body. The selected question sending message as illustrated in FIG. 49 is used when a conference server device 10 delivers a question selected by an organizer to each participant terminal 12D participating in a conference. A body defines a Q text, which is a body of a question.

Figure 50:
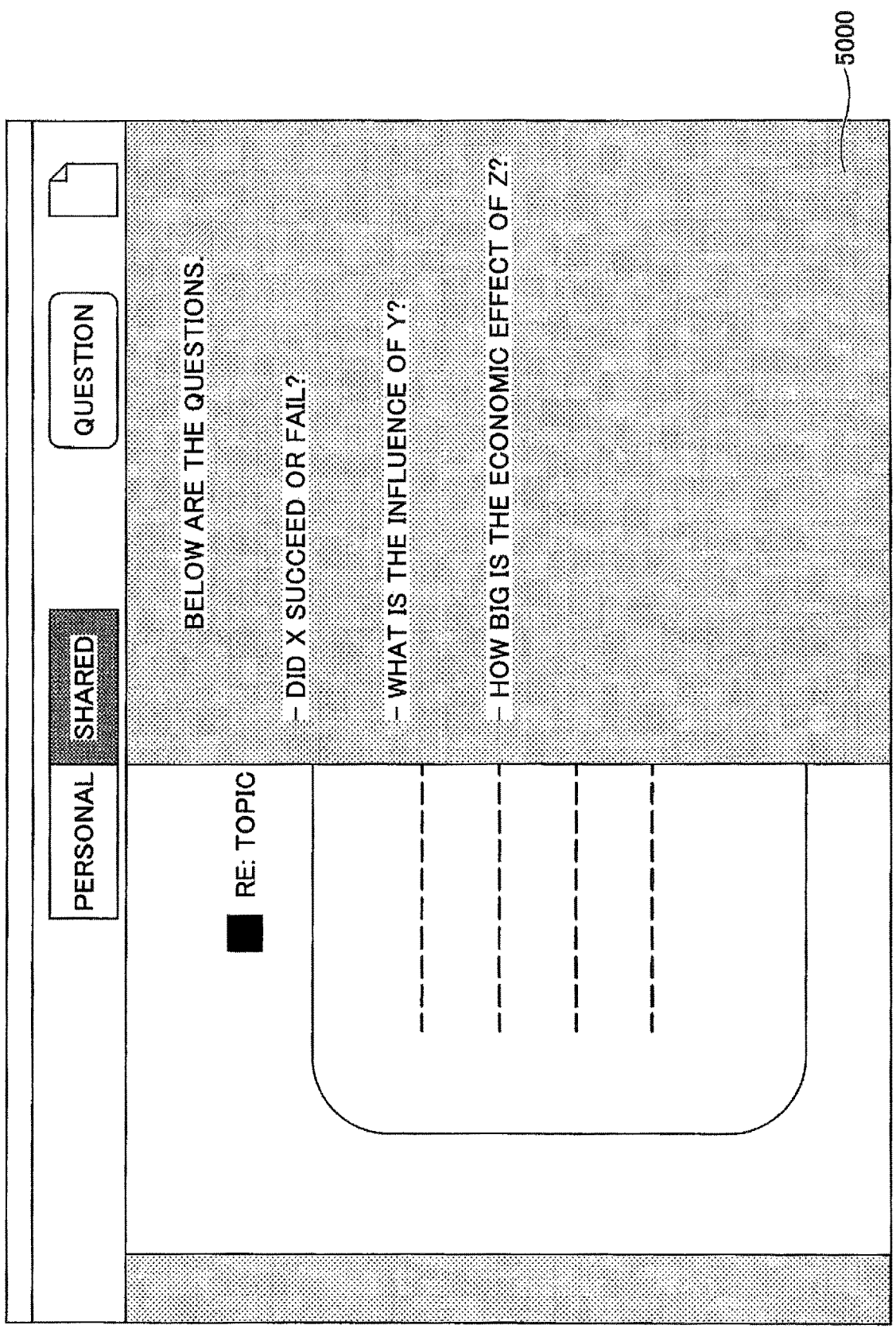
FIG. 50 is an image diagram illustrating an example of a question display screen, according to a variation of an embodiment of the present invention.

The question display processing unit 233 of a participant terminal 12D that has received the selected question sending message retrieves a question defined by the selected question sending message and displays a question display screen 5000 as illustrated in FIG. 50, based on the question. FIG. 50 is an image diagram illustrating an example of a question display screen. On the question display screen 5000 as illustrated in FIG. 50, a question selected by an organizer is displayed. Note that, at Steps S2027 through S2030, the same processing as Steps S2025 and S2026 is performed with respect to another participant terminal 12D, such that the question selected by the organizer is displayed.

Note that the timing of transmitting a question forwarding message to an organizer terminal 12C is not limited to each time a conference server device 10 receives a question sending message, which is taken as an example of the timing in the sequence diagram illustrated in FIG. 42. For example, an organizer may provide a question forwarding request from an organizer terminal 12C to a conference server device 10 at a timing desired by the organizer. In the above case, the conference server device 10 may save questions until receiving the question forwarding request from the organizer terminal 12C, so as to forward the saved questions to the organizer terminal 12C all together, upon receiving the question forwarding request.

In the conference system 1 according to the present variation, questions from participants are displayed on an organizer terminal 12C, so that an organizer can select a question to be delivered to participants. Hence, in the conference system 1 according to the present variation, in a case where a question from a participant is inappropriate, incomplete, duplicated, etc., such a message is prevented from being undesirably displayed.

(Second Variation)

The question sending message as illustrated in FIG. 45 may be configured as illustrated in FIG. 51. FIG. 51 is a configuration diagram illustrating another example of a question sending message. The body of the question sending message illustrated in FIG. 51 defines a user ID of a participant who entered the question and a question text entered by the participant. The question sending message illustrated in FIG. 51 is used in a case of transmitting a UID "C0003", which is a user ID of the participant who entered the question, and a question text "DID X SUCCEED OR FAIL?", which is entered by the participant.

In a case of the question sending message illustrated in FIG. 51, question information as illustrated in FIG. 39 is configured to be as illustrated in FIG. 52. FIG. 52 is a configuration diagram illustrating another example of question information. The question information illustrated in FIG. 52 includes a column of user IDs in addition to the configuration of the question information illustrated in FIG. 39. As illustrated, in the question information illustrated in FIG. 52, a question from a participant is stored in association with a conference and a participant.

The question sending message as illustrated in FIG. 45 may be configured as illustrated in FIG. 53. FIG. 53 is a configuration diagram illustrating another example of a question sending message. The body of the question sending message illustrated in FIG. 53 defines date and time information, which is indicative of when the question is sent, and a question text, which is entered by a participant. The question sending message illustrated in FIG. 53 is used in a case of transmitting date and time information "201608051030", which is indicative of when the question is sent, and a question text "DID X SUCCEED OR FAIL?", which is entered by a participant.

In a case of the question sending message illustrated in FIG. 53, question information as illustrated in FIG. 39 is configured to be as illustrated in FIG. 54. FIG. 54 is a configuration diagram illustrating another example of question information. The question information illustrated in FIG. 54 includes a column of question sending dates and times in addition to the configuration of the question information illustrated in FIG. 39. As illustrated, in the question information illustrated in FIG. 54, a question from a participant is stored in association with a conference and question sending date and time.

The question sending message as illustrated in FIG. 45 may be configured as illustrated in FIG. 55. FIG. 55 is a configuration diagram illustrating another example of a question sending message. The body of the question sending message illustrated in FIG. 55 defines a user ID of a participant who entered the question, date and time information indicative of when the question is sent, and a question text entered by the participant.

In a case of the question sending message illustrated in FIG. 55, question information of FIG. 39 is configured to be as illustrated in FIG. 56. FIG. 56 is a configuration diagram illustrating another example of question information. The question information illustrated in FIG. 56 includes columns of user IDs and question sending dates and times in addition to the configuration of the question information illustrated in FIG. 39. As illustrated, in the question information illustrated in FIG. 56, a question from a participant is stored in association with a conference, a participant, and question sending date and time. Note that the question sending message illustrated in FIG. 55 is used in a case of transmitting a UID "C0003", which is a user ID of a participant who entered the question, date and time information "201608051030", which is indicative of when the question is sent, and a question text "DID X SUCCEED OR FAIL?", which is entered by the participant.

(Third Variation)

Figure 57:
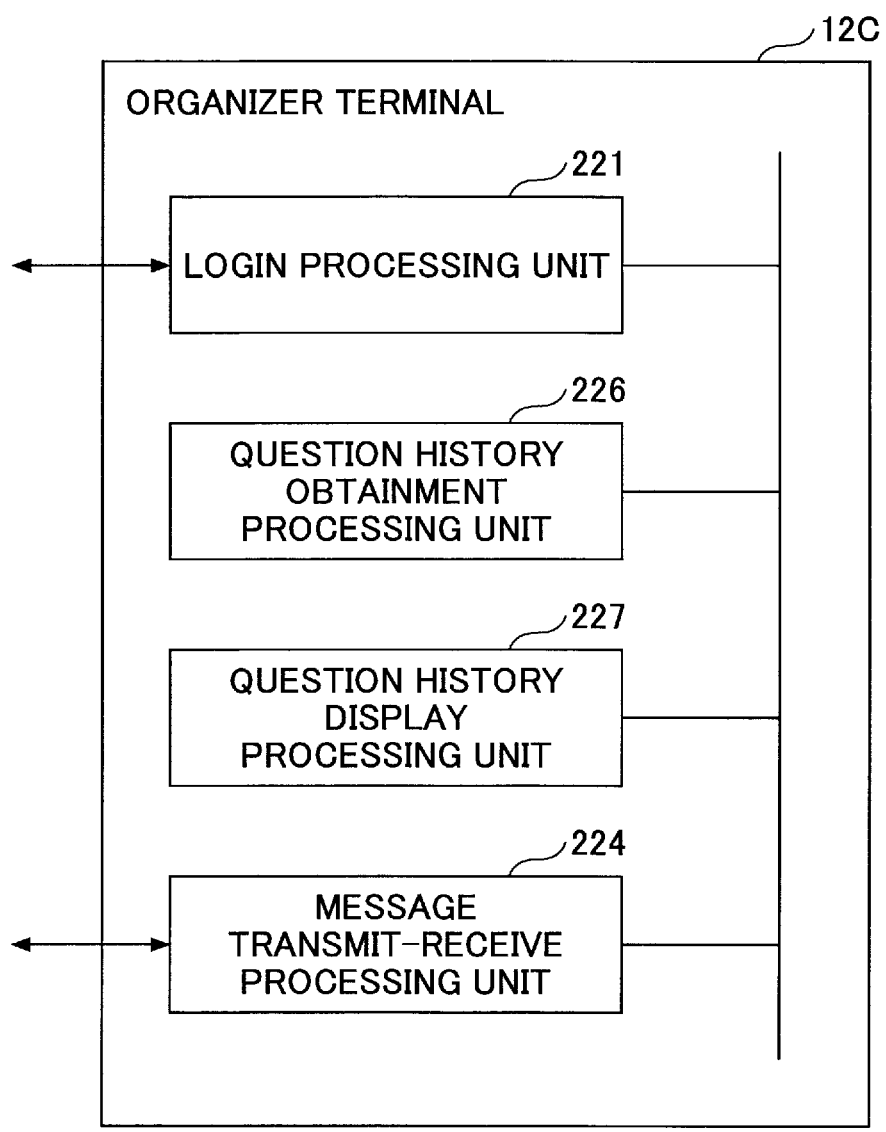
FIG. 57 is a functional block diagram illustrating another example of an organizer terminal, according to a variation of an embodiment of the present invention.

In the conference system 1 according to the present variation, questions entered by participants during a conference may be stored in the question information storing unit 247, as a function for an organizer to review the questions at a later time. FIG. 57 is a functional block diagram illustrating another example of an organizer terminal. Note that the functional block diagram of FIG. 57 illustrates functions that are necessary for explaining the present variation among all functions provided by an organizer terminal 12C, which means that the organizer terminal 12C illustrated in FIG. 57 may include more functions.

An organizer terminal 12C illustrated in FIG. 57 executes a program for actualizing a login processing unit 221, a message transmit-receive processing unit 224, a question history obtainment processing unit 226, and a question history display processing unit 227.

The login processing unit 221 performs a process for an organizer terminal 12C to log in to a conference server device 10. The message transmit-receive processing unit 224 performs communication with a conference server device 10. The question history obtainment processing unit 226 performs a process for obtaining, from a conference server device 10, a history of questions accepted at a conference, in a selected display format. The question history display processing unit 227 performs a process for displaying a history of questions received from a conference server device 10.

Figure 58:
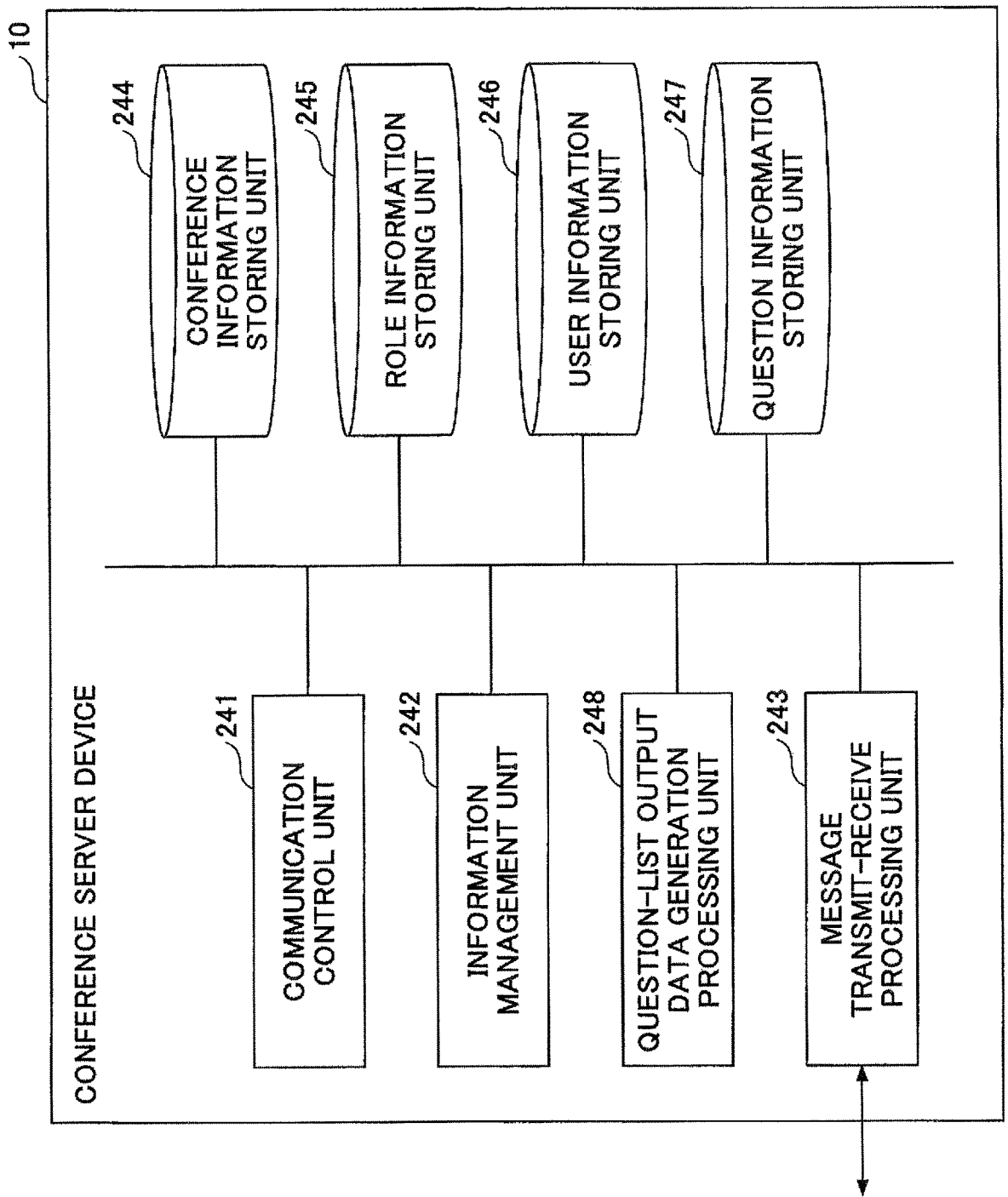
FIG. 58 is a functional block diagram illustrating another example of a conference server device, according to a variation of an embodiment of the present invention.

FIG. 58 is a functional block diagram illustrating another example of a conference server device. The conference server device 10 illustrated in FIG. 58 includes a question-list output data generation processing unit 248 in addition to the configuration of the conference server device 10 illustrated in FIG. 34. The question-list output data generation processing unit 248 performs a process for generating a list of questions at a conference in a selected display format, upon a request provided from the organizer terminal 12C as illustrated in FIG. 57.

Figure 59:
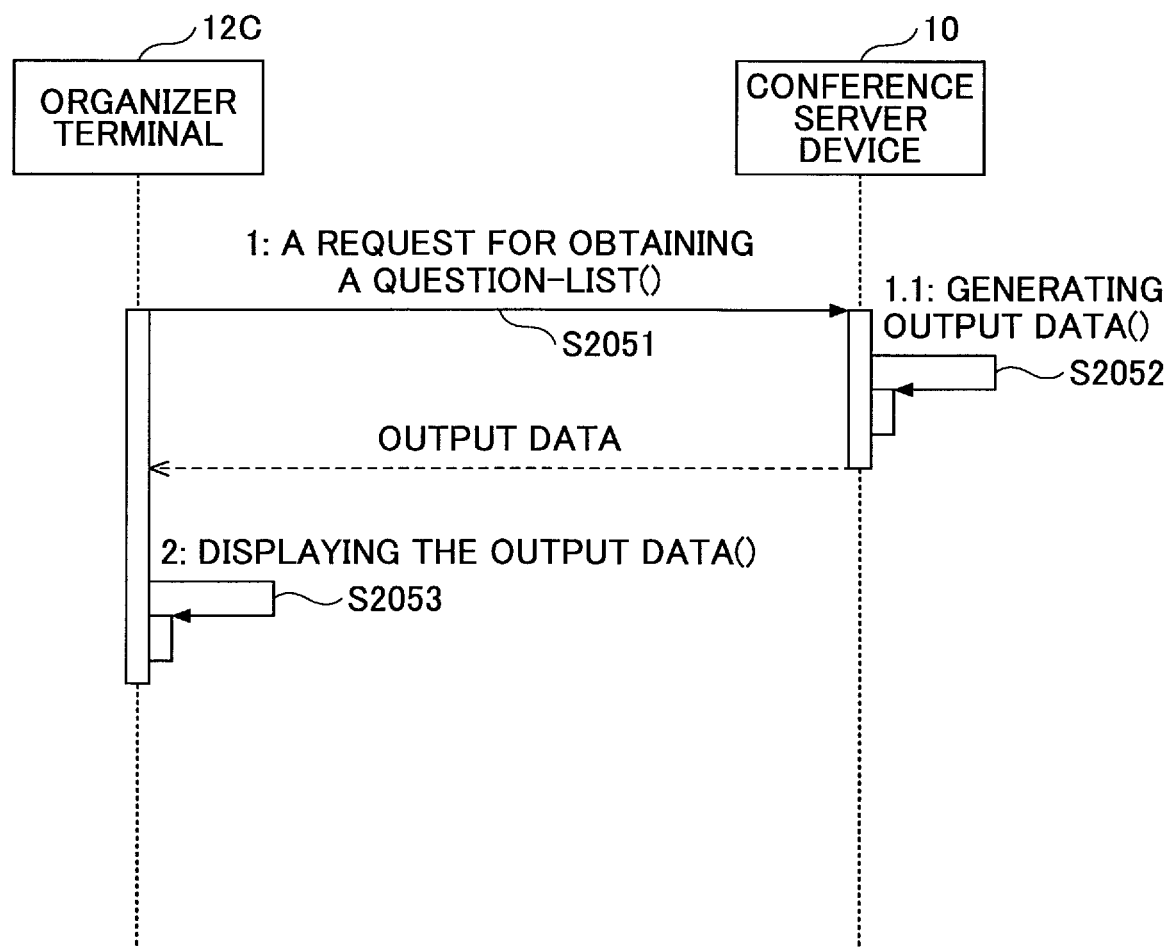
FIG. 59 is a sequence diagram illustrating an example of a processing sequence for displaying a question history, according to a variation of an embodiment of the present invention.
Figure 60:
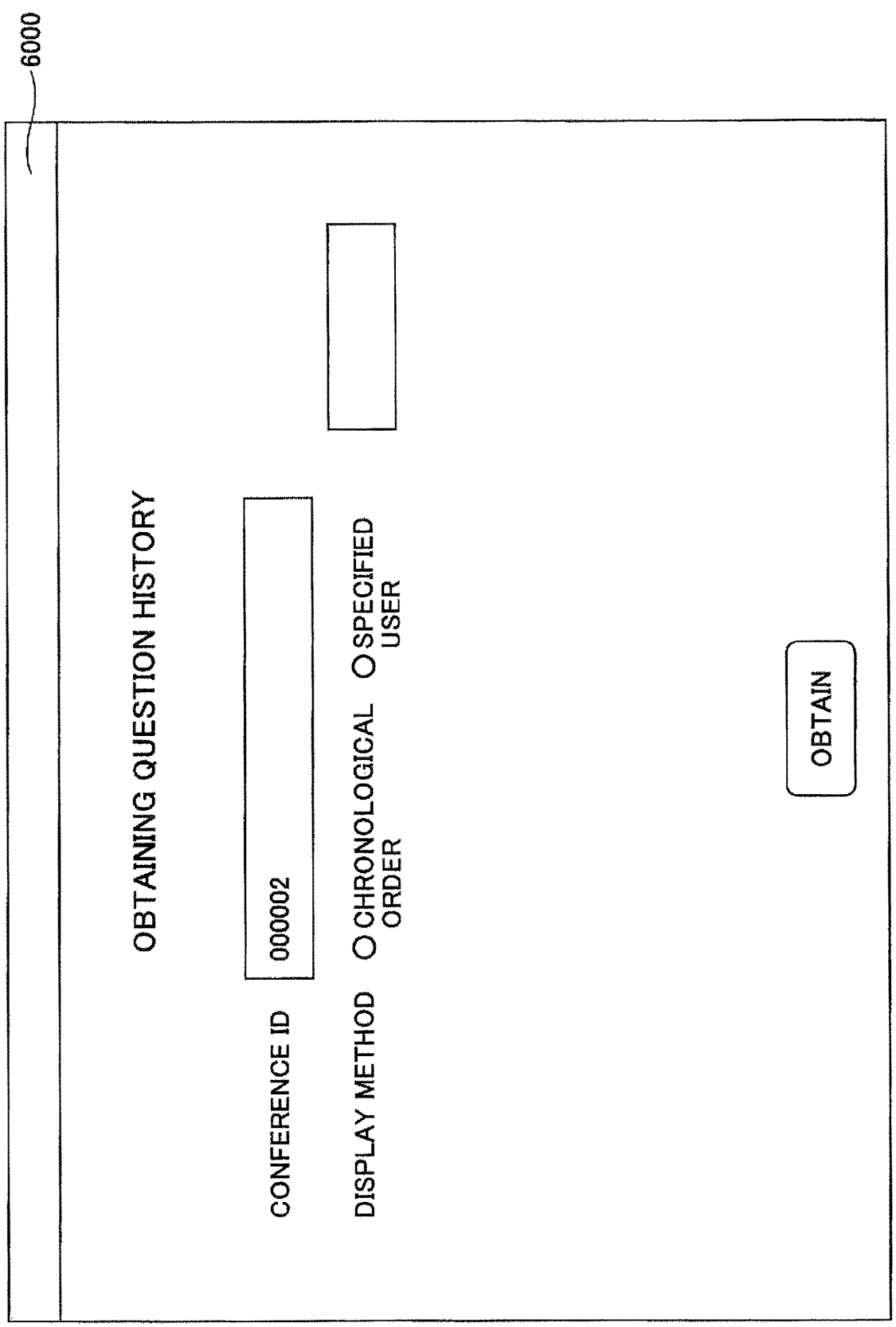
FIG. 60 is an image diagram illustrating an example of a question history obtaining screen, according to a variation of an embodiment of the present invention.

FIG. 59 is a sequence diagram illustrating an example of a processing sequence for displaying a question history. On an organizer terminal 12C, a question history obtaining screen 6000 as illustrated in FIG. 60 is displayed. FIG. 60 is an image diagram illustrating an example of a question history obtaining screen. The question history obtaining screen 6000 is provided with a conference ID entering field, a display method selecting box, and an obtain button.

An organizer selects a conference ID and a display format from the question history obtaining screen 6000 at a desired timing (e.g., after a conference, etc.) and presses the obtain button. In the case of FIG. 60, a display format may be selected from either displaying questions in a chronological order or displaying questions provided by a user of a selected user ID. After the obtain button on the question history obtaining screen 6000 is pressed, the processing proceeds to Step S2051, at which the question history obtainment processing unit 226 of the organizer terminal 12C creates a question-list obtainment requesting message as illustrated in FIG. 61A or FIG. 61B and transmits the question-list obtainment requesting message to a conference server device 10.

FIGS. 61A and 61B are configuration diagrams illustrating examples of a question-list obtainment requesting message. The question-list obtainment requesting messages as illustrated in FIGS. 61A and 61B are examples of a message for communication, and each of the question-list obtainment requesting messages is configured with a header and a body. A body defines a conference ID and a text indicative of a display format. FIG. 61A is a drawing illustrating an example of a question-list obtainment requesting message being used in a case where "CHRONOLOGICAL ORDER" is selected as a display format. Further, FIG. 61B is a drawing illustrating an example of a question-list obtainment requesting message being used in a case where "SPECIFIED USER" is selected as a display format and a participant having a user ID of UID "C0003" is specified.

Upon receiving the question-list obtainment requesting message as illustrated in FIG. 61A or FIG. 61B, the processing proceeds to Step S2052, at which the question-list output data generation processing unit 248 of the conference server device 10 searches the question information storing unit 247 for question information corresponding to the received question-list obtainment requesting message to obtain the question information. Further, the question-list output data generation processing unit 248 generates a question list as output data, based on the obtained question information. Further, the conference server device 10 generates a question history transmitting message as illustrated in FIG. 62A or FIG. 62B, based on the generated output data, and transmits the question history transmitting message to the organizer terminal 12C.

FIGS. 62A and 62B are configuration diagrams illustrating examples of a question history transmitting message. The question history transmitting messages as illustrated in FIGS. 62A and 62B are examples of a message for communication, and each of the question history transmitting messages is configured with a header and a body. A body defines a question history.

Note that FIG. 62A is a drawing illustrating an example of a question history transmitting message used in a case where "CHRONOLOGICAL ORDER" is selected as a display format. FIG. 62B is a drawing illustrating an example of a question history transmitting message used in a case where "SPECIFIED USER" is selected as a display format and a participant having a user ID of UID "C0003" is specified. The body of FIG. 62B defines questions "DID X SUCCEED OR FAIL?" and "WHAT IS EXPECTED TO HAPPEN REGARDING TOPIC B?", which are provided by a user selected as "SPECIFIED USER".

The question history display processing unit 227 of an organizer terminal 12C that has received the question history transmitting message displays such a question history screen as illustrated in FIG. 63 or FIG. 64. FIG. 63 is an image diagram illustrating an example of a question history screen. FIG. 64 is an image diagram illustrating another example of the question history screen. FIG. 63 is a drawing illustrating an example of a question history screen displayed in a case where "CHRONOLOGICAL ORDER" is selected as a display format. Further, FIG. 64 is a drawing illustrating an example of a question history screen displayed in a case where "SPECIFIED USER" is selected as a display format.

Note that, on the question history screen as illustrated in FIG. 63, there may be information for distinguishing a question that has been selected by an organizer and delivered to participants and a question that has not been selected by an organizer and has not been delivered to participants. In FIG. 63, "SELECTED" is indicative of a question that has been delivered to participants and "NOT SELECTED YET" is indicative of a question that has not been delivered to participants.

In the conference system 1 according to the present variation, an organizer is able to review questions from participants, which are entered during a conference, at a later time. Thus, the organizer may analyze frequently asked questions, etc., and utilizes the analysis for improving procedures and contents of a next conference. More specifically, in a case of a seminar hosted by a corporation, analyzing who asked what types of questions, etc., may be helpful for marketing and effective client-contacting activities (e.g. suggestions, etc.).

(Variation 4)

In recent years, there has been a growing use of an electronic conference system, such as a paperless conference system, for the purpose of reducing a cost and a load for printout and for the purpose of conducting an effective conference operation or discussion.

For example, there is an electronic conference system, in which information processing apparatuses prepare common display content in advance and transmit and receive information indicative of operations entered by users, so that the information processing apparatuses can share, by use of a small amount of data, a displayed screen that is updated based on the entered operation. In some of such electronic conference systems, a questionnaire in association with a handout, which is set by use of an information processing apparatus of a presenter, is delivered to audience members' information processing apparatuses to be answered by use of the audience members' information processing terminals (see PTL 3, for example).

In the conventional electronic conference systems, a client terminal of a conference obtains, at the time of joining the conference, questionnaire information associated with the handout information, as well as the handout information. Therefore, in the conventional electronic conference systems, handout information and questionnaire information associated with the handout information need to be registered by the time of starting a conference. Further, once questionnaire information is delivered at a conference, questionnaire information cannot be added or edited independently from handout information.

The fourth variation of the above embodiments is provided in view of the above issue, and therefore aims to provide an information processing system for providing an operation with respect to a questionnaire in a flexible manner, independently from handout information.

According to the present variation, an operation with respect to a questionnaire may be provided in a flexible manner, independently from handout information.

(Fourth Variation)
<Software Configuration>

A conference server device 10 and a client terminal 12 in a conference system 1 according to the present variation may be actualized as illustrated in a functional block diagram, which is explained in the following description.

Figure 65:
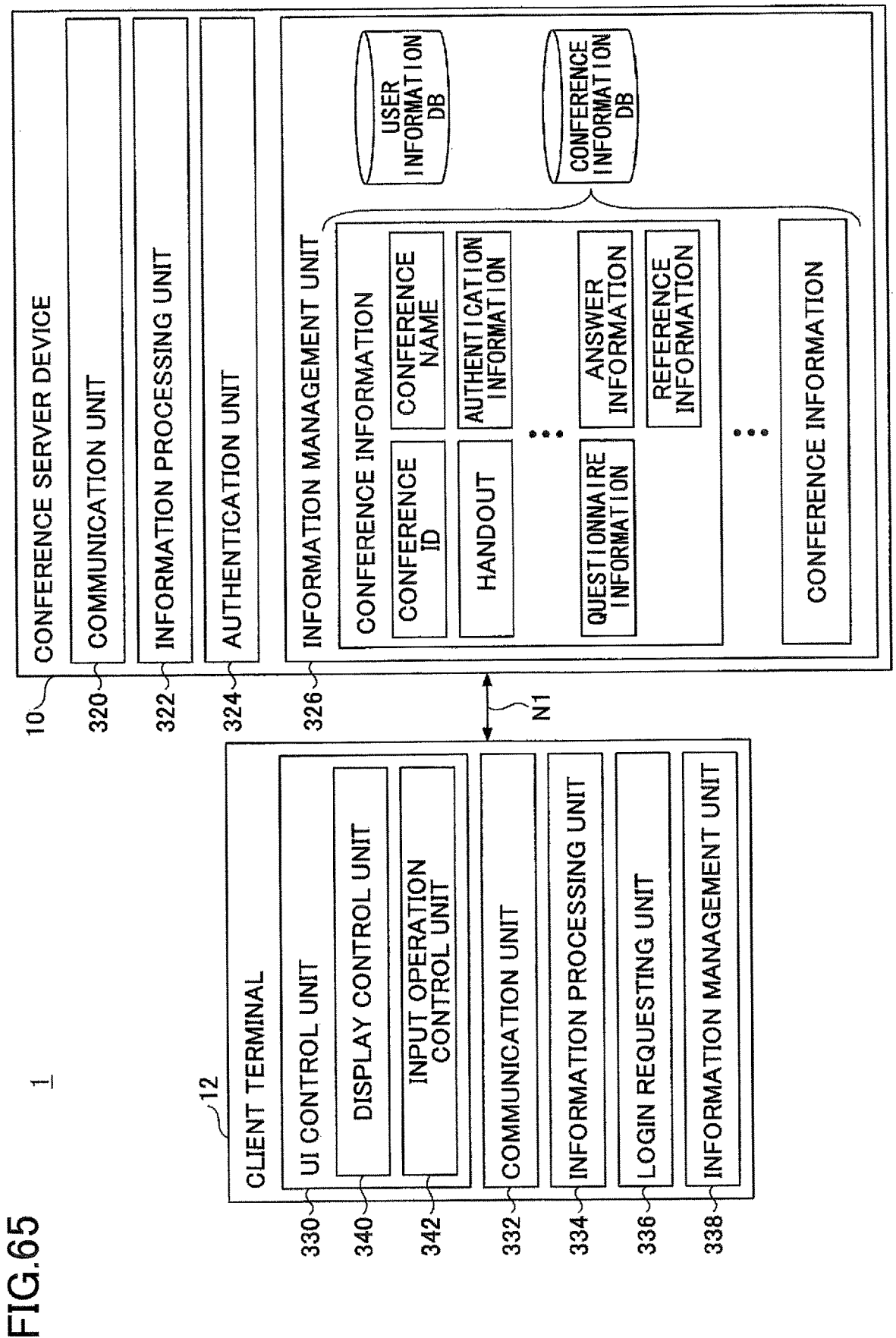
FIG. 65 is a functional block diagram illustrating an example of a conference system, according to a variation of an embodiment of the present invention.

FIG. 65 is a functional block diagram illustrating an example of a conference system. Note that the functional block diagram of FIG. 65 illustrates functions that are necessary for explaining the present variation among all functions provided by a conference server device 10 and a client terminal 12, which means that the conference server device 10 and the client terminal 12 illustrated in FIG. 65 may include more functions.

The conference server device 10 as illustrated in FIG. 65 executes a program for actualizing a communication unit 320, an information processing unit 322, an authentication unit 324, and an information management unit 326. Further, the client terminal 12 as illustrated in FIG. 65 executes a program for actualizing a UI control unit 330, a communication unit 332, an information processing unit 334, a login requesting unit 336, and an information management unit 338.

The communication unit 320 of the conference server device 10 controls communication with a client terminal 12.

The information processing unit 322 performs information processing for registering a conference, controlling a conference, etc. The authentication unit 324 performs a process relating to authentication. The information management unit 326 manages a user information DB, a conference information DB, etc. The user information DB stores user information. Specifically, the user information may be, for example, authentication information such as a login ID and a password, which is required for authentication. Note that a login ID includes a user ID and a terminal ID. The client terminal 12 may log in to the conference server device 10 and access the user information DB for editing or adding user information. Further, the conference information DB stores conference information.

The conference information as illustrated in FIG. 65 is information relating to a conference, which is registered by an administrator or a presenter of a conference via a client terminal 12. The conference information as illustrated in FIG. 65 includes a conference ID, a conference name, handout data, authentication information, questionnaire information, answer information, reference information, etc. Answer information is indicative of an answering result of a questionnaire.

The UI control unit 330 of a client terminal 12 includes a display control unit 340, an input operation control unit 342, etc., and performs control relating to display of a UI. The display control unit 340 performs display control of a UI. The input operation control unit 342 accepts an operation entered by a user and performs control based on the entered operation. The communication unit 332 controls communication with the conference server device 10. The information processing unit 334 performs information processing such as processing for joining a conference as described above and processing of operation information that is received during a conference. The login requesting unit 336 accepts a login request from a user and transmits a login request to the conference server device 10 for the purpose of authentication of a user or a terminal. The information management unit 338 of the client terminal 12 manages necessary information.

The display control unit 340, communication unit 332, information processing unit 334, and information management unit 338 of a client terminal 12 as illustrated in FIG. 65 are actualized, for example, as illustrated in functional block diagrams of FIGS. 66A through 66D. FIGS. 66A through 66D are functional block diagrams illustrating examples of a display control unit, a communication unit, an information processing unit, and an information management unit of a client terminal.

FIG. 66A is a functional block diagram of the display control unit 340. The display control unit 340 is configured with a questionnaire registration screen displaying unit 351, a questionnaire-list screen displaying unit 352, a questionnaire answering screen displaying unit 353, and a questionnaire-result screen displaying unit 354. The questionnaire registration screen displaying unit 351 controls display of a questionnaire registration screen. The questionnaire-list screen displaying unit 352 controls display of a questionnaire-list screen. The questionnaire answering screen displaying unit 353 controls display of a questionnaire answering screen. The questionnaire-result screen displaying unit 354 controls display of a questionnaire-result screen.

FIG. 66B is a functional block diagram of the communication unit 332. The communication unit 332 is configured with a questionnaire information transmit-receive unit 361. The questionnaire information transmit-receive unit 361 transmits and receives questionnaire information to and from the conference server device 10.

FIG. 66C is a functional block diagram of the information processing unit 334. The information processing unit 334 is configured with a questionnaire registration screen generating unit 371, a questionnaire-list screen generating unit 372, a questionnaire answering screen generating unit 373, and a questionnaire-result screen generating unit 374. The questionnaire registration screen generating unit 371 generates a questionnaire registration screen. The questionnaire-list screen generating unit 372 generates a questionnaire-list screen. The questionnaire answering screen generating unit 373 generates a questionnaire answering screen. The questionnaire-result screen generating unit 374 generates a questionnaire-result screen.

FIG. 66D is a functional block diagram of the information management unit 338. The information management unit 338 is configured with a questionnaire information management unit 381. The questionnaire information management unit 381 manages questionnaire information.

Further, the communication unit 320 and the information processing unit 322 of the conference server device 10 as illustrated in FIG. 65 may be actualized as illustrated in functional block diagrams of FIGS. 67A and 67B. FIGS. 67A and 67B are functional block diagrams illustrating examples of a communication unit and an information processing unit of a conference server device.

FIG. 67A is a functional block diagram of the communication unit 320. The communication unit 320 is configured with a questionnaire information transmit-receive unit 391 and a questionnaire-result transmit-receive unit 392. The questionnaire information transmit-receive unit 391 transmits and receives questionnaire information to and from a client terminal 12. The questionnaire-result transmit-receive unit 392 transmits information for updating a questionnaire-result screen, which is displayed on a presenter terminal.

FIG. 67B is a functional block diagram of the information processing unit 322. The information processing unit 322 is configured with a questionnaire information processing unit 3101. The questionnaire information processing unit 3101 performs processing relating to questionnaire information.

Note that the functional block diagrams illustrated in FIGS. 65 through 67B are examples. For example, a part of functions of the conference server device 10 illustrated in the functional block diagram of FIG. 65 may be provided by another information processing apparatus or by a client terminal 12. In the above case, functions as illustrated in functional block diagrams may communicate with each other to transmit and receive information, as needed.

An administrator (or an operator) of a conference operates an administration tool provided on an administrator terminal to register questionnaire information. Registration of questionnaire information may be performed by a presenter through a conference application provided in a presenter terminal, etc. When a questionnaire is started, a participant terminal operated by a participant of a conference generates a screen corresponding to above-described role information (i.e., as a presenter or an audience member). For example, a presenter terminal may generate a questionnaire registration screen, a questionnaire-list screen, or a questionnaire-result screen. An audience terminal may generate a questionnaire answering screen or a questionnaire-result screen.

An audience member answers a questionnaire through a questionnaire answering screen. An audience terminal transmits an answering result of a questionnaire, which is provided by an audience member, to the conference server device 10. The conference server device 10 transmits answering results of a questionnaire, which are provided by audience members, to a presenter terminal on a real-time basis. The presenter terminal updates a questionnaire-result screen, based on the answering results of a questionnaire, which are received from the conference server device 10 on a real-time basis. Further, the conference server device 10 stores the answering results of a questionnaire, which are provided by audience members, in the conference information DB as answering information, in association with questionnaire information.

Thus, the conference server device 10 is able to cause a presenter terminal and an audience terminal to display a questionnaire-result screen after conducting a questionnaire. Further, an administrator (or an operator) of a conference may operate an administration tool provided on an administrator terminal to download, from the conference server device 10, an answering result of a questionnaire provided by audience members.

<<Questionnaire Information>>

Questionnaire information, which is included in conference information as illustrated in FIG. 65, is configured as illustrated in FIG. 68. FIG. 68 is a configuration diagram illustrating an example of questionnaire information. The questionnaire information illustrated in FIG. 68 includes columns of conference IDs, questionnaire IDs, questionnaire titles, questions, options, selectable numbers, display formats, users who can conduct, and statuses.

A conference ID is an example of identification information for identifying a conference. A questionnaire ID is an example of identification information for identifying a questionnaire. A questionnaire title is a title of a questionnaire. A question is a body of a question in a questionnaire. A question corresponds to "EXPLANATION" provided as an item on a questionnaire registration screen 7100 illustrated in FIG. 71 or described on a questionnaire registration screen 7300 illustrated in FIG. 73. An option is an option-list for an audience member to select as an answer to a question.

A selectable number is indicative of the number of options that can be selected by an audience member as an answer to a question. Note that the selectable number corresponds to "SELECTABLE NUMBER" provided as an item on the questionnaire registration screen 7100 illustrated in FIG. 71 or on the questionnaire registration screen 7300 illustrated in FIG. 73.

A display format is a designated display format for generating a questionnaire-result screen. For example, "PIE", which is indicative of a pie graph, or "BAR", which is indicative of a bar graph, may be designated. A "USER WHO CAN CONDUCT" is a designated user who can introduce (i.e., conduct) a questionnaire. In a case where "ANY" is designated as "USER WHO CAN CONDUCT", the questionnaire can be introduced by any user. Note that any questionnaire can be introduced through an administration tool. Note that setting of a display format and a user who can introduce a questionnaire may be performed through a screen for registering or editing a questionnaire, such as the questionnaire registration screen 7100 illustrated in FIG. 71 or the questionnaire registration screen 7300 illustrated in FIG. 73.

As a status, "NOT CONDUCTED YET", "BEING CONDUCTED", or "CONDUCTED" is set, so as to indicate a conducting status of a questionnaire. Questionnaire information of a questionnaire with a conducting status of "NOT CONDUCTED YET" or "CONDUCTED" may be edited. However, questionnaire information of a questionnaire with a conducting status of "BEING CONDUCTED" cannot be edited. Note that, in a case where questionnaire information with a conducting status of "CONDUCTED" is selected, a presenter terminal generates and displays questionnaire-result information of the questionnaire.

Further, the reason that questionnaire information of a questionnaire with a conducting status of "CONDUCTED" is editable is to modify a simplified questionnaire that is created during a conference (e.g., a questionnaire with simplified questions or options) after the conference. In the conference system 1 according to the present variation, in a case where a questionnaire with options "A", "B", "C", and "D" may be created during a conference, the options "A", "B", "C", and "D" may be modified into more accurate options "Red", "Blue", "Yellow", and "Green".

The questionnaire information as illustrated in FIG. 68 includes a questionnaire ID for identifying a questionnaire, which is assigned in association with a conference ID. Further, the questionnaire information illustrated in FIG. 68 may include, in association with each questionnaire, handout data or an image as reference information for a reference at a time of answering the questionnaire. For example, at a seminar of a medical topic, etc., it may be desired, at a time of conducting a questionnaire, that a questionnaire is answered by comparing images of symptomatic cases.

FIG. 69 is a configuration diagram illustrating an example of reference information associated with a questionnaire. The reference information illustrated in FIG. 69 includes columns of questionnaire IDs, reference image URLs, reference IDs, page numbers, and reference URLs. The reference information illustrated in FIG. 69 is associated with a questionnaire ID. A reference image URL is a reference URL for a reference image stored in a conference server device 10. A reference ID is a handout ID for identifying handout data used at a conference. A page number is a page number of handout data specified by a handout ID, which is a designated page number to be viewed as a reference. In a case where an entire handout is to be viewed as a reference, the page number may be "N/A". In a case where the page number is "N/A", a first page of a handout may be displayed. In a case where there is a handout or a web page that is not registered for a conference but is desired to be viewed as a reference at a time of answering a questionnaire, a URL for the handout or the web page may be set as a reference URL. The reference URL may be set "N/A".

<Processing>
<<Registration and Edit of a Questionnaire>>

A process for registering and editing a questionnaire may be performed through screens as illustrated in FIGS. 70 through 72, which are displayed on an administrator terminal. FIGS. 70 through 72 are image diagrams illustrating examples of a screen for registering and editing a questionnaire through an administrator terminal.

On a conference management/register new conference screen 7000 as illustrated in FIG. 70, an administrator of a conference may press an add questionnaire button 7001, so as to display a questionnaire registration screen 7100 as illustrated in FIG. 71 on an administrator terminal. An administrator of a conference may enter required information on the questionnaire registration screen 7100 and press a save button 7101 for adding a questionnaire. The questionnaire registration screen 7100 illustrated in FIG. 71 is displayed in a case of entering a title, an explanation, a selectable number, and an option, as required information for adding a questionnaire.

Note that questionnaire information without a conducting status "BEING CONDUCTED" may be edited by an administrator of a conference through the questionnaire registration screen 7100. In other words, questionnaire information without a conducting status "BEING CONDUCTED" may be edited by an administrator of a conference at any time whether before the conference, during the conference, or after the conference. An administrator of a conference may press the save button 7101 on the questionnaire registration screen 7100 as illustrated in FIG. 71, to close the questionnaire registration screen 7100.

The conference management/register new conference screen 7000 illustrated in FIG. 72 is an example of a screen displayed in a case where handouts/questionnaires have been registered. On the conference management/register new conference screen 7000 illustrated in FIG. 72, a list 7200 of registered handouts/questionnaires is displayed. An administrator of a conference may select a handout or a questionnaire from the list 7200 of handouts/questionnaires and press a modify button 7201 or a delete button 7202, to modify or delete the selected handout or questionnaire.

The process for registering or editing a questionnaire may be also performed through a screen as illustrated in FIG. 73, which is displayed on a presenter terminal. FIG. 73 is an image diagram illustrating an example of a screen for registering or editing a questionnaire through a presenter terminal. A presenter may operate a presenter terminal to display a questionnaire registration screen 7300 as illustrated in FIG. 73. Then, the presenter may enter required information on the questionnaire registration screen 7300 and press a start button 7301, to start a questionnaire. Note that, in a case where a questionnaire is registered through a presenter terminal during a conference, questionnaire information as illustrated in FIG. 68 is registered in association with a conference ID of the conference in which the presenter terminal participates.

The questionnaire registration screen 7300 as illustrated in FIG. 73 is displayed on a presenter terminal, when a "+" button on a questionnaire-list screen, which is explained in the following description, is pressed. The questionnaire registration screen 7300 illustrated in FIG. 73 is an example of a screen for entering a title, an explanation, a selectable number, and an option of a questionnaire, as required information.

Note that, in a case of conducting a questionnaire created during a conference, entering all of the required information may be troublesome. Therefore, by pressing the start button 7301, a presenter terminal may start a questionnaire even without a title or an explanation. Alternatively, for conducting a questionnaire, a presenter may enter simple texts, such as A, B, C and D, as options, and then orally explain what each option represents. In the above case, to prevent difficulty of recalling what the questionnaire was about afterwards, questionnaire information such as a title, an explanation, or an option of the conducted questionnaire can be edited.

<<Conducting a Questionnaire>>

Figure 74:
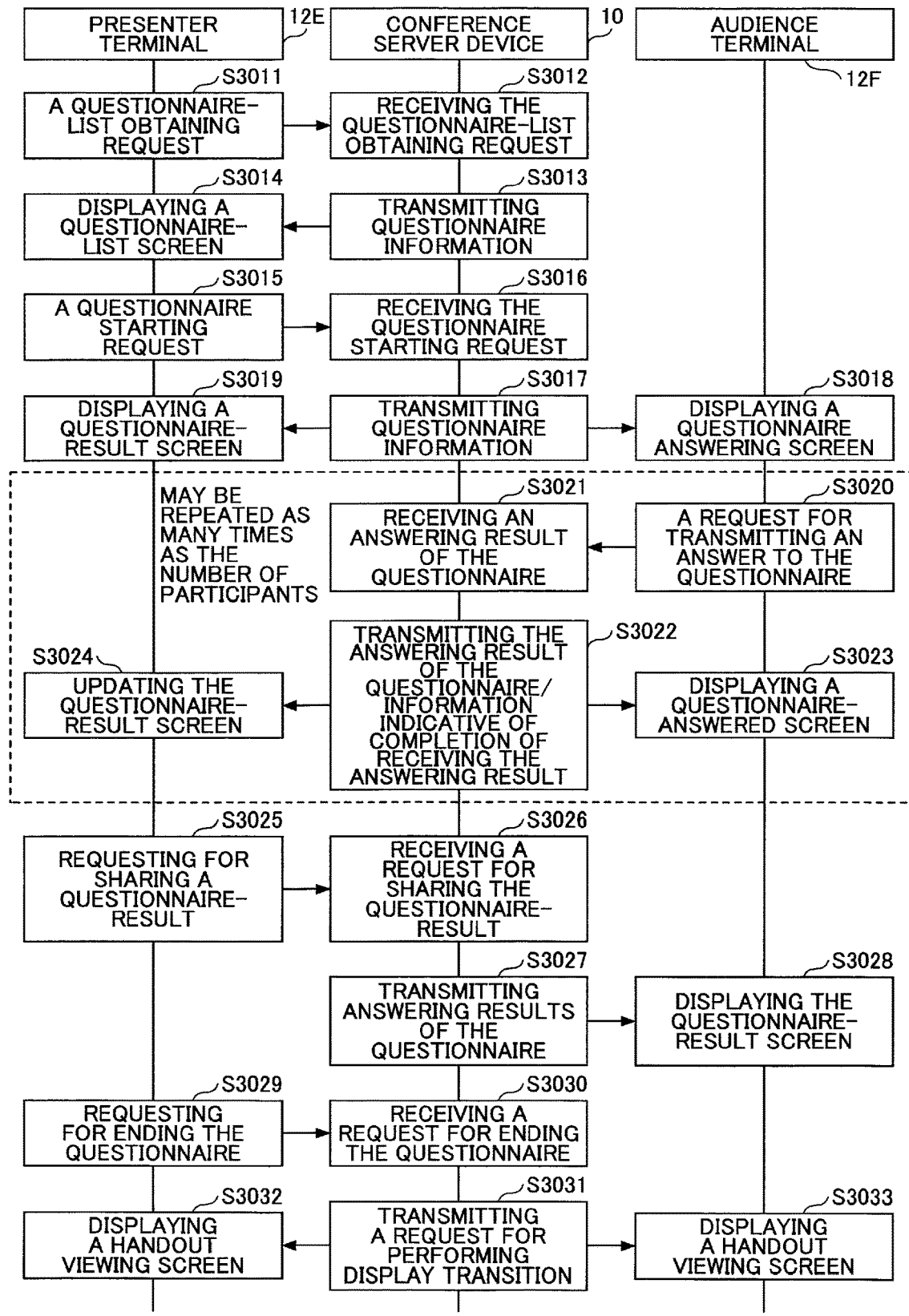
FIG. 74 is a sequence diagram illustrating an example of a process for conducting a questionnaire, according to a variation of an embodiment of the present invention.

A process for conducting a questionnaire may be performed through a procedure as illustrated in a sequence diagram of FIG. 74. FIG. 74 is a sequence diagram illustrating an example of a process for conducting a questionnaire. During a conference, a presenter may operate a UI for obtaining a questionnaire-list, which is displayed on a presenter terminal 12E, to instruct for displaying a questionnaire-list screen.

At Step S3011, the questionnaire information transmit-receive unit 361 of the presenter terminal 12E transmits a questionnaire-list obtaining request to a conference server device 10. At Step S3012, the conference server device 10 receives the questionnaire-list obtaining request from the presenter terminal 12E.

At Step S3013, the conference server device 10, which has received the questionnaire-list obtaining request, transmits to the presenter terminal 12E questionnaire information associated with a conference in which the presenter terminal 12E participates. Note that, in a case where the presenter terminal 12E has logged in to the conference server device 10, the conference server device 10 may transmit to the presenter terminal 12E questionnaire information designating the presenter as a user who can conduct the questionnaire.

Figure 75:
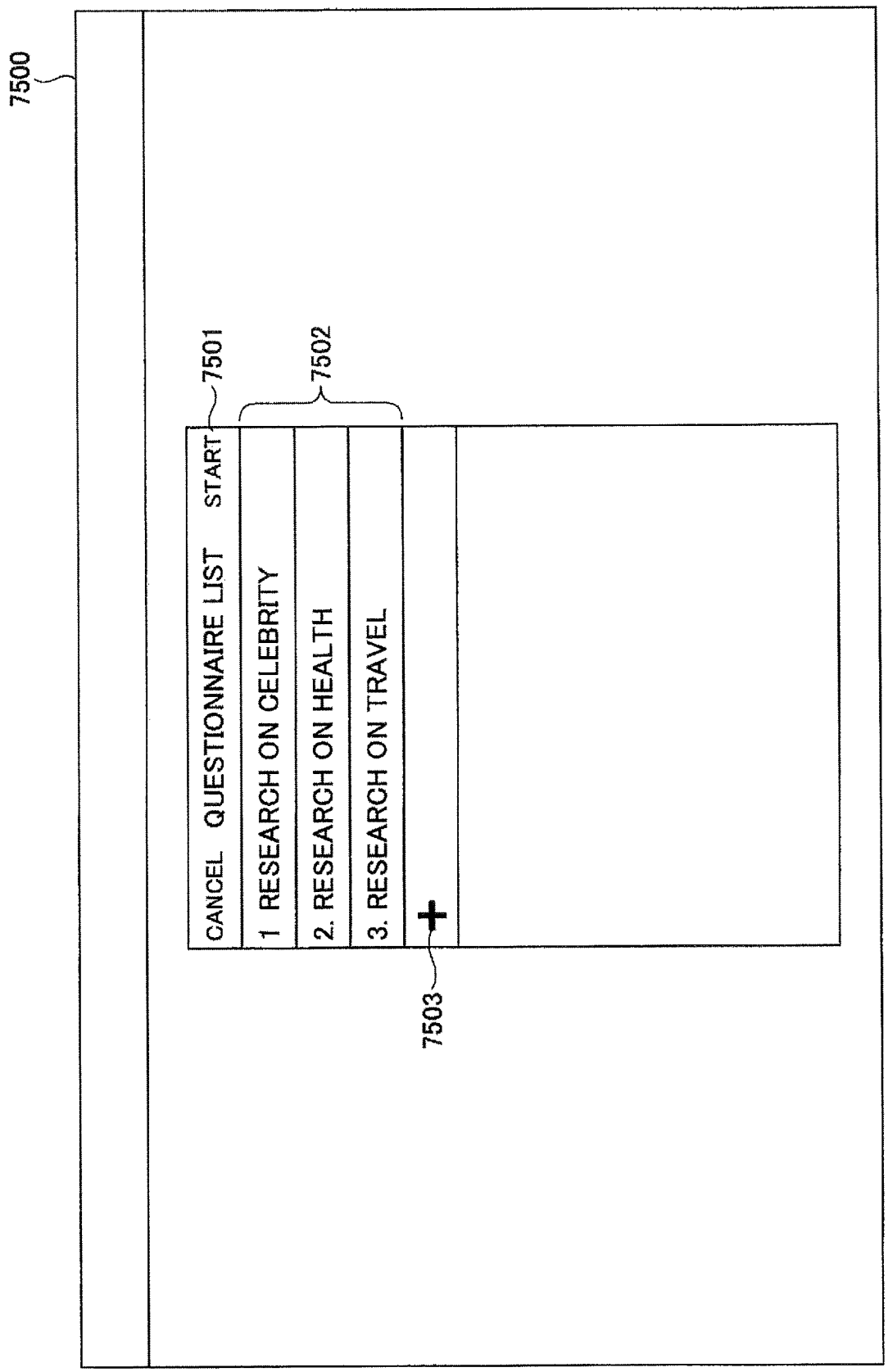
FIG. 75 is an image diagram illustrating an example of a questionnaire-list screen, according to a variation of an embodiment of the present invention.

At Step S3014, the questionnaire information management unit 381 of the presenter terminal 12E stores and manages the questionnaire information received by the questionnaire information transmit-receive unit 361. The questionnaire-list screen generating unit 372 of the presenter terminal 12E generates a questionnaire-list screen 7500 as illustrated in FIG. 75, based on the questionnaire information received by the questionnaire information transmit-receive unit 361. The questionnaire-list screen displaying unit 352 displays the questionnaire-list screen 7500. FIG. 75 is an image diagram illustrating an example of a questionnaire-list screen. The questionnaire-list screen 7500 illustrated in FIG. 75 includes a questionnaire list 7502 of questionnaires registered in the conference server device 10 and a "+" button 7503 for display transition to the questionnaire registration screen 7300. Note that the questionnaire registration screen 7300 is generated and displayed by the questionnaire registration screen generating unit 371 and the questionnaire registration screen displaying unit 351 of a presenter terminal 12E. A presenter may select a questionnaire to be conducted from the questionnaire list 7502 on the questionnaire registration screen 7300 and press a start button 7501, to instruct to start the questionnaire.

At Step S3015, the questionnaire information transmit-receive unit 361 of the presenter terminal 12E transmits to the conference server device 10 a questionnaire starting request to start a questionnaire selected by the presenter. At Step S3016, the conference server device 10 receives the questionnaire starting request.

At Step S3017, the conference server device 10, which has received the questionnaire starting request from the presenter terminal 12E, transmits questionnaire information corresponding to the questionnaire starting request to the presenter terminal 12E and audience terminals 12F participating in the conference.

Figure 76:
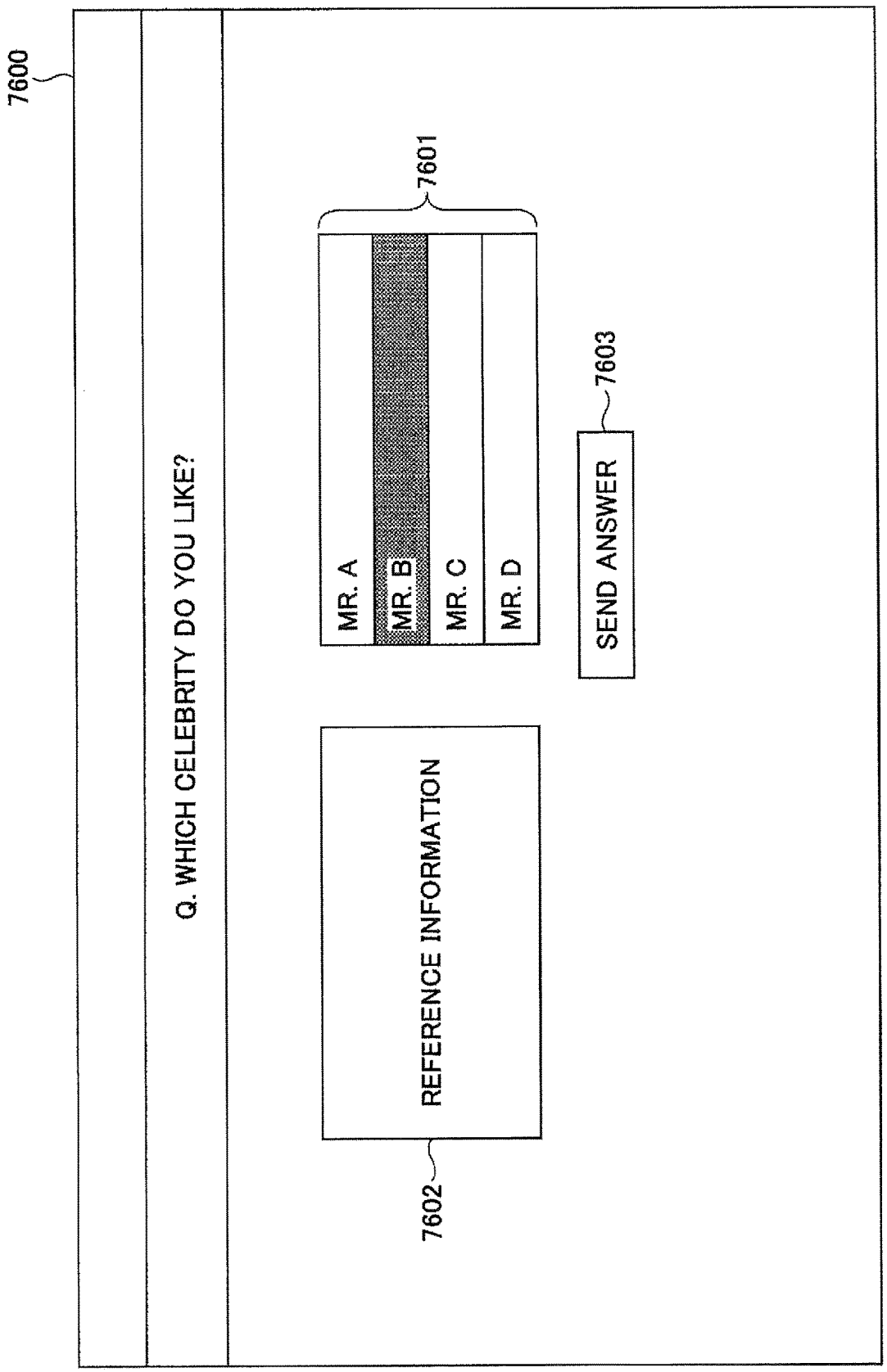
FIG. 76 is an image diagram illustrating an example of a questionnaire answering screen, according to a variation of an embodiment of the present invention.

At Step S3018, the questionnaire information transmit-receive unit 361 of each audience terminal 12F receives the questionnaire information corresponding to the questionnaire starting request from the conference server device 10. Further, the questionnaire information transmit-receive unit 361 receives reference information from the conference server device 10. The questionnaire information management unit 381 stores and manages the questionnaire information and reference information received by the questionnaire information transmit-receive unit 361. The questionnaire answering screen generating unit 373 of the audience terminal 12F generates a questionnaire answering screen 7600 as illustrated in FIG. 76, based on the received questionnaire information as illustrated in FIG. 68. The questionnaire answering screen displaying unit 353 displays the generated questionnaire answering screen 7600. FIG. 76 is an image diagram illustrating an example of a questionnaire answering screen. The questionnaire answering screen 7600 illustrated in FIG. 76 includes an option list 7601, a reference information button 7602, and a send-answer button 7603.

An audience member may select an option from the option list 7601 of the questionnaire answering screen 7600 on the audience terminal 12F and press the send-answer button 7603, to send an answer to the questionnaire to the conference server device 10. Further, as illustrated in the reference information of FIG. 69, in a case where reference information is associated with questionnaire information, an audience member is allowed to press the reference information button 7602 on the questionnaire answering screen 7600.

When the reference information button 7602 is pressed by an audience member, an audience terminal 12F displays reference information on a difference window or in a multi-window format. On the questionnaire answering screen 7600 illustrated in FIG. 76, an audience member may perform display transition between a screen displaying reference information and the questionnaire answering screen 7600, as desired, when answering a questionnaire.

Figure 77:
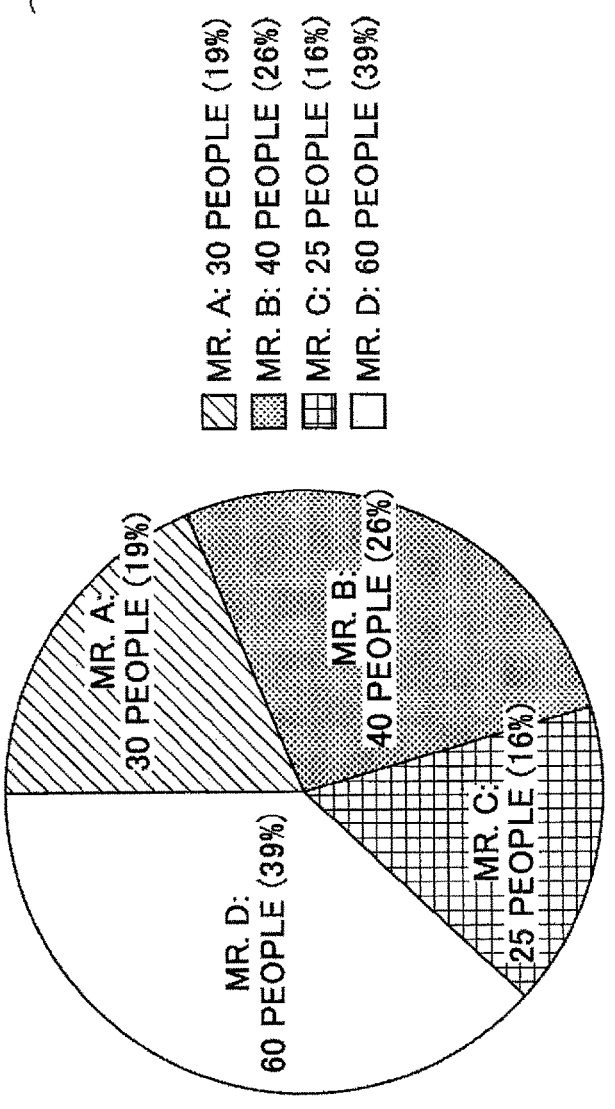
FIG. 77 is an image diagram illustrating an example of a questionnaire-result screen, according to a variation of an embodiment of the present invention.

Further, at Step S3019, the questionnaire information transmit-receive unit 361 of the presenter terminal 12E receives the questionnaire information corresponding to the questionnaire starting request from the conference server device 10. The questionnaire information management unit 381 stores and manages the questionnaire information received by the questionnaire information transmit-receive unit 361. The questionnaire-result screen generating unit 374 of the presenter terminal 12E generates a questionnaire-result screen 7700 as illustrated in FIG. 77, based on the received questionnaire information as illustrated in FIG. 68. The questionnaire-result screen displaying unit 354 displays the generated questionnaire-result screen 7700. FIG. 77 is an image diagram illustrating an example of a questionnaire-result screen.

The questionnaire-result screen illustrated in FIG. 77 includes answering result information 7701 with respect to a questionnaire, a share-result button 7702, and an end button 7703. As the answering result information 7701, an answering result of a questionnaire conducted to audience members is displayed by use of a pie graph or a bar graph, based on a designated display format as illustrated in FIG. 68. Further, the answering result information 7701 may be updated on a real-time basis, each time an audience member participating in the conference answers the questionnaire through an audience terminal 12F.

When the share-result button 7702 is pressed by the presenter, the presenter terminal 12E may request the conference server device 10 to share a questionnaire-result, so that the questionnaire-result screen 7700 is displayed on audience terminals 12F. Further, when the end button 7703 is pressed by the presenter, the presenter terminal 12E requests the conference server device 10 to end a questionnaire, so that the questionnaire is ended.

At Step S3020, the audience member selects an option from the option list 7601 on the questionnaire answering screen 7600 as illustrated in FIG. 76 and presses the send-answer button 7603. The questionnaire information transmit-receive unit 361 of the audience terminal 12F transmits the item selected by the audience member to the conference server device 10 as an answering result of the questionnaire. At Step S3021, the conference server device 10 receives the answering result of the questionnaire from the audience terminal 12F. The answering result of the questionnaire, which is received by the conference server device 10 at Step S3021, includes information indicative of a login ID corresponding to the audience terminal 12F, a questionnaire ID, and an option selected from an option list. Further, the answering result is stored in the conference information DB.

Further, the conference server device 10 transmits to the presenter terminal 12E the received information indicative of the login ID corresponding to the audience terminal 12F, the questionnaire ID, and the option selected from an option list.

At Step S3022, the conference server device 10 transmits information indicative of completion of receiving the answering result of the questionnaire, back to the questionnaire information transmit-receive unit 361 of the audience terminal 12F that has sent the answering result of the questionnaire. The questionnaire information management unit 381 stores and manages the answering result of the questionnaire received by the questionnaire information transmit-receive unit 361. The questionnaire answering screen generating unit 373 and the questionnaire answering screen displaying unit 353 of the audience terminal 12F, which has received the information indicative of completion of receiving the answering result of the questionnaire, displays a questionnaire-answered screen 7800 as illustrated in FIG. 78, at Step S3023.

FIG. 78 is an image diagram illustrating an example of a questionnaire-answered screen. The questionnaire-answered screen 7800 illustrated in FIG. 78 is continuously displayed until the share-result button 7702 or the end button 7703 is pressed on the presenter terminal 12E. As the questionnaire-answered screen 7800 as illustrated in FIG. 78 is continuously displayed and other operations cannot be accepted, there may be an effect of enhancing concentration on a questionnaire in the conference system 1 according to the present variation.

Further, at Step S3022, the conference server device 10 transmits the answering result of the questionnaire to the presenter terminal 12E. At Step S3024, the questionnaire information transmit-receive unit 361 of the presenter terminal 12E receives the answering result of the questionnaire from the conference server device 10. The questionnaire information management unit 381 of the presenter terminal 12E stores and manages the answering result of the questionnaire, which is received by the questionnaire information transmit-receive unit 361. The questionnaire-result screen generating unit 374 and the questionnaire-result screen displaying unit 354 update display of the answering result information 7701 on the questionnaire-result screen 7700 as illustrated in FIG. 77, based on the received answering result of the questionnaire. Note that, with respect to the questionnaire, multiple options may be selected from the option list 7601.

When the presenter presses the share-result button 7702 on the questionnaire-result screen 7700, the processing proceeds to Step S3025, at which the questionnaire information transmit-receive unit 361 of the presenter terminal 12E requests the conference server device 10 to share a questionnaire-result for causing audience terminals 12F to display the questionnaire-result screen 7700. At Step S3026, the conference server device receives a request for sharing the questionnaire-result.

At Step S3027, the conference server device 10 transmits answering results of the questionnaire to the audience terminals 12F participating in the questionnaire. At Step S3028, the questionnaire information transmit-receive unit 361 of the audience terminal 12F receives the answering results of the questionnaire from the conference server device 10. The questionnaire information management unit 381 of the audience terminal 12F stores and manages the answering results of the questionnaire, which are received by the questionnaire information transmit-receive unit 361. The questionnaire-result screen generating unit 374 of the audience terminal 12F generates the questionnaire-result screen 7700 as illustrated in FIG. 77, based on the answering results of the questionnaire received from the conference server device 10. The questionnaire-result screen displaying unit 354 displays the generated questionnaire-result screen 7700. Note that the questionnaire-result screen 7700 may be obligatorily displayed even on an audience terminal 12F that has not answered the questionnaire.

Further, when the presenter presses the end button 7703 on the questionnaire-result screen 7700, the processing proceeds to Step S3029, at which the presenter terminal 12E requests the conference server device 10 to end the questionnaire. At Step S3030, the conference server device 10 receives a request for ending the questionnaire from the presenter terminal 12E. At Step S3031, the conference server device 10 transmits to the presenter terminal 12E and the audience terminals 12F a request for performing display transition from the questionnaire-result screen 7700 to a handout viewing screen.

At Step S3032, the presenter terminal 12E performs display transition from the questionnaire-result screen 7700 to a handout viewing screen. Further, at Step S3033, the audience terminal 12F performs display transition from the questionnaire-result screen 7700 to a handout viewing screen. When display of the presenter terminal 12E and audience terminal 12F returns to the handout viewing screen, the whole processing of conducting a questionnaire ends.

After conducting a questionnaire, a questionnaire-result as illustrated in FIG. 79, which is an aggregated answering result of a questionnaire, is stored in the conference server device 10. FIG. 79 is a configuration diagram illustrating an example of an aggregated questionnaire result. As the questionnaire result as illustrated in FIG. 79, the number of audience members who selected an option from an option list and audience members who selected the option from the option list are stored for each questionnaire. Note that, with respect to an answering result from an audience terminal 12F that had not logged in, the audience terminal 12F is not stored as an audience member who selected an option from an option list, because the audience terminal 12F cannot be identified.

SUMMARY

In the conference system 1 according to the present variation, a questionnaire is registered in association with a conference, not with a handout of a conference. Further, in the conference system 1 according to the present variation, questionnaire information is not delivered from a conference server device 10 to a participant terminal together with handout information at a time of starting a conference. Instead, questionnaire information is delivered from a conference server device 10 to a participant terminal at a timing directed by a presenter, etc., independently from handout information. With such a mechanism as described above, in the conference system 1 according to the present variation, a questionnaire may be flexibly conducted, as questionnaire information may be added or edited at any timing such as before a conference, during a conference, or after a conference.

Further, the present invention is not limited to the above embodiments and variations, but other variations and modifications may be made without departing from the scope of the present invention. A participant terminal 12B, a participant terminal 12D, a presenter terminal 12E, and an audience terminal 12F are examples of a screen-sharing terminal as described in the scope of the present invention. A conference server device 10 is an example of an information processing apparatus. An administrator terminal 12A and an organizer terminal 12C are examples of an administrator terminal. An administration tool is an example of an administration program.

Further, although a question is entered by a participant in the example of the conference system 1 according to the first, second, or third variations, the question may be replaced with any types of information that are entered by a participant, such as an opinion or an evaluation.

Further, although an organizer selects a question that is delivered to all participants participating in a conference in the example of the conference system 1 according to the first variation, second variation, or the third variation, an organizer may select a question that is not delivered to all participants participating in a conference. Further, although an organizer selects a question that is delivered to all participants participating in a conference in the example of the conference system 1 according to the first variation, second variation, or the third variation, the question is not required to be delivered to all of the participants. For example, the question may be delivered to a presenter.

Note that a conference system 1 including a conference server device 10 and at least one client terminal 12 is an example. Needless to say, there may be various system configuration examples, in accordance with a purpose and a goal.

Each function in the embodiments and variations as explained as explained above may be actualized by one processing circuit or multiple processing circuits. Here, a "processing circuit" in the description of the present application may include a processor that is programmed as a software program to perform each function, such as a processor implemented as an electric circuit, and may include a device designed for performing each function as explained above, such as an application specific integrated circuit (ASIC), a digital signal processor (DSP), a field programmable gate array (FPGA), or a conventional circuit module.

Further, a concept of a conference in the embodiments and variations as explained above include one-way communication and two-way communication between users, such as a seminar, a class, or a brainstorming, in addition to a conference in the regularly-used meaning.

REFERENCE SIGNS LIST 1 conference system
10 conference server device
12 client terminal
12A administrator terminal
12B participant terminal
21 communication unit
22 operation accepting unit
23 administration tool unit
31 conference registering unit
32 user setting unit
33 conference management unit
34 login processing unit
41 communication control unit
42 status acquiring unit
51 communication unit
52 operation accepting unit
53 conference application unit
61 server connecting unit
62 login processing unit 63 instructed item executing unit
64 display control unit
65 information management unit
81 communication unit
82 conference management unit
83 authentication unit
84 user information DB
85 conference information DB
91 information management unit
92 instruction delivery unit
93 situation providing unit
12C organizer terminal
12D participant terminal
221, 231 login processing unit
222 question-list display processing unit
223 question select processing unit
224, 235, 243 message transmit-receive processing unit
225 questioning item information storing unit
226 question history obtainment processing unit
227 question history display processing unit
232 question creation processing unit
233 question display processing unit
234 conference control unit
241 communication control unit
242 information management unit
244 conference information storing unit
245 role information storing unit
246 user information storing unit
247 question information storing unit
248 question-list output data generation processing unit
12E presenter terminal
12F audience terminal
320 communication unit
322 information processing unit
324 authentication unit
326 information management unit
330 UI control unit
332 communication unit
334 information processing unit
336 login requesting unit
338 information management unit
340 display control unit
342 input operation control unit
351 questionnaire registration screen displaying unit
352 questionnaire-list screen displaying unit
353 questionnaire answering screen displaying unit
354 questionnaire-result screen displaying unit
361 questionnaire information transmit-receive unit
371 questionnaire registration screen generating unit
372 questionnaire-list screen generating unit
373 questionnaire answering screen generating unit
374 questionnaire-result screen generating unit
381 questionnaire information management unit
391 questionnaire information transmit-receive unit
3101 questionnaire information processing unit
501, 601 input device
502, 602 display device
503, 603 external I/F
503a, 603a recording medium
504, 604 RAM
505, 605 ROM
506, 606 CPU
507, 607 communication I/F
508, 608 HDD
1001 login screen
1002, 1003 login-success screen
1004 portal screen
1100 screen (of an administration tool)
1200 screen (for registering handout data)
1300 a screen (on which a memo can be taken on a handout)
1400 screen (including a blank memo area)
1401 (blank) memo area
1402 message area
1500 UI screen
1503, 1504 icon
4400 question entering screen
4700 question selecting screen
5000 question display screen
7000 conference management/register new conference screen
7100 questionnaire registration screen
7200 list (of registered handouts/questionnaires)
7300 questionnaire registration screen
7500 questionnaire-list screen
7600 questionnaire answering screen
7700 questionnaire-result screen
7800 questionnaire-answered screen
B bus
N1 network

What is claimed is:

1. An information processing system, comprising:
a first terminal, and
a server including first circuitry configured to:
receive a question from a second terminal of a plurality of second terminals,
receive at least one more question from another second terminal of the plurality of second terminals so that there are a plurality of questions which have been received, and
send the plurality of questions which have been received to the first terminal without sending the plurality of question to any other second terminal of the plurality of second terminals,
wherein the first terminal includes second circuitry configured to:
display a list of the plurality of questions received from the server,
receive input from a user corresponding to a selection of at least two questions of the list of the plurality of questions which is displayed by the user selecting at least two questions of the list of the plurality of questions which is displayed and thereafter the user clicking on an icon which is a button to send information relating to the at least two questions which have been selected, and
send to the server the information relating to the at least two questions based on the input which is received,
wherein the first circuitry of the server is further configured to:
send the at least two questions corresponding to the input received from the user to the plurality of second terminals so that the plurality of second terminals display the at least two questions corresponding to the input.

2. The information processing system according to claim 1, wherein:
the first circuitry sends the plurality of questions to the first terminal by sending a message including the plurality of questions.

3. The information processing system according to claim 1, wherein the first circuitry is further configured to:

store in a memory the at least two questions;
read the at least two questions from the memory; and
send the at least two questions corresponding to the input received from the user and read from the memory to the plurality of second terminals for the plurality of second terminals to display.

4. The information processing system according to claim 1, wherein:
the second circuitry sends to the server the information relating to the at least two questions in response to the input from the user which is a user operation at the first terminal.

5. The information processing system according to claim 1, wherein:
the first circuitry of the server sends a new question to the first terminal each time the server receives the new question from any of the plurality of second terminals.

6. The information processing system according to claim 1, wherein:
the plurality of questions are entered at different terminals of the plurality of second terminals.

7. An information processing apparatus, comprising:
a network interface to connect to, via a network, a first terminal and a plurality of second terminals, and
circuitry configured to:
receive a question from a second terminal of the plurality of second terminals;
receive at least one more question from another second terminal of the plurality of second terminals so that there a plurality of questions which have been received;
send the plurality of questions which have been received to the first terminal without sending the plurality of questions to any other second terminal of the plurality of second terminals;
receive from the first terminal information relating to a selection of at least two questions from the plurality of questions, the information being sent from the first terminal based on user input corresponding to the at least two questions at the first terminal from a user, the receive including receive the input, from the user corresponding to the at least two questions which is a query and which is displayed, by the user selecting the at least two questions which are displayed in a list of questions including the plurality of questions and thereafter the user clicking on an icon which is a button to send the information relating to the at least two questions; and
send the at least two questions corresponding to the user input received from the first terminal to the plurality of second terminals for the plurality of second terminals to display the at least two questions.

8. The information processing apparatus according to claim 7, wherein:
the circuitry sends the plurality of questions to the first terminal by sending a message including the plurality of questions.

9. The information processing apparatus according to claim 7, wherein the circuitry is further configured to:
store in a memory the plurality of questions,
read the plurality of questions from the memory, and
send the at least two questions corresponding to the user input and read from the memory to the plurality of second terminals for the plurality of second terminals to display the at least two questions.

10. The information processing apparatus according to claim 7, wherein:

the circuitry receives the information relating to the at least two questions in response to the user input which is generated in response to a user operation at the first terminal.

11. The information processing apparatus according to claim 7, wherein:
the circuitry of the information processing apparatus sends a new question to the first terminal each time the information processing apparatus receives the new question from any of the plurality of second terminals.

12. The information processing apparatus according to claim 7, wherein:
the plurality of questions are entered at different terminals of the plurality of second terminals.

13. A method of operating a server, comprising:
receiving a question which is a query from a second terminal of a plurality of second terminals,
receiving at least one more question from another second terminal of the plurality of second terminals so that there are a plurality of questions which have been received,
sending the plurality of questions which have been received to a first terminal without sending the plurality of questions to any other second terminal of the plurality of second terminals,
receiving from the first terminal information relating to a selection of at least two questions from the plurality of questions, the information being sent from the first terminal based on user input corresponding to the at least two questions at the first terminal from a user of the first terminal, the receiving further includes receiving the information relating to the at least two questions, from the first terminal, by the user selecting the at least two questions which are displayed in a list of questions including the plurality of questions and thereafter the user clicking on an icon which is a button to send the information relating to the at least two questions, and
sending, in response to the user clicking on the icon, the at least two questions corresponding to input received from the user to the plurality of second terminals for the plurality of second terminals to display the at least two questions.

14. The method according to claim 13, wherein:
the sending of the plurality of questions to the first terminal includes sending a message including the plurality of questions.

15. The method according to claim 13, further comprising:
storing in a memory the plurality of questions;
reading the plurality of questions from the memory; and
sending the at least two questions corresponding to the input received from the user and read from the memory to the plurality of second terminals for the plurality of second terminals to display the at least two questions corresponding to the user input.

16. The method according to claim 13, further comprising:
receiving the information relating to the at least two questions in response to the user input from the user which is generated in response to a user operation at the first terminal.

17. The method according to claim 13, wherein:
the sending sends a new question to the first terminal each time the server receives a new question from any of the plurality of second terminals.

18. The method according to claim 13, wherein:
the plurality of questions are entered at different terminals of the plurality of second terminals.

* * * * *